United States Patent [19]

Eichler et al.

[11] 4,409,614

[45] Oct. 11, 1983

[54] METHOD FOR THE REPRODUCTION OF ORIGINALS WHICH, WITH RESPECT TO THEIR COLOR CONTENT, ARE SCANNED ACCORDING TO A TRISTIMULUS METHOD

[76] Inventors: Helmut Eichler, Burgunderstr. 13, D-7601 Durbach; Friedrich W. Vorhagen, Am Wald 44, D-5190 Stolberg-Atsch; Hans M. Hütten, Helleter Feldchenstr. 10, D-5102 Würselen-Broichweiden, all of Fed. Rep. of Germany

[21] Appl. No.: 328,157

[22] Filed: Dec. 7, 1981

Related U.S. Application Data

[63] Continuation of Ser. No. 192,953, filed as PCT DE 79/00121 on Oct. 9, 1979, published as WO80/00753, Apr. 17, 1980, § 102(e) date Jun. 6, 1980, abandoned.

[30] Foreign Application Priority Data

Oct. 10, 1978 [DE] Fed. Rep. of Germany ....... 2844158

[51] Int. Cl.³ ................................................ G03F 3/08
[52] U.S. Cl. ........................................ 358/76; 358/80
[58] Field of Search .................................. 358/76, 80

[56] References Cited

U.S. PATENT DOCUMENTS

| 2,656,099 | 10/1953 | Selling et al. ......................... 235/61 |
| 3,330,904 | 7/1967 | Gebel ..................................... 358/15 |
| 3,848,856 | 11/1974 | Reeber et al. ......................... 358/76 |
| 3,885,244 | 5/1975 | Keller ..................................... 358/80 |
| 4,037,249 | 7/1977 | Pugsley ................................. 358/76 |

FOREIGN PATENT DOCUMENTS

| 1921460 | 4/1970 | Fed. Rep. of Germany . |
| 1597771 | 5/1970 | Fed. Rep. of Germany . |
| 2300514 | 7/1973 | Fed. Rep. of Germany . |
| 2511922 | 3/1976 | Fed. Rep. of Germany . |
| 2600901 | 7/1976 | Fed. Rep. of Germany . |
| 2623741 | 12/1976 | Fed. Rep. of Germany . |
| 2637055 | 3/1977 | Fed. Rep. of Germany . |
| 2544703 | 4/1977 | Fed. Rep. of Germany . |
| 2823883 | 12/1978 | Fed. Rep. of Germany . |
| 1206681 | 9/1970 | United Kingdom . |
| 1294191 | 10/1972 | United Kingdom . |
| 1369702 | 10/1974 | United Kingdom . |
| 1382124 | 1/1975 | United Kingdom . |
| 1400806 | 7/1975 | United Kingdom . |
| 1447973 | 9/1976 | United Kingdom . |
| 1449126 | 9/1976 | United Kingdom . |

OTHER PUBLICATIONS

Bergmann-Schaefer, Lehrbuch der Experimental Physic, Band III, Optic, 7, Auflage, pp. 672-677 and 690-698.
Klopsch, "Das Chromaskop-Farbsichtplate zum Chromagraph DC 300", der Polygraph, 12,76, pp. 846 to 848.

Primary Examiner—John C. Martin
Attorney, Agent, or Firm—Sughrue, Mion, Zinn, Macpeak and Seas

[57] ABSTRACT

The color scanning signals generated by scanning the original are first converted into three primary color signals having actual color values in a predetermined color coordinate system corresponding substantially identically to theoretical color values of the original. It is only after this conversion that the primary signals or signals derived from these signals are converted to another color rendition system, or the gradation is altered, or the color rendition of individual colors in the overall image or in discrete areas is altered, or any other nonlinear processing takes place.

72 Claims, 51 Drawing Figures b) MAGENTA c) CYAN b)

c)

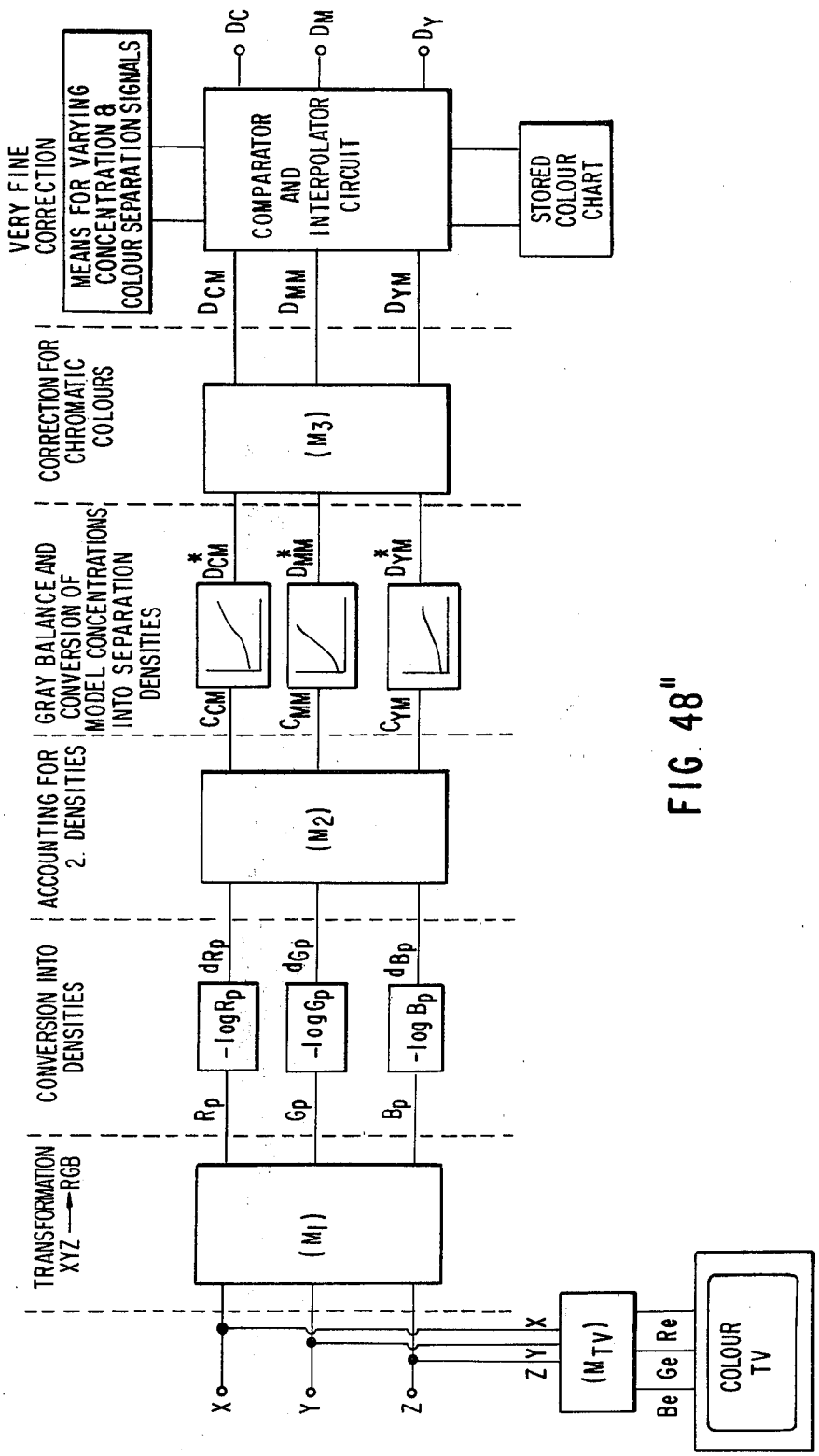
FIG. 48"

METHOD FOR THE REPRODUCTION OF ORIGINALS WHICH, WITH RESPECT TO THEIR COLOR CONTENT, ARE SCANNED ACCORDING TO A TRISTIMULUS METHOD

This is a continuation, of application Ser. No. 192,953, filed as PCT DE79/00121 on Oct. 9, 1979, published as WO80/00/753, Apr. 7, 1980, 102(e) date Jun. 6, 1980, abandoned.

The invention relates to a method for the reproduction of originals which, with respect to their colour content, are scanned according to a tristimulus method in conformity with the preamble of the main claim.

At the end stage of technical reproduction systems the image reproduced from the original is formed as the result of a colour synthesis, and is viewed as such by the observer. The reproduction can be maintained for as long as the control signals for the colour synthesis exist, for example with reproduction on a screen, or else, after conversion of the signals, these being mostly electrical, into colour concentrations for example, it can be retained permanently in the form of colour print, paper photographic print or as a positive transparency. Assuming that the transmission and storage of the electrical signals ensues virtually ideally, i.e. free of interference and distortion, the colour rendition properties of the reproduction are determined in the main by the colour analysis and the colour synthesis, generally referred to as colour mixture. The colour mixing can ensue as so-called additive colour mixing, as for example with colour television, or as so-called subtractive colour mixing, as for example in the case of colour film, or else as a mixed form, as for example in various printing procedures. The control signals necessary for the colour mixture are set up via analysis of the original, which is generally scanned dot by dot and analysed with respect to its colour content. Since the colour of an original does not represent a physical property of the original but is a perception of the senses, the sense-associated physiological properties of human vision must be taken into account as regards the analysis. Care must thus be taken with this colour analysis, where electrical signals are generated from the colour stimulus arising from every image spot, that these signals, if the reproduction system is to "see" the original as a viewer with normal colour vision, are linked via a linear relation to the fundamental colour values. Only if this condition is fulfilled are the scanning signals proportional to colour values in a correspondingly-selected primary colour system, allowing them to be designated as colour signals. In technical reproduction systems the colour signals are generally obtained according to the so-called tristimulus method. The most accurate method for determining a colour valence, the spectrophotometric method, requires too much time to carry out the measurements and cannot be used in technical reproduction systems. The third known method for determining a colour valence, the so-called visual colour matching, is principally not suited for analysis in technical reproduction systems as it necessitates the matching evaluation of a person with normal colour vision, who must choose a colour sample, corresponding exactly to the colour valence to be determined, from a colour chart or scale. This method is used, however, in commercial art for the so-called matching, where the colour separations are manually retouched.

In the tristimulus method, in a process similar to that of the human eye, three signals are determined according to three different action functions from the colour stimulus, having three discrete receivers which generally consist of photoelectric converters with correction filters in front of them. The effective spectral sensitivities of the receivers, including the correction filters, should be in conformity with some colour mixture functions which can be computed from the fundamental colour mixture curves via a simple linear relation. Also taken into account in the analysis are the mathematical interrelationships of the selected colour mixture system for the primary colours used. Errors attributable to non-observance of the mathematical interrelationships of colour vision, i.e. errors deriving from non-adherence to a visual-sensitivity-based reproduction cannot be corrected and lead to general deterioration of the colour rendition properties of the reproduction system.

It is the object of the invention to establish the conditions for a correct visual-sensitivity-based reproduction (in the following abbreviated vsb reproduction) so that with exception of intentional and objective alterations corresponding image spots of original and reproduction have the same colour valences and under the same viewing conditions are perceived by a person with normal colour vision as being similar in every respect. The task set is based on recognition of the fact that reproductions made from the same original according to different colour rendition procedures can only be meaningfully compared with the original and with each other if this aim is established. Such a comparability of reproductions made according to different procedures—be it on the basis of additive, purely subtractive or mainly subtractive colour mixture, as for example of television monitor reproductions, hard copies, transparencies or printing products—is however always important if statements on the colour rendition in one type of reproduction are supposed to be representative for another type of reproduction. This is particularly important in connection with the production of printed products where, for reasons of working time and saving of expense, customer and printer wish to assess the final colour rendition even before colour separations or proofs are available. Even when an intentional alteration to the overall colour rendition, attainment of a colour cast or objective alteration of details in the colour rendition is desired, a correct vsb reproduction is the most important prerequisite for obtaining the same effect of these measures in reproductions deriving from different colour rendition procedures, for example on a television monitor and in the colour separations and thus in the final colour print.

These prerequisites for a correct vsb reproduction are established in the invention by the proposal of a method for reproduction of originals having, in particular, non-metameric colour composition, where the original in each case is scanned, with respect to its colour content, according to a tristimulus method and after processing of the scanning signals obtained is reproduced, via a colour mixture, by means of a colour rendition system, the method being characterized in that the scanning signals are converted into three primary colour signals, corrected in accordance with visual sensitivity, and that adaptation of the scanning signals or the signals deriving from these to at least one colour rendition system and/or measures to alter the gradation and/or objective measures to alter the colour rendition of individual colours in the overall image or in discrete areas of the image and/or any other further processing of the scanning signals or the signals deriving from these are only carried out after the signals have been converted into the primary colour signals corrected according to visual sensitivity.

Under a "non-metameric colour composition" is to be understood, within the scope of this application, that the colours of the original are composed of three colour components, e.g. are built up via subtractive colour mixing. This means that there are no conditionally like colours in the original. Under the designation "primary colour signal" those signals are understood which correspond to vsb portions in any one primary valence system. Under the designation "colour rendition system" are to be understood, for example, electrical screen systems (Bildschirmsystem), photographic direct-view images, photoelectric hard copies, transparencies, printing processed operating according to the principle of additive colour mixture, such as offset print, and printing processed operating according to the principle of substractive colour mixture or mostly subtractive colour mixture, such as gravure printing, including corresponding preceding stages for the preparation of proofs for example by means of scanner and engraving techniques.

The method according to the invention makes it possible to use an electronic scanning device or camera, which scans the original according to the tristimulus method, to control, simultaneously or consecutively, a multiplicity of different reproductions systems such that the reproductions obtained from them are observed by a viewer with normal colour vision as being the same as the original. This advantage is of particular significance when the method is used in printing systems lately introduced in the printing industry, where the effect of the colour image of the original should first be simulated in print on a television screen, there being at the same time possibilities for controlled correction.

These known devices combine the entire transmission channel and contain a large number of facilities for bending and shifting of characteristic lines, and mixed channels by means of which, without taking into consideration the vsb fundamentals, but in dependence on the colour corrections hitherto undertaken empirically or according to the visual colour matching method, mixing of primary and secondary colours is undertaken. The desired aim to be achieved with these devices, namely to be able to see what the colour effect of a printed image will be without having to carry out the expensive printing process of etching or engraving the printing cylinder right up to starting the printing machine, is not or is only conditionally achieved in this way. The image, subjectively optimal, produced on the screen by a qualified operating technician does give an idea of how the finally printed image will look and also bears a certain correlation to this, thus allowing the operator to say something about the final printing result and if necessary also to take certain objective measures. The desired objectivation, however, is not assured, since the results and the nature of the influencing measures taken differ from one operator to another.

According to a preferred embodiment of the method, primary colour signals, corrected in accordance with visual sensitivity, are stored temporarily before being further processed, so that they can be called arbitrarily from here.

For colour rendition systems with mostly subtractive colour mixture it has proved particularly favorable only to undertake the objective measures after the primary colour signals in the colour rendition system have been converted into colouring material concentration signals or separation density signals adapted to the colour rendition system, as this is similar to the hitherto customary procedure with the so-called matching and the operating personnel do not need to adjust to such an extent on introduction of the method according to the invention.

In the further development of this method the colouring matter concentration signals or separation density signals, varied by means of objective alteration measures, give rise to correspondingly varied primary colour signals. By means of the latter and the remaining, unaltered stored primary colour signals a monitor image is generated, via additive colour mixture, which shows the operator the alterations—effected via the objective alteration measures in the colouring material concentration signals or separation density signals—in the associated reproduction, generated via the mainly sustractive colour mixture of the colour rendition system, of the original.

In this way scanning of matched colour separation plates or engraving of printing plates and the preparation of proof copies can be avoided. When using a television monitor adapted by means of an adaptation matrix, correct vsb images of the original, this having been scanned according to the tristimulus method, can be achieved simultaneously and serve as basis for the undertaking of objective alteration measures in the colour concentration signals or separation density signals.

The primary colour signals, with respect to the original true-to-colour and corrected in accordance with colour sensitivity, are expediently stored in the unchanged form until the monitor image corresponds to the desired reproduction result. Subsequently the new values are stored and serve as basis for the production—for example by means of scanning or corresponding etch-engraving techniques—of the printing plates.

The invention has the further purpose of providing effective and easy-to-carry-out colour analysis and/or colour synthesis procedures, by means of which correct vsb primary colour signals from an original and/or correct vsb reproductions from these can be obtained also with subtractive or mainly subtractive colour mixture, as well as details on suitable devices in this connection.

When reproducing originals by means of a tristimulus procedure with respect to its colour content there are various things which can negatively influence the colour rendition properties. These are, for one, non-rectifiable errors due to the system, which arise during the colour synthesis—as for example, if in the case of an additive colour rendition system, the reproduction should ensue with predetermined primary valence colours to which, in order to copy, it would be necessary to add at least one negative value. A similar situation applies for subtractive colour mixtures if for the reproduction of colours at least one negative colour concentration were necessary. These errors are unavoidable and cannot be corrected by any particular measures. Their influence on the colour rendition properties of a system is, however, usually small, since the number of naturally occurring strongly saturated colours is limited. Besides these errors there are conditionally rectifiable errors, occurring primarily during the colour analysis, which are attributable to the fact that the theoretically necessary spectral channel sensitivities cannot be fully realised at reasonable expense because of the inadequate properties of the optical and optoelectronic elements. If, on the other hand, in order to match the channel sensitivities of the available scanning systems, one is limited to virtual primary valence systems with only positive spectral sensitivity curves, which would in fact provide exact vsb colour value signals, there must be a subsequent matrixing which then determines the colour signals necessary for the receiver primary colours. However, for correct matrixing, especially of the red and the green channels, relatively large negative matrix coefficients are necessary, which are of the same magnitude as the coefficients of the main diagonals. This means that although the colour signals subtract, their non-correlated noise levels add. This leads to deterioration of the signal-to-noise ratio, which likewise cannot be accepted. Since an imperfect colour analysis results in all colours being falsely registered, the colour rendition of the entire system deteriorates, which is not desirable. In comparision here, a third group of errors attributable to non-ideal properties and disturbance effects of the electronic signal processing and transmission does not play any considerable role as these errors can be kept very small by means of special circuitry measures using commercially available equipment. For the desired correct vsb reproductions of originals it is therefore especially important to keep the errors arising due to non-observance of the mathematical interrelationships of colour vision and non-rectifiable errors occurring during colour analysis as small as possible.

In this connection a method is proposed according to the invention whereby three primary colour signals, corrected in accordance with visual sensitivity, are obtained from an original, in particular of non-metameric colour composition, said original being scanned with respect to its colour content in a tristimulus procedure with scanners that are incorrect with regard to visual sensitivity and the scanning signals thus generated being then electronically processed, the method being characterized in that every scanning signal is subjected for purposes of correcting the grey balance to a gradation equalizer and/or in that, for improving the colour rendition properties of chromatic object colours, a linear transformation is carried out with the scanning signals, which may have been gradation-equalized.

The problem of an exact vsb reproduction, where the individual scanning systems would, with regard to their spectral sensitivity, have to correspond to the cones of the human eye so that also conditionally-like colours are seen by a viewer with normal colour vision correctly in accordance with spectral sensitivity, is simplified in most technical reproduction systems where as originals almost exclusively reproductions are used, as such exhibiting no metameric colour composition. This applies for example for film and transparency scanners, as well as the scanning of colour films and photographic direct-view images, which are composed in each case of three colour components by means of subtractive or additive colour mixing. The method according to the invention is especially suitable for these cases.

The gradation equalization used in the method according to the invention must not be confused with the familiar television precorrection for compensating for the non-linearity of the characteristic picture tube curves on the reproduction side. The gradation equalization, also referred to as $\gamma$ correction in this application, is intended to compensate approximately for the non-linearities between the measured and coloured values. This can ensue, for example, by replacing exact characterizing curves by means of suitable interpolation procedures, e.g. Spline interpolation. The gradation equalization can also be undertaken by means of function generators which pre-equalize the colour signals in opposing direction so that non-linearities are compensated for. This procedure is, however, not so expedient, as circuits of this nature have too many adjustment possibilities and the probability of operating errors occurring is increased. The gradation equalization results in a reproduction—of correct luminous intensity and free of colour cast—of achromatic images, thus fulfilling one of the important demands made of reproduction systems, as the human eye recognizes smaller errors better in gray-colour rendition than it does similar errors at chromatic areas.

Improvement of the colour rendition quality of chromatic object colours by means of carrying out a linear transformation of the gradation-equalized scanning signals, i.e. a linear matrixing of the same, is in so far especially favourable that as regards the circuitry this is technically easy to realize and the real spectral sensitivity curves of the scanner can be more effectively matched with the EBU colour mixture curves. One also obtains a first linear approximation of the non-ideal correlation between the falsified scanning signals and the corresponding exact vsb values.

The method according to the invention for obtaining primary colour signals corrected according to colour sensitivity is characterized according to another particularly advantageous development in that before the gradation equalization the scanning signals are subjected to a white balance, and/or that the gradation equalization ensues via exponentiation of the scanning signals with an exponent $\gamma$ value, whose reciprocal is equal to the incline of the transmission characterizing line of the respective uncorrected scanner for achromatic film colours of the original when the transmission characterizing line shows the dependence of the logarithm of the scanner signal's reciprocal on the density of the shade of gray to be reproduced.

When undertaking the white balance, the amplification factors of the individual channels are so determined that the scanning signals are equated as regards size and brought to their maximum permissible value. The $\gamma$ values are in each case dependent on the scanner and the colour composition of the original, in the case of a film being scanned, on the combination scanner/film. As a result of employing the aforementioned, particularly simple gradation equalization, the colour rendition quality of achromatic colours is rendered almost ideal, without the colour rendition quality of chromatic colours being influenced by these measures. The exponent, i.e. the $\gamma$ values, can be experimentally determined by using a wedge filter with at least three—black, white and a middle gray—achromatic points in the original to be scanned. If the data for the material used as original is known, the exponents, i.e. the $\gamma$ values, are preferably calculated from the spectral data of the respective scanner and the colouring matter of the original.

In order to keep the signal-to-noise ratio in the matrix circuit effecting the linear transformation for improving the colour rendition quality of chromatic object colours small, care is taken when determining the matrix coefficients that no negative coefficients greater than about three times the value of the main diagonal are permitted. It has proved especially expedient if, for the matrix effecting the linear transformations, matrix coefficients for certain given colours are optimized. It can be shown that the optimal matrix coefficients are independent of the spectral properties of the original. They are influenced, however, in a certain way by the choice of test colours, which are preferably chosen such that the most important colours in the reproduction are rendered correctly. Choice of these colours depends on the case in question. It is expedient if the matrix coefficients are determined such that the spectral sensitivity curves of the scanners are approximated as well as possible to correct vsb colour mixture curves for additive primary valences, for example to the EBU curves or corresponding other curves. Care is expediently taken that the sum of the squares of the differences between theoretical and actual curves is minimal wavelength for wavelength. An evaluation function of this nature is expedient in tristimulus measuring equipment and in electronic colour television cameras because the spectral reflection and transmission properties of the colours to be analyzed here are unknown.

Optimization of the matrix coefficients is undertaken according to another especially advantageous embodiment of the method for at least three subtractive fundamental colours, preferably of equal visual brightness, and three secondary colours of the first order formed from them. This already results in considerable improvement of the colour rendition quality. If the number of given colours is raised, the quality of the colour correction is also improved and the dependency on the colour chosen in each case decreases. It is expedient if each film testing colour set has a series of grey shades, a series of test colours according to German Standards DIN 6169, and various different skin colours. Film testing colour sets having eight grey shades with densities $D_{min}=0.35$ and $D_{max}=2.1$, 17 test colours according to DIN 6169 and six different skin colours have proved especially good.

It has been shown that if the choice of reference colours is carried out carefully, eight such colours are quite adequate for the optimization.

It is advantageous if, for the optimization of the matrix coefficients, the mean colour rendition index is determined and optimized and the optimization is carried out by means of an evolution strategy. This can be done experimentally by means of the reference colours carefully chosen in the aforementioned manner. On account of the large number of tests it is, however, simpler to carry out the optimization with a computer if the spectral sensitivities of the system are known. An especially suitable means for carrying out the procedure of obtaining the primary colour signals, corrected in accordance with visual sensitivity, consists in providing a $\gamma$ correction circuit in each output lead for the scanning signals of a tristimulus scanning device and connecting up a matrix circuit at the outputs of the $\gamma$ correction circuits. The advantage of this $\gamma$ correction circuit compared with other function generators is that for each channel there is only one adjusting possibility with which the necessary exponent, i.e. the $\gamma$ value, is set.

Apart from use in colour analysis of reproduction systems, the corrective measures described can also be used to improve the absolute measuring accuracy of colour-measuring instruments according to the tristimulus method. Especially densitometers, which due to non-observance of the Luther condition may not be classed with colorimetry equipment, can be turned into simple colour-measuring instruments with these corrective measures.

Whilst the preceding explanations were concerned with colour analysis, the following deals with special colour synthesis methods where with subtractive or mainly subtractive colour mixtures a correct vsb reproduction is also obtained. If, when scanning according to the tristimulus method, three primary colour signals corrected in accordance with visual sensitivity are obtained by means of suitable scanning units or by means of signal processing—for example according to the methods described—correct vsb reproductions can be obtained without any special difficulty, via colour rendition systems which operate according to the principle of additive colour mixture. For this, it is normally only necessary to use suitable adaptation circuits by means of which the system of primary valences used for the analysis is adapted to the system of primary valences used in the colour rendition system. If, on the other hand, starting with the primary colour signals corrected in accordance with visual sensitivity an exact vsb rendition is to be effected with help of colour rendition systems which operate according to the principle of subtractive colour mixture, it is necessary to determine for the colour valences of the original's colours or for the corresponding primary colours, corrected in accordance with visual sensitivity, those concentrations which in subtractive mixture lead to the same colour valences with the given colouring material system. Since the integral equation system describing this assignment cannot be solved in mathematically closed form according to the concentrations, approximation solutions must be found which, for one, fulfil to a large extent the requirement for exact vsb colour rendition and for the other, are technically easy to handle with respect to the circuitry.

For determining the concentrations of the colouring material there are different possibilities:

(a) a purely computational iteration procedure;
(b) looking up in a colour chart and corresponding interpolation;
(c) starting with a model for approximate determination of the colouring material concentrations.

The determination of colouring material concentrations by means of iteration is known. For theoretical investigations it is possible to determine the concentrations for given colour valences with adequate accuracy using rapidly-converging methods of this nature. The disadvantage of this otherwise useful method is that in the case of colour mixtures which are not purely subtractive but only predominantly subtractive, as for example with gravure printing, the iteratively calculated concentrations are only approximation values.

Determination of the colouring material concentrations by means of a search-and-interpolation process with a colour chart or atlas, i.e. a systematic colour collection based on the colour mixing process of the underlying reproduction system, at first appears promising as the characterization of each colour contained in the collection is determined on one hand by means of vsb sizes and on the other hand by means of the concentrations of the colours used or, in the printing process, the so-called colour separation densities. For an original's colour, whose vsb sizes are known on the basis of the analysis, for example on the basis of the previously-described determination of the primary colour signals, that colour in the colour chart is chosen which looks the most similar. This decision can be made visually or by computation through minimizing the so-called colour spacing. The system magnitudes, i.e. the colour concentrations or the colour separation densities, for these most similar colours are then known. If, however, higher demands for accuracy are set, an interpolation with the adjacent colours of the chart must be carried out. This is, however, extremely difficult, since the "colour space" formed via the concentrations or colour separation densities is in close non-linear relation to the colour space established via the primary valencies. In order to obtain adequately accurate results with the interpolation the colour chart must exhibit an extremely fine breakdown. A further disadvantage is that if a colouring material is exchanged, the entire colour collection must be prepared anew and must also be measured again in accordance with visual sensitivity. In spite of this, matching in gravure printing is still today carried out mainly according to this procedure, although even with a practised team there are considerable spreads of selected colour concentrations or colour separation densities. For reasons of these problems another method is proposed in the present invention for determining the concentrations of colouring materials or signals corresponding to these concentrations for a colour rendition system based mainly or completely on a subtractive colour mixture, that from three primary colour values or primary colour signals provides a correct vsb reproduction.

The method is characterized by the following steps: conversion of the primary colour signals into colour signals adapted to the basic colouring materials of the rendition system with replacement of the spectral density distribution of the individual basic colouring materials of the colour rendition system by optimal colour-like model colouring materials without secondary densities and assigned to different wavelength ranges, conversion of the thus-obtained colour signals into corresponding colour density signals, and conversion of the colour density signals into model colouring material concentration signals with replacement of the colour densities of the optimal colour-like model colouring materials, without secondary densities, in the individual wavelength ranges by optimal colour-like model colouring materials that each have a main and two secondary densities which are constant over the respective partial wavelength range and of which in each case one is assigned by approximation to the density of the three basic colouring materials.

Under the basic colouring materials of the rendition system the three colouring materials are understood by means of which, via subtractive colour mixture or mainly subtractive colour mixture, the reproduction is made. Under replacement of the spectral density distributions of the individual basic colouring materials of the colour rendition system by three optimal colour-like model colouring materials without secondary densities and assigned to different wavelength ranges is to be understood that the visual spectrum is broken down into three wavelength ranges corresponding approximately to the colours red, yellow and blue, and the spectral density distributions of the individual basic colouring material are assigned a constant value in that range where their maximum is, and in the other wavelength ranges are equated zero. This measure, i.e. replacing the spectral density distributions by optimal colour-like model colouring materials without secondary densities, corresponds to a transformation of the colour space defined by the primary colour signals into a colour space corresponding to the valences of the basic colouring materials. The colour signals corresponding to these colour values are subsequently converted into colour density signals, which means that the negative logarithm of every colour signal is formed. Since the real basic colouring materials of the rendition system are effective not only in their main absorption ranges but also have undesired absorptions in the other spectral areas, the model colouring materials are given so-called secondary densities, which means that in the wavelength ranges in which their amplitude with the model colouring materials without secondary densities was equated zero they are assigned finite but constant values. Thus in the individual wavelength ranges the main and the secondary effects of all three model colouring materials are effective and if the concentrations of one of the model colouring materials is altered not only the share of its primary valence is changed but also, because of its secondary effect in the two other spectral areas, also the primary valences there. If at the same time the colour density signals are transformed into model colouring material concentration signals, the limits of the three wavelength ranges are suitably chosen and the amplitude ratio of the model colouring materials is suitable, one obtains signals corresponding in good approximation to the desired colouring material concentrations.

According to a particularly preferred embodiment of the method the transformation of the primary colour signals into colour value signals and the conversion of the colour density signals into model colouring material concentration signals ensues via two linear transformations of these signals, the matrix coefficients of the first linear transformation $M_1$ being determined by the choice of wavelength range limits and the matrix coefficients of the second linear transformation $M_2$ being determined by the ratio of main and secondary densities of the model colouring material in the individual wavelength ranges for the respective colour rendition system. This can, for example, be done experimentally by testing, and the quality of the result can be checked, for example, on the basis of the data laid down in the colour charts for the associated basic colouring materials.

In a further development of the invention it is advantageous if every model colouring material concentration signal is varied according to a characteristic which is laid down such that primary colour signals corresponding to gray scale values lead to colouring material concentration signals that generate the same gray scale values in the respective colour rendition system. These characteristic curves are straight lines in colour rendition systems that are based on purely subtractive colour mixture. In colour rendition systems that only approximately obey the mathematical interrelationships of subtractive colour mixture, as for example gravure printing, these characteristic curves are non-linear and more complicated.

If gravure printing is used as colour rendition system, it is expedient to convert the model colouring material concentration signals or the colouring material concentration signals into corresponding separation density signals. The model colouring material concentration signals or the colouring material concentration signals or the colour separation density signals are preferably subjected to a linear transformation by means of a correction matrix $M_3$ whose coefficients are determined such that the fundamental colours established by the primary colouring materials of the colour rendition system, and/or the secondary colours of first order from these, are rendered true-to-colour. Under the designation "fundamental colours" are understood here the colours which can be produced with one of each of the basic colouring materials in varied concentration or colour separation density. The coefficients of the matrices are preferably determined via an optimization strategy for prescribed colour values. The initial state of matrices $M_1$, $M_2$ and/or $M_3$ can be chosen arbitrarily at the start of the optimization. If only matrices $M_1$ and $M_2$ are to be optimized there are 18 degrees of freedom involved; if matrix $M_3$ is also to be simultaneously optimized, there are 27 degrees of freedom involved. After laying down a series of prescribed colour values as reference colours, an evaluation function for the optimization is laid down, this consisting for example in that the mean quadratic difference between the real and model densities assumes a minimum for the various fundamental colours. Another possibility is to let the colour rendition index head for a maximum; for the colour rendition index one can use, for example, the formula laid down in DIN 6169. As this is empirically obtained, like all other common colour rendition index formulae, differences occur between the various results depending on which of these colour rendition indices one uses as basis. For optimizing the matrix coefficients themselves, it is preferable to use an evolution strategy, since it allows any secondary maximums which might possibly be included during the optimization to be abandoned again. The optimization is expediently carried out for at least three subtractive primary colours, preferably of the same visual brightness, and three secondary colours of first order obtained from these. Since the optimization result is influenced not inconsiderably by the choice of these colours, it is expedient to use a large number of reference colours that are to some extent uniformly distributed in colour space.

The separation density signals obtained are advantageously compared with electronically stored separation densities of discrete secondary colours of the colour rendition system (catalogue colours); it is expedient to undertake a linear interpolation between the established separation density signals and the nearest separation densities of the catalogue colours. The interpolation leads here to accurate results, since the model concentrations and the concentrations of the real colouring material system form two "colour spaces" only slightly distorted with respect to one another. This means that the number of colours to be stored, i.e. the scope of the catalogue colours, can also be kept small. In the colour chart the visual sensitivity sizes are replaced by the model concentrations, as a result of which, first and foremost, the interpolation algorithm to be used is considerably simplified. This solution is especially suitable for gravure printing, which does not obey the mathematical interrelationships of subtractive colour mixture exactly. The additional errors contained in the model concentrations and due to the deviation in the colour mixture can be minimized, together with the errors occurring principally due to use of the model, by means of the subsequent interpolation in the largely linearized chart.

The invention also proposes a device which serves for determining signals, corresponding to colouring material concentrations, of a colour rendition system composed of three primary colour signals and based mainly on a subtractive colour mixture, and which is especially suitable for carrying out the previsouly described method. This device is characterized by a first matrix circuit for transforming the primary colour signals into colour signals adapted to the primary colouring materials of the colour rendition system, the matrix coefficients of the matrix circuit being determined in that the spectral density distributions of the individual primary colouring materials of the colour rendition system are replaced by three optimal colour-like model colouring materials without secondary densities and assigned to different wavelength ranges, by logarithmizing circuits, connected at the outputs for the colour signals of the first matrix circuit, for transforming the colour signals into corresponding colour density signals, and by a second matrix circuit for transforming the colour density signals into colouring material concentration signals, the matrix coefficients of the second matrix circuit being determined in that the colour densities of the optimal colour-like model colouring material, without secondary densities, of the individual partial wavelength ranges are replaced by optimal colour-like model colouring materials which have a main and secondary densities constant over the respective partial wavelength range, the main and the two secondary densities being assigned in approximation to the densities of the three primary colouring materials in the corresponding wavelength range.

The matrix coefficients of the first matrix circuit are preferably determined by the choice of limits for the partial wavelength ranges, those of the second matrix circuit by the ratio of main to secondary densities of the model colouring materials in the individual partial wavelength ranges for the respective colour rendition system.

It is expedient to provide a circuit at the outputs for each model colouring material concentration signal of the second matrix circuit, which varies the incoming signal according to a prescribed characteristic curve that is laid down such that primary colour signals corresponding to gray scale values are converted into colouring material signals which generate gray scale values in the respective colour rendition system. If gravure printing is used as colour rendition system, it is preferable to make use of a supplemented circuit which converts the model colouring material concentration signals or colouring concentration signals into corresponding separation density signals, these being more familiar to the technician.

According to a further embodiment of the invention, the device contains a third matrix circuit to which the separation density signals can be supplied, the matrix coefficients of the third matrix circuit being determined such that the fundamental colours laid down by each basic colouring material are rendered as true-to-colour as possible.

In colour rendition systems with purely subtractive colour mixture the second and the third matrix circuits can be combined as a common matrix circuit.

When used in gravure printing it is also of advantage if the device has a memory in which the separation densities of catalogue colours for the respective colour rendition system are stored, a comparator circuit comparing the determined model densities with the catalogue colours and an interpolation circuit carrying out an interpolation between the nearest catalogue colour and the determined separation densities.

The previously-described device is also suitable for the formation of a print simulator with the help of a monitor working according to the principle of additive colour mixing, for example a television screen, which is connected at the inputs for primary colour signals of the first matrix circuit. In the monitor itself there is a further matrix circuit which undertakes a transformation of the vsb colour signals of the freely selectable reference system into corresponding colour signals of the primary valence system of the monitor. When used as print simulator, the various circuitry components run in reverse sequence before the signal, so that from separation density signals primary colour signals are generated.

The accompanying drawings serve for further explanation of the invention.

Figure 7:
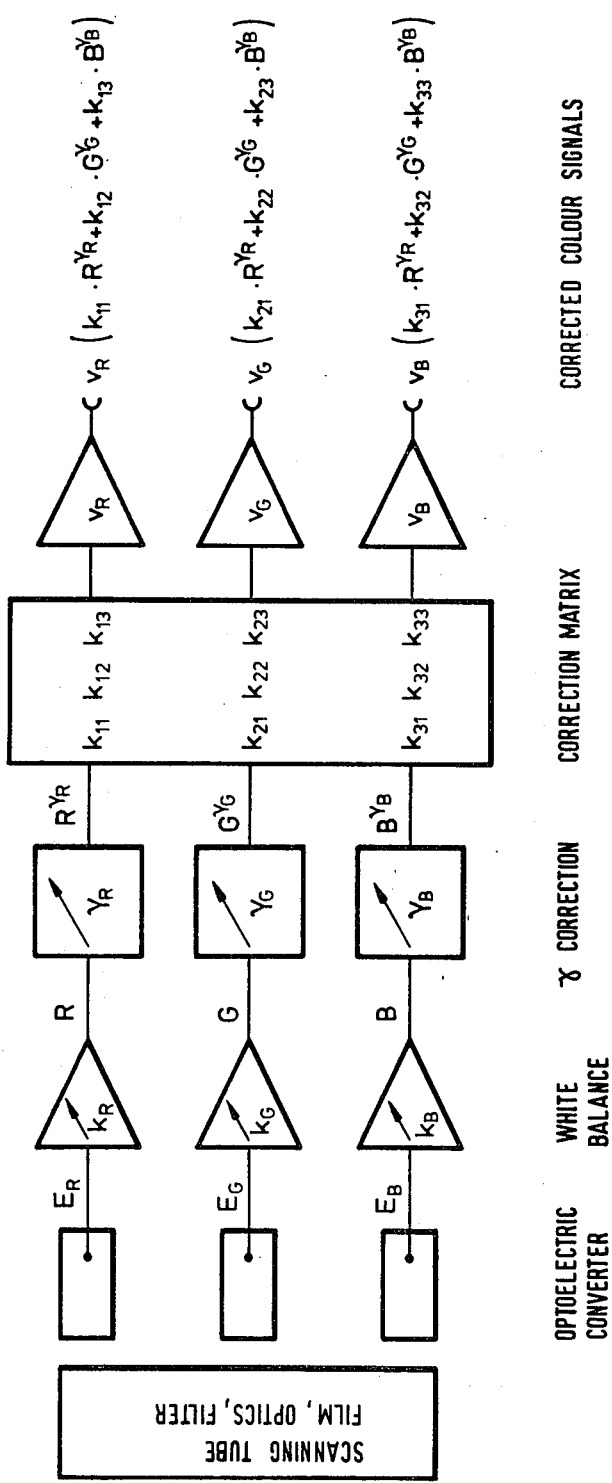
FIG. 7 shows a simplified block diagram of a film scanner with $\gamma$ correction and corrective matrix circuit.
Figure 7:
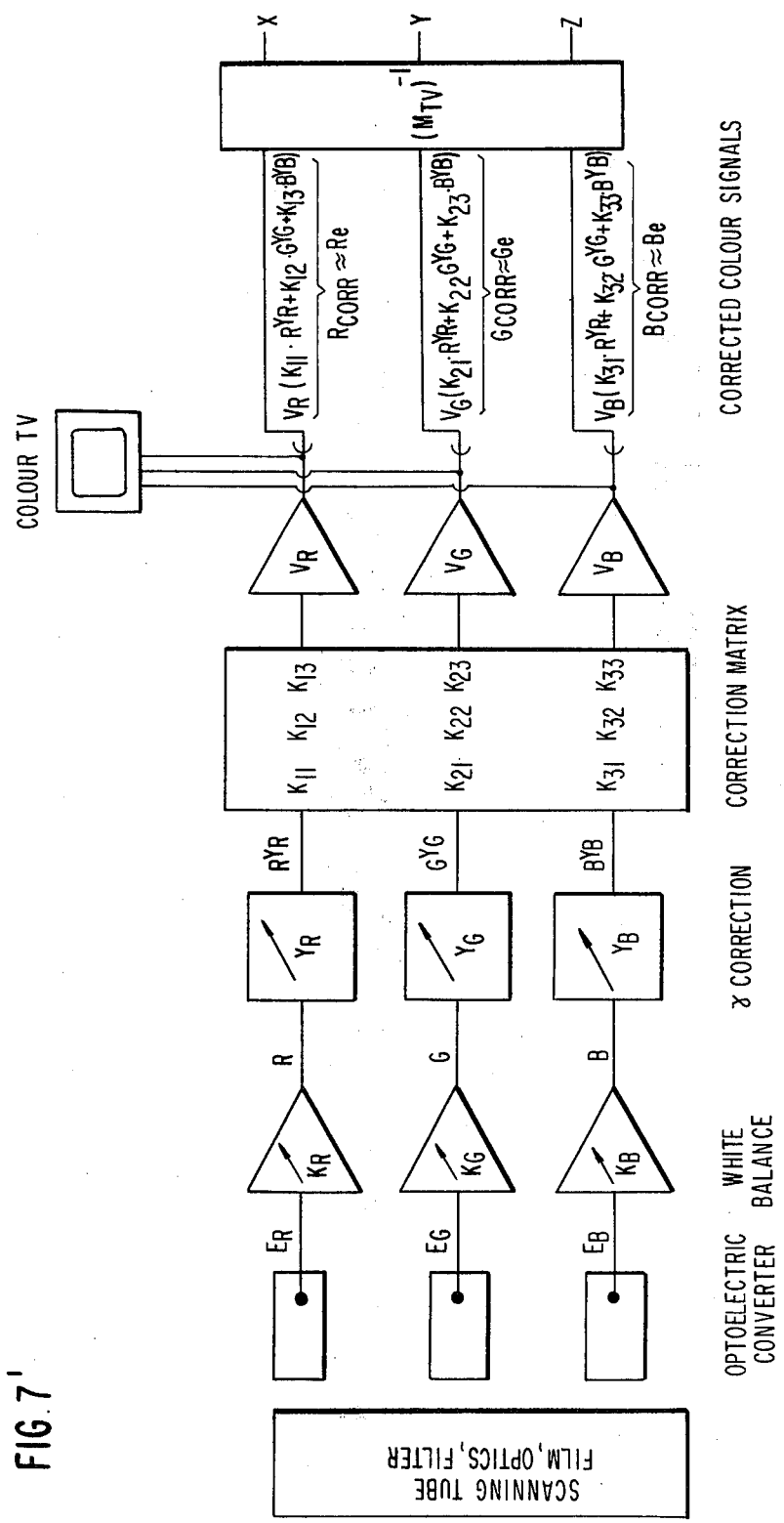
Figure 8:
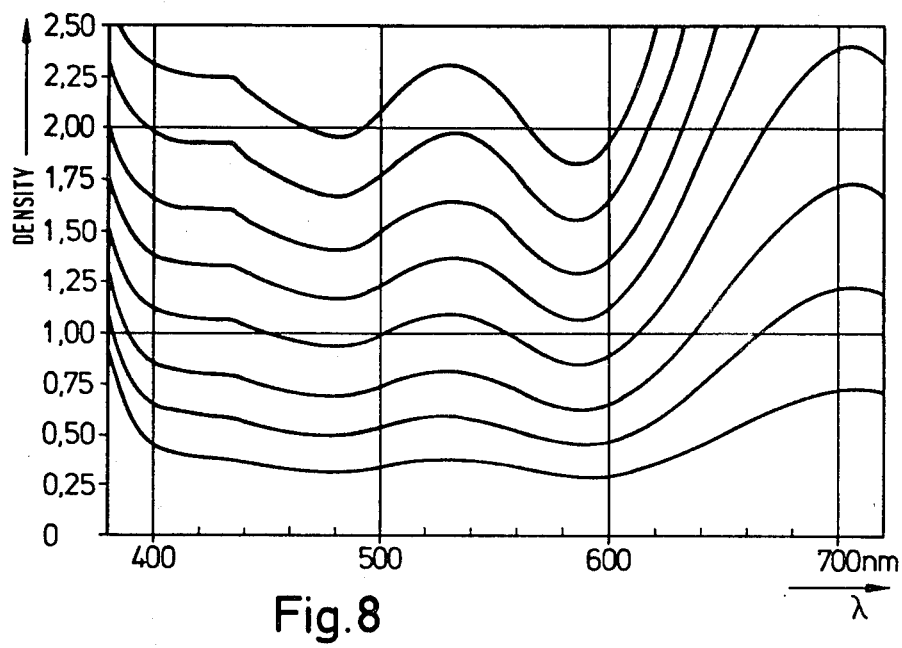
Figure 9:
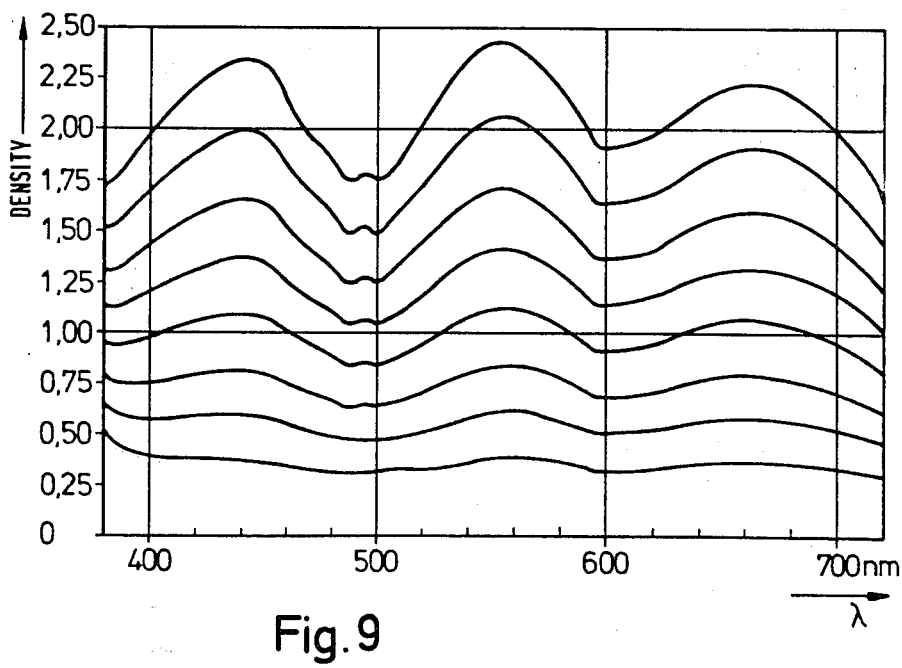
Figure 10:
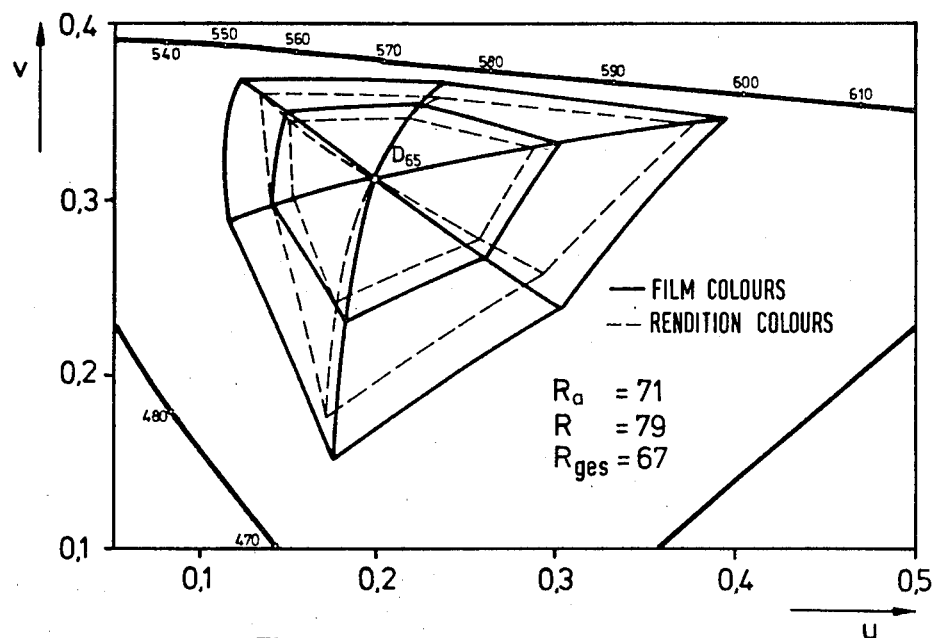
Figure 11:
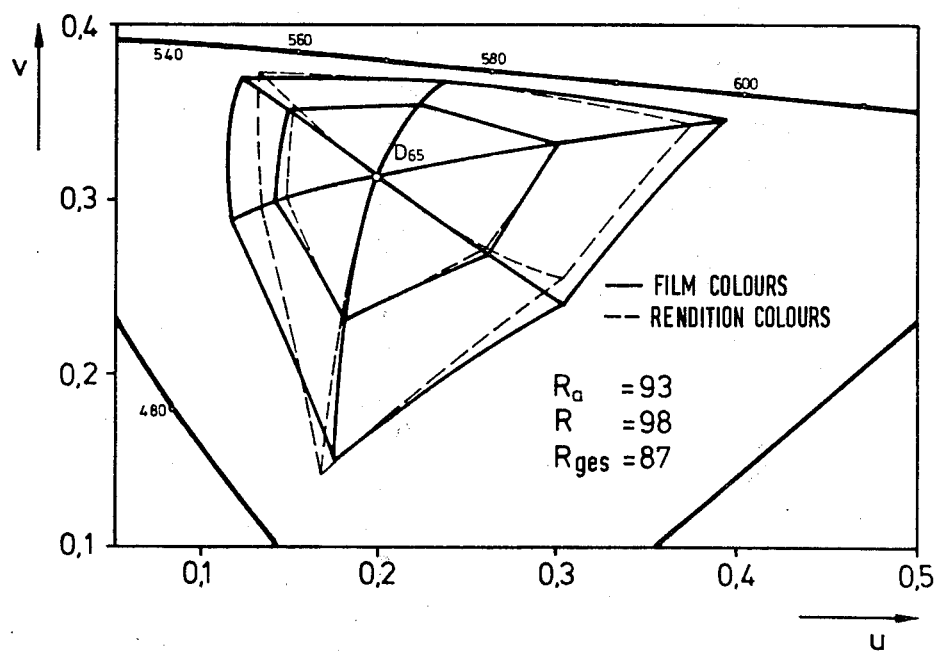
Figure 12:
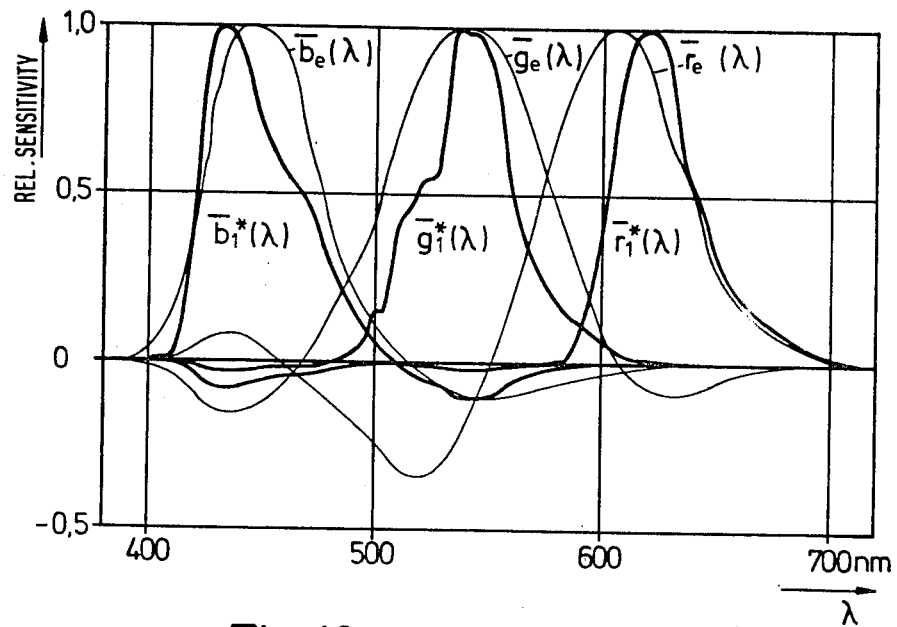
Figure 13:
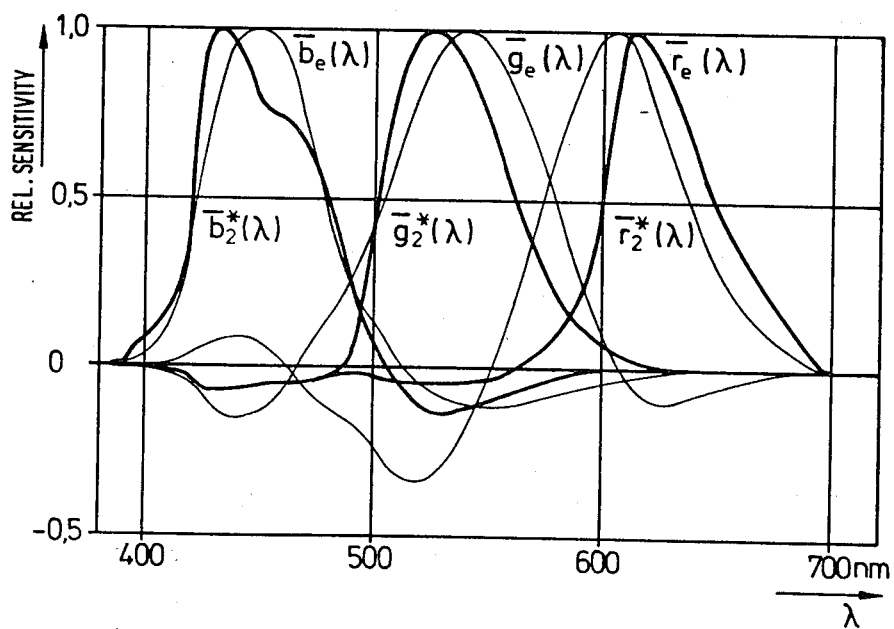
Figure 14:
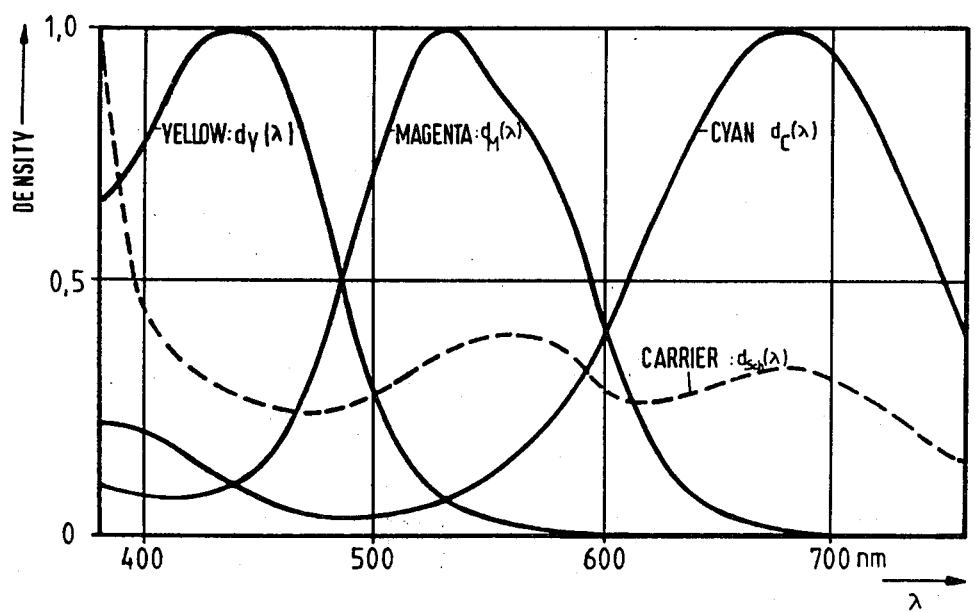
Figure 15:
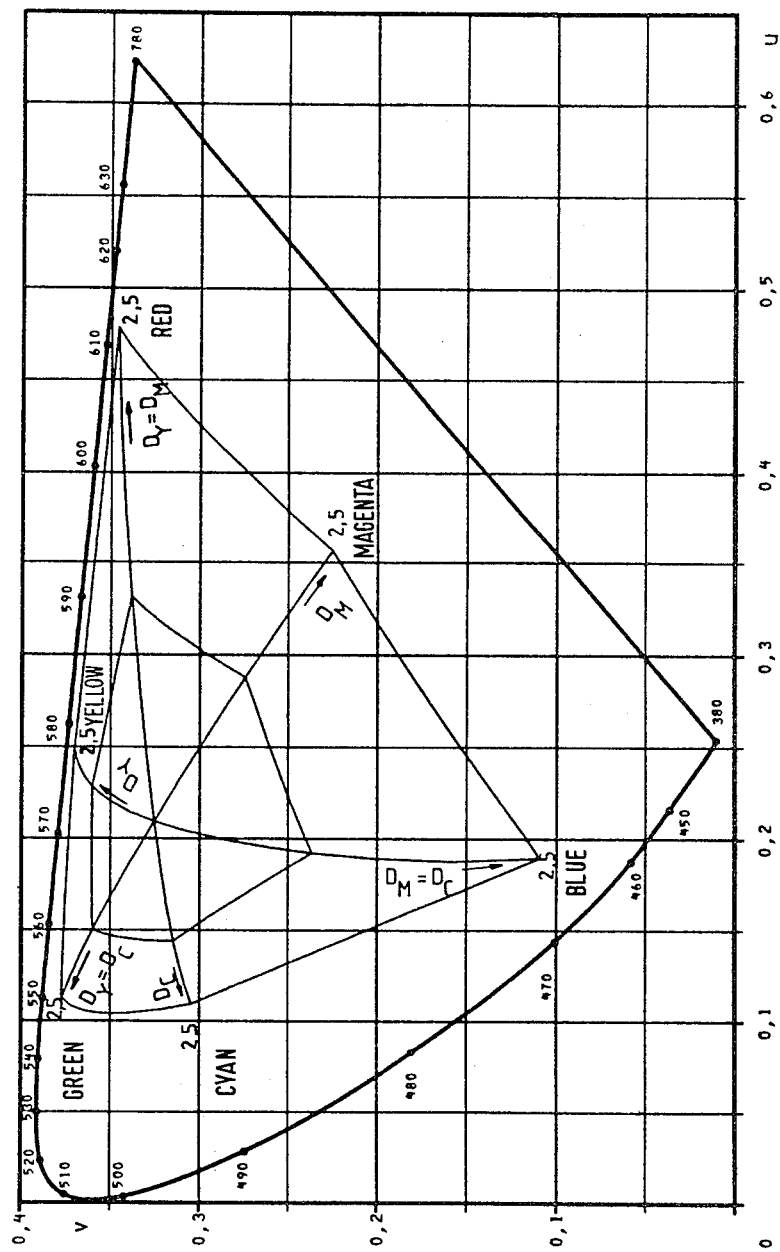
Figure 16:
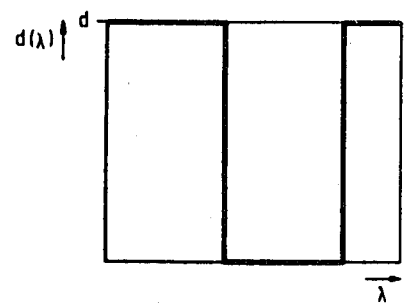
Figure 16:
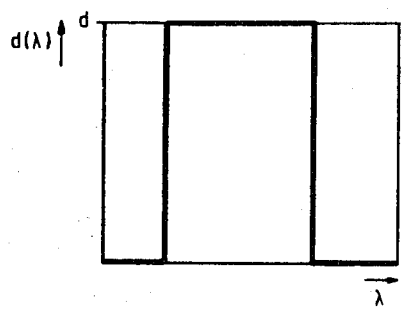
Figure 16:
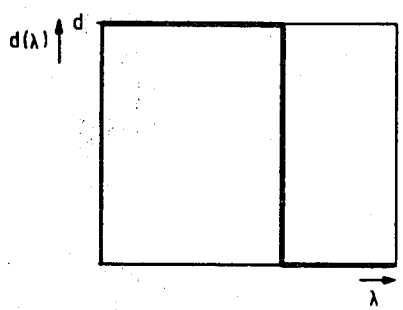
Figure 16:
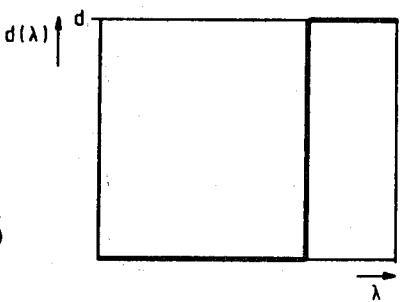
Figure 17:
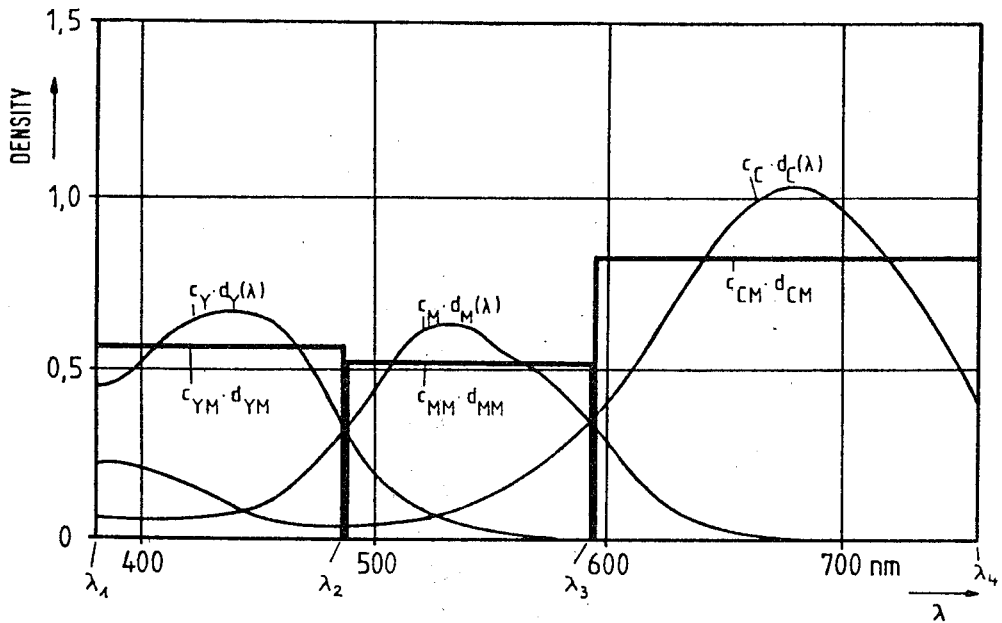
Figure 18:
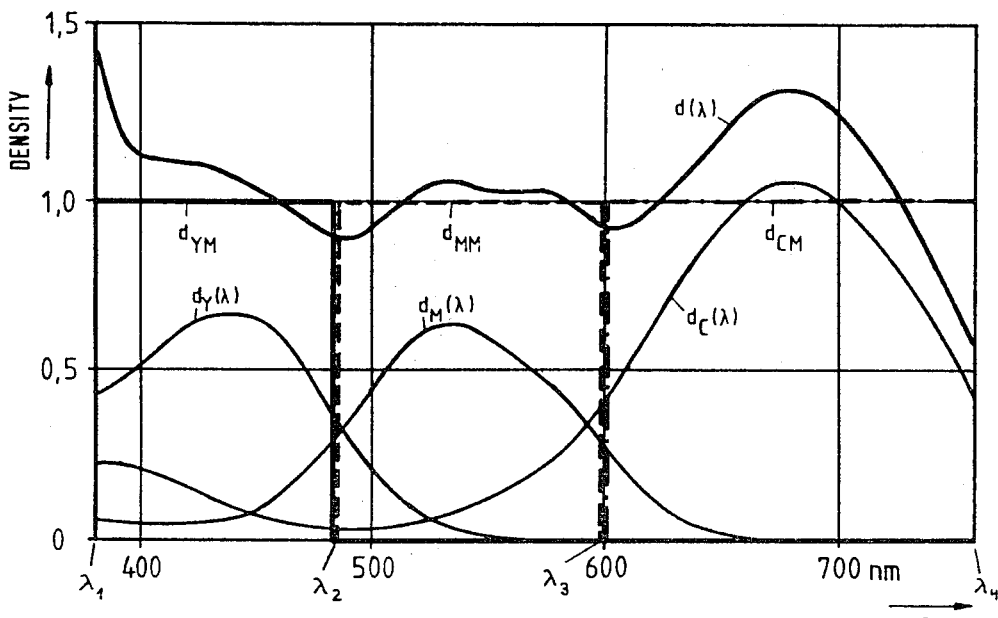
Figure 19:
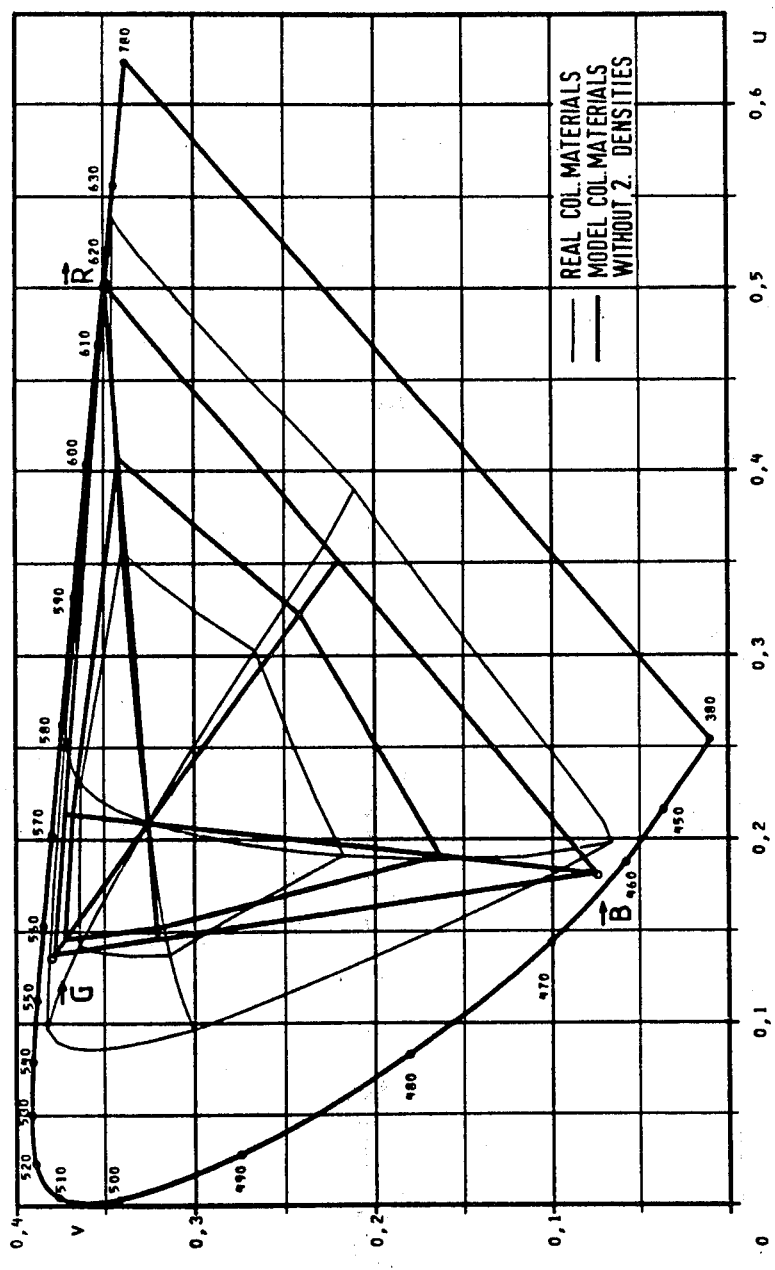
Figure 20:
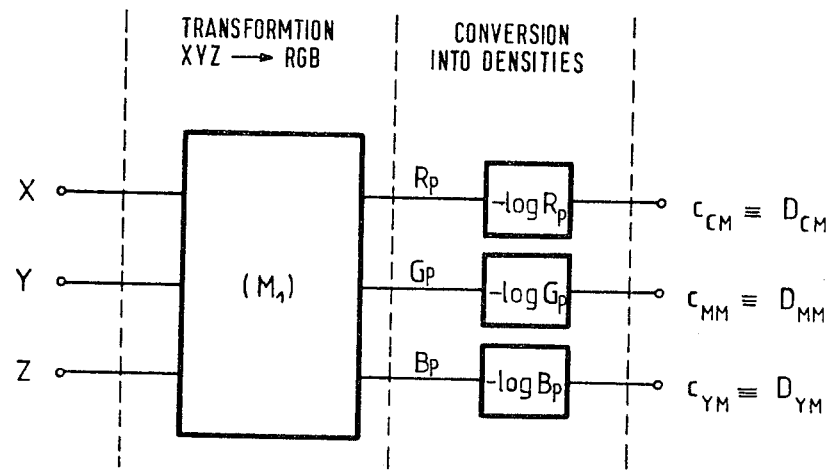
Figure 21:
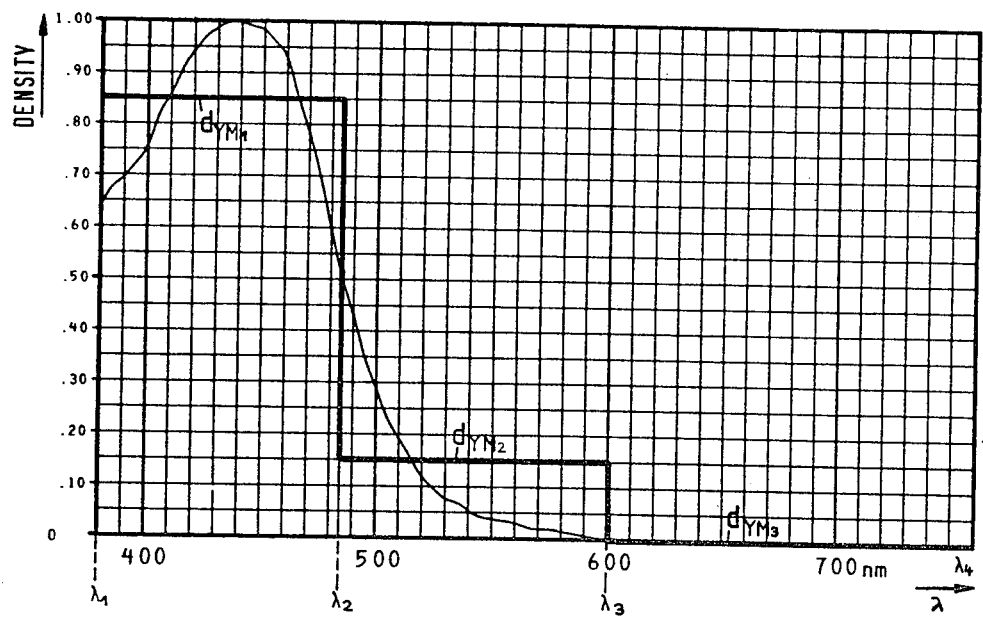
Figure 22:
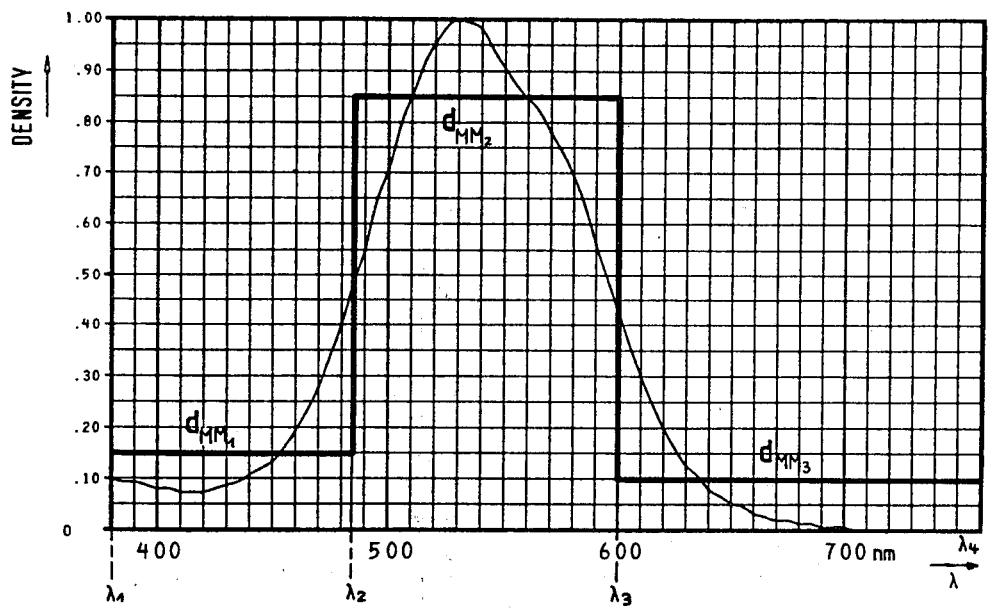
Figure 23:
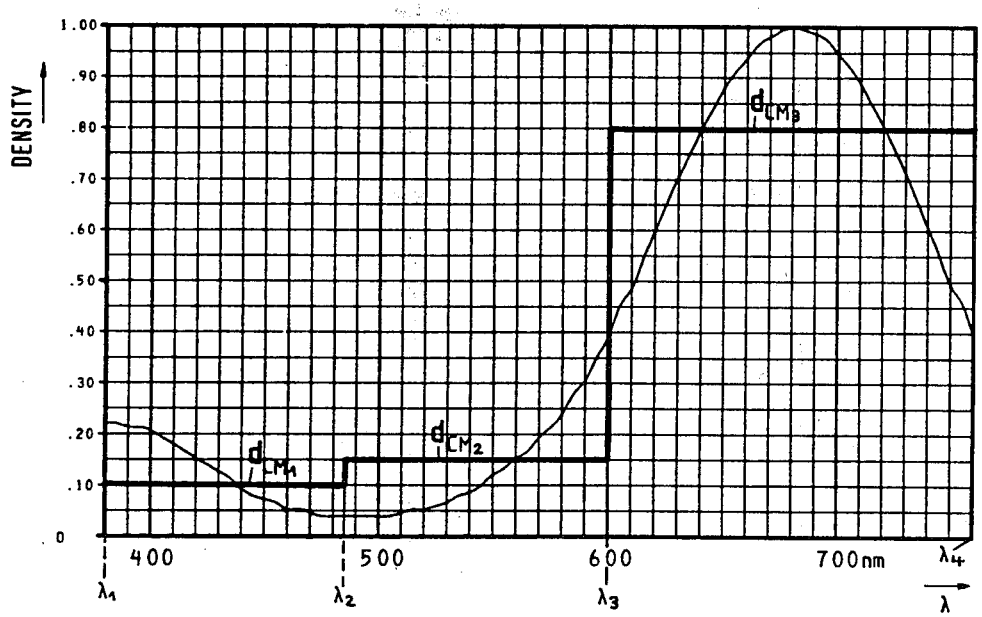
Figure 24:
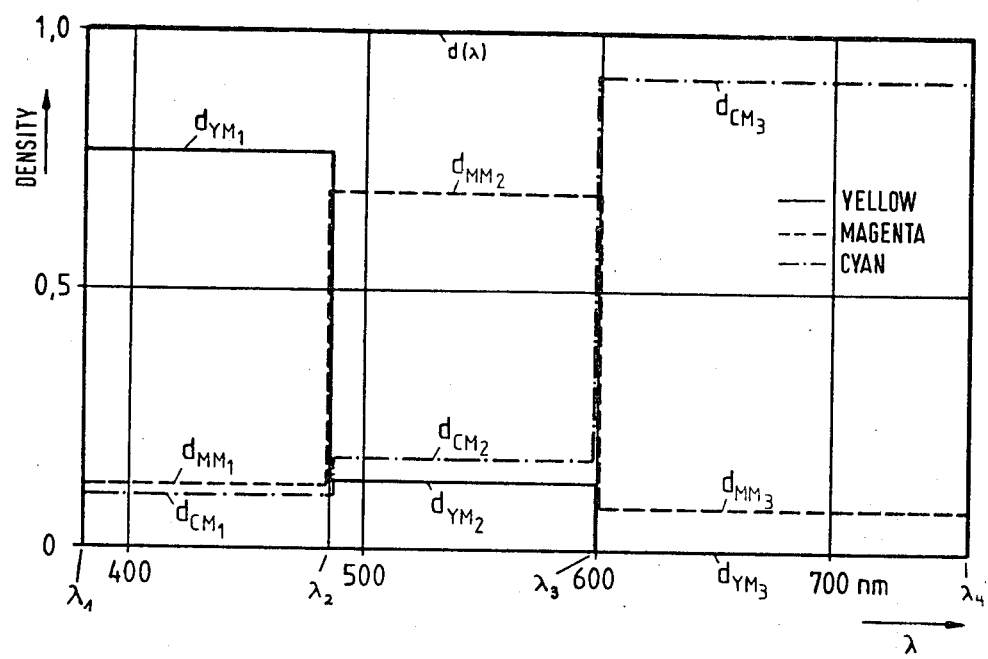
Figure 25:
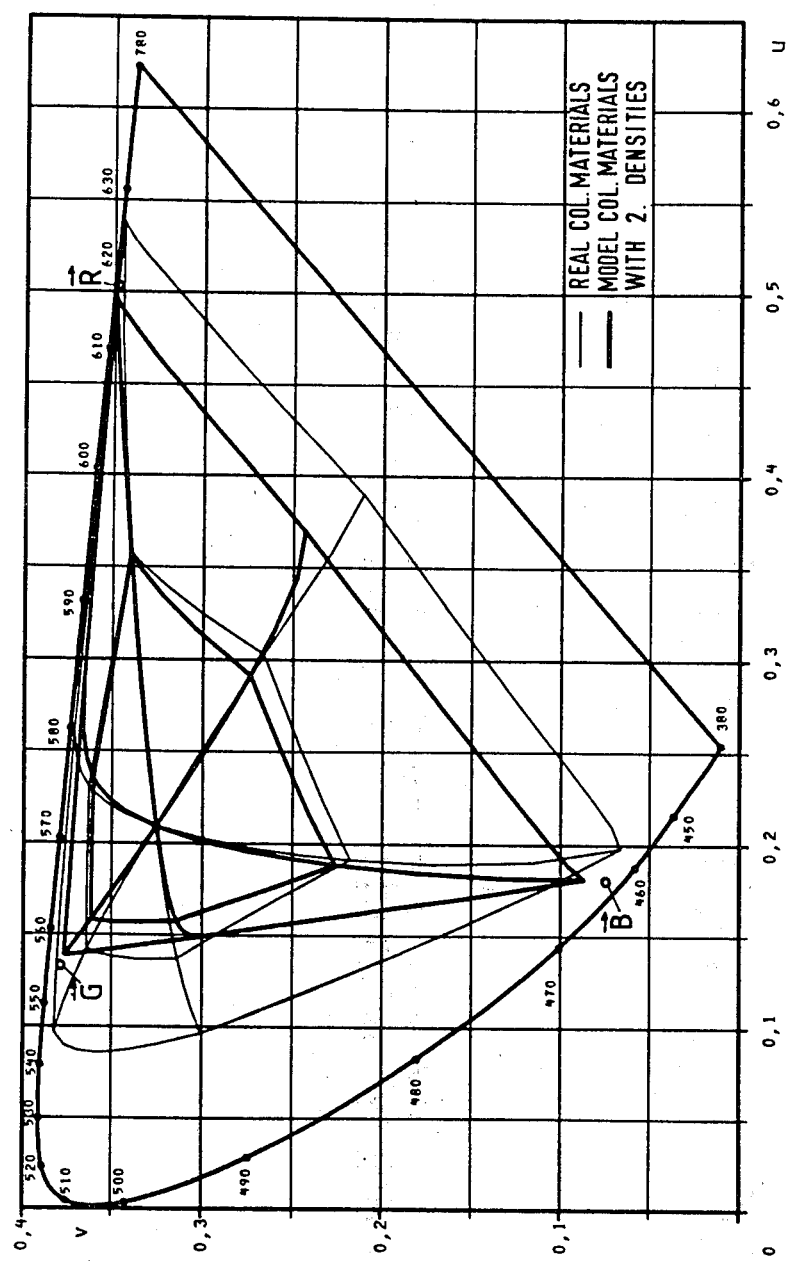
Figure 26:
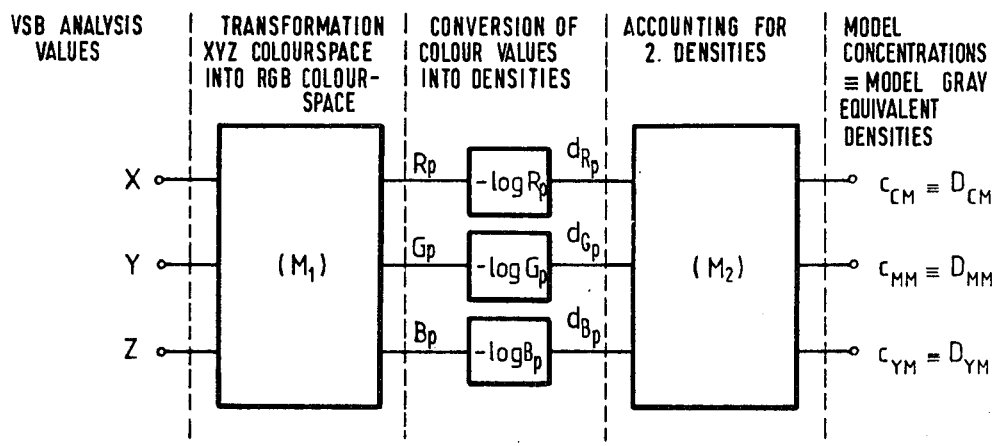
Figure 27:
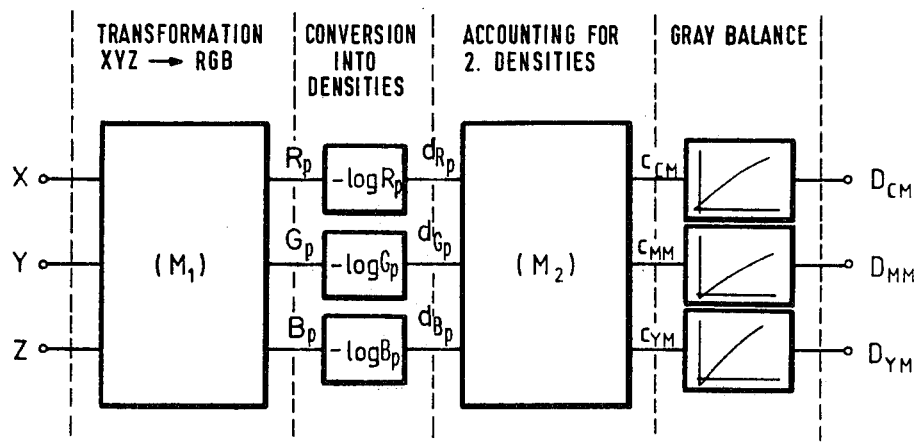
Figure 28:
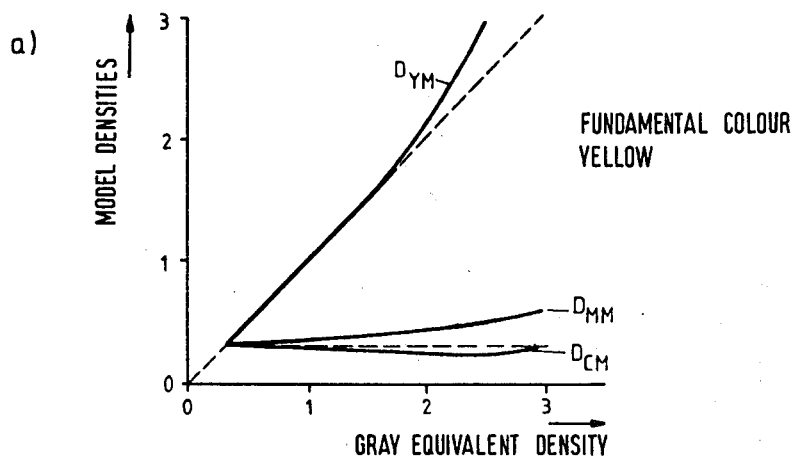
Figure 29:
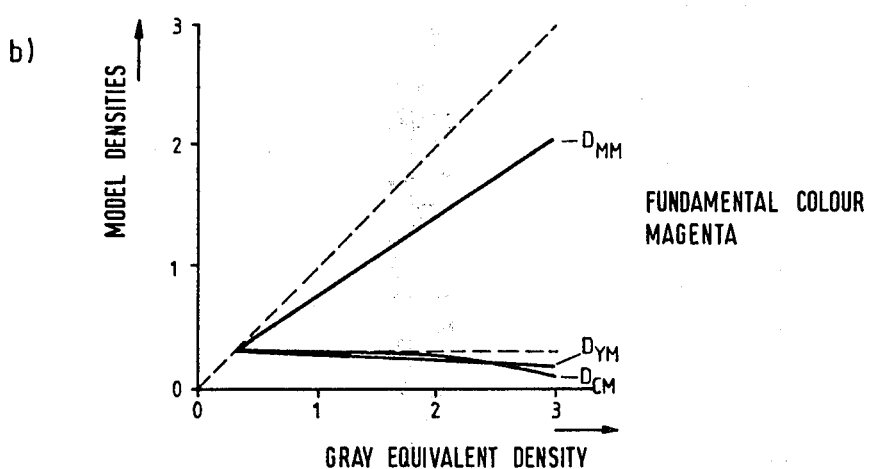
Figure 30:
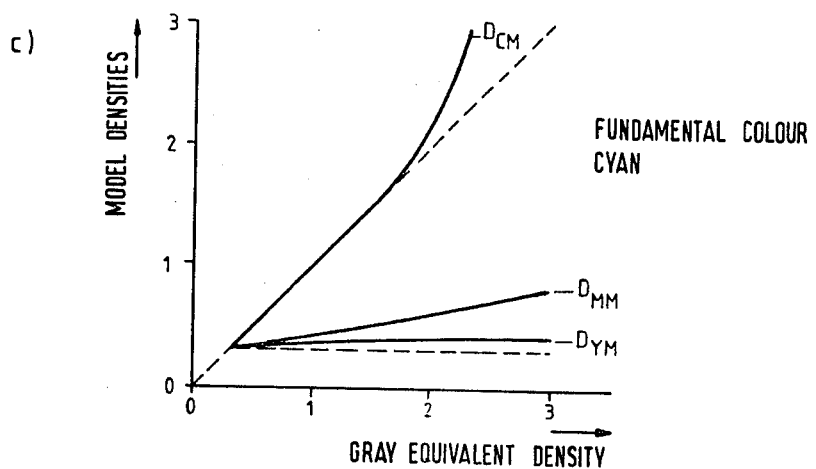
Figure 31:
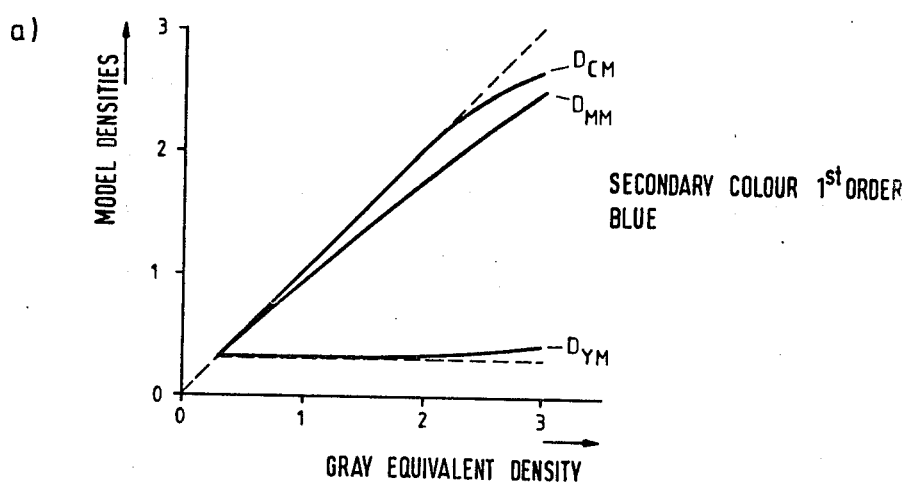
Figure 32:
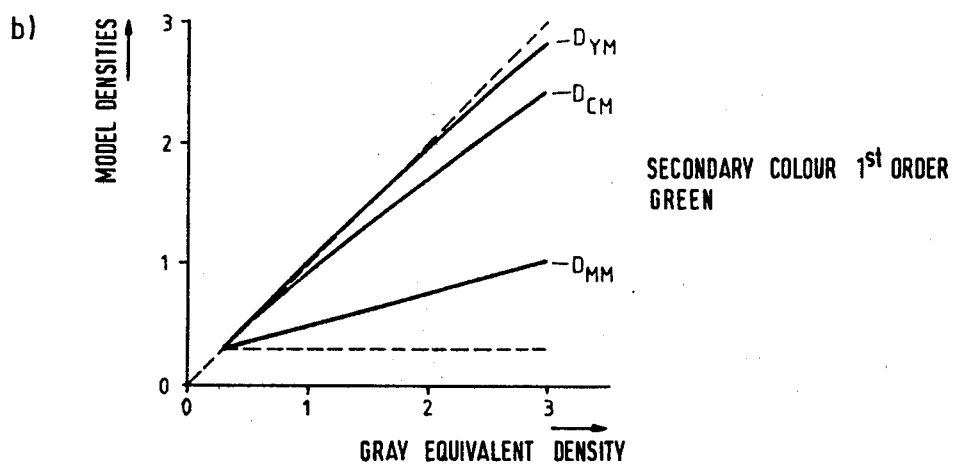
Figure 33:
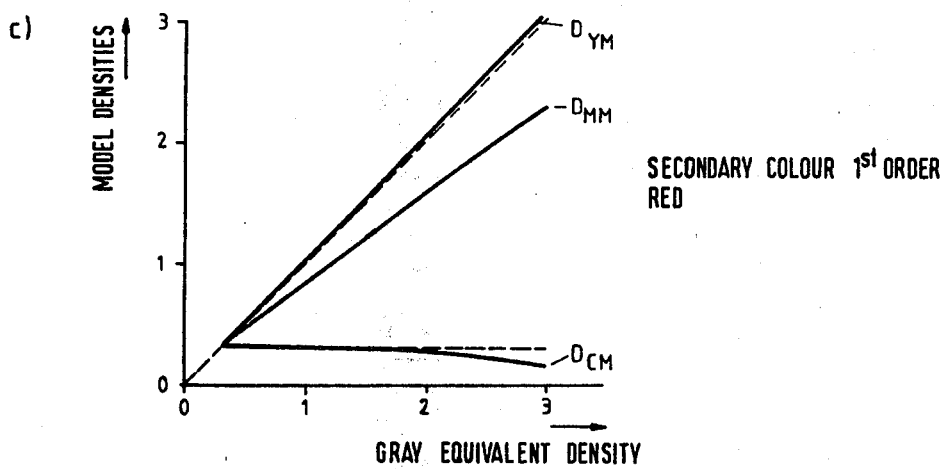
Figure 34:
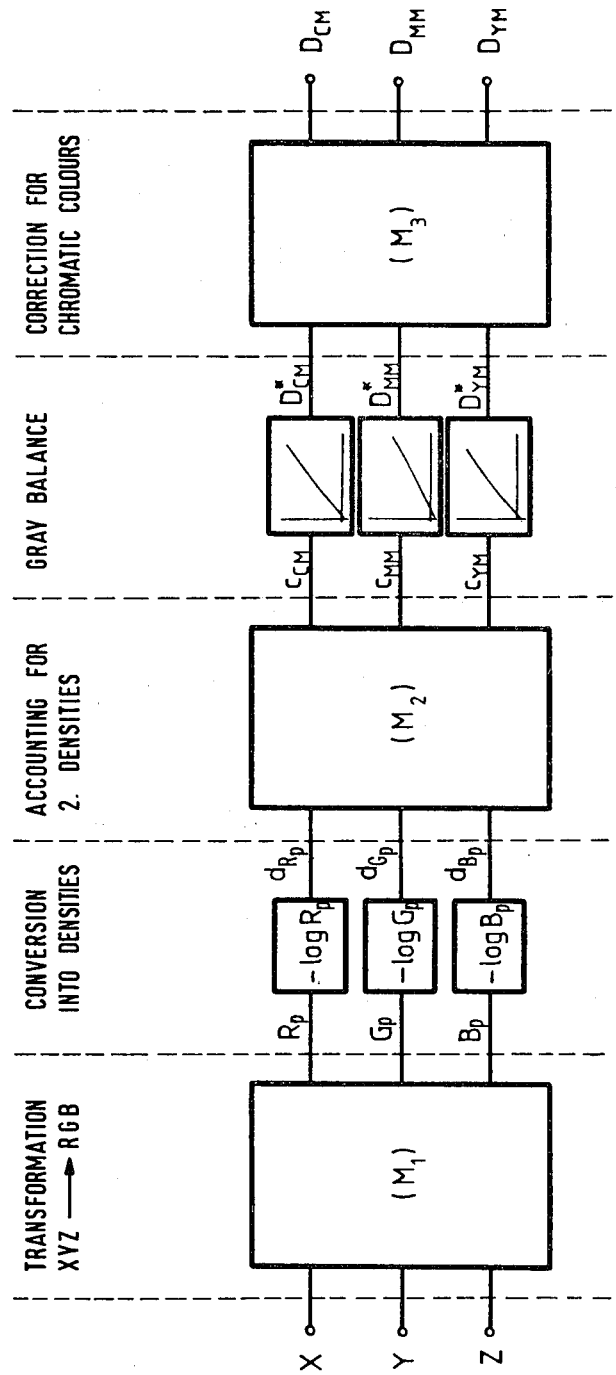
Figure 35:
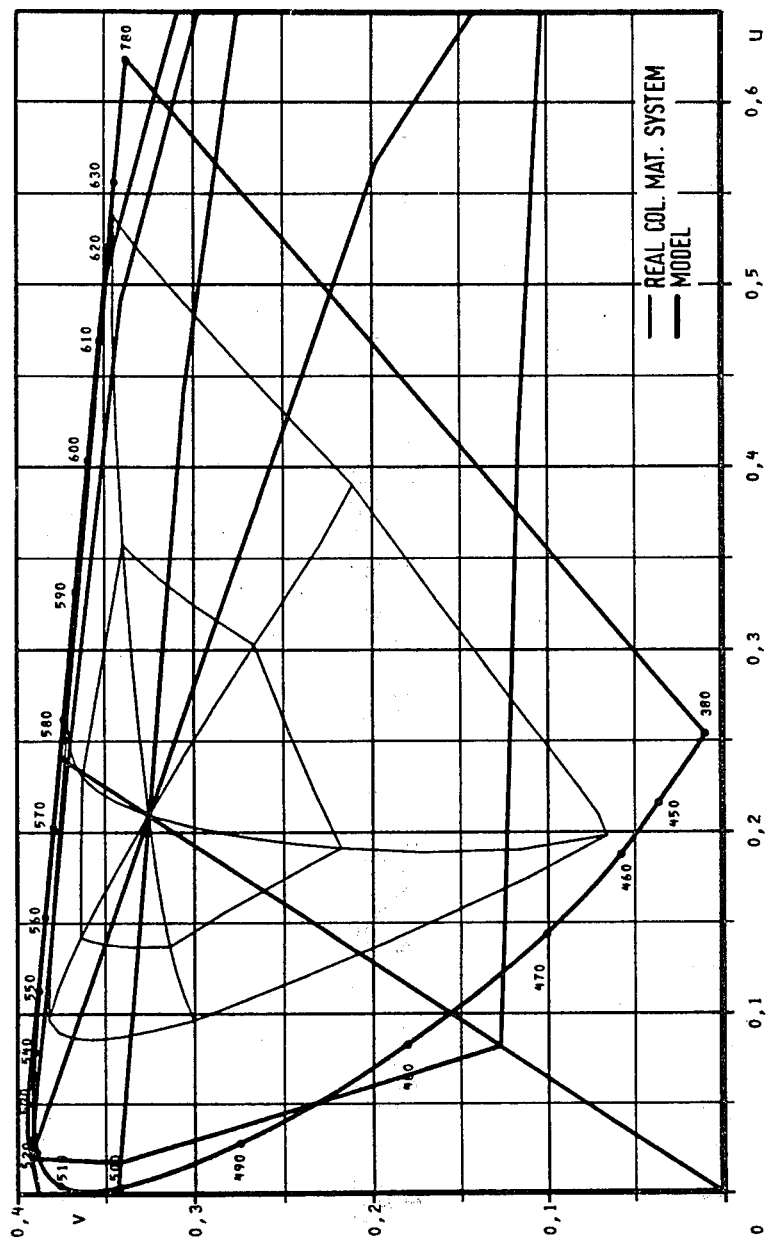
Figure 36:
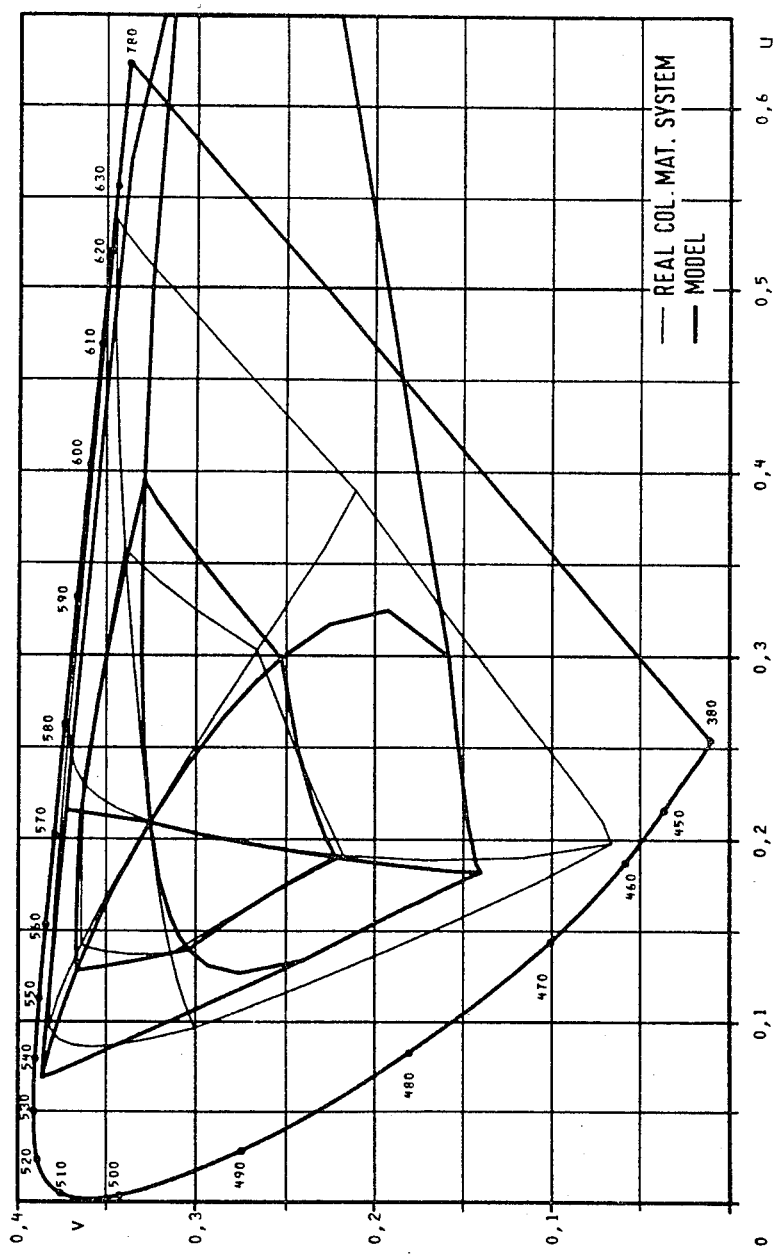
Figure 37:
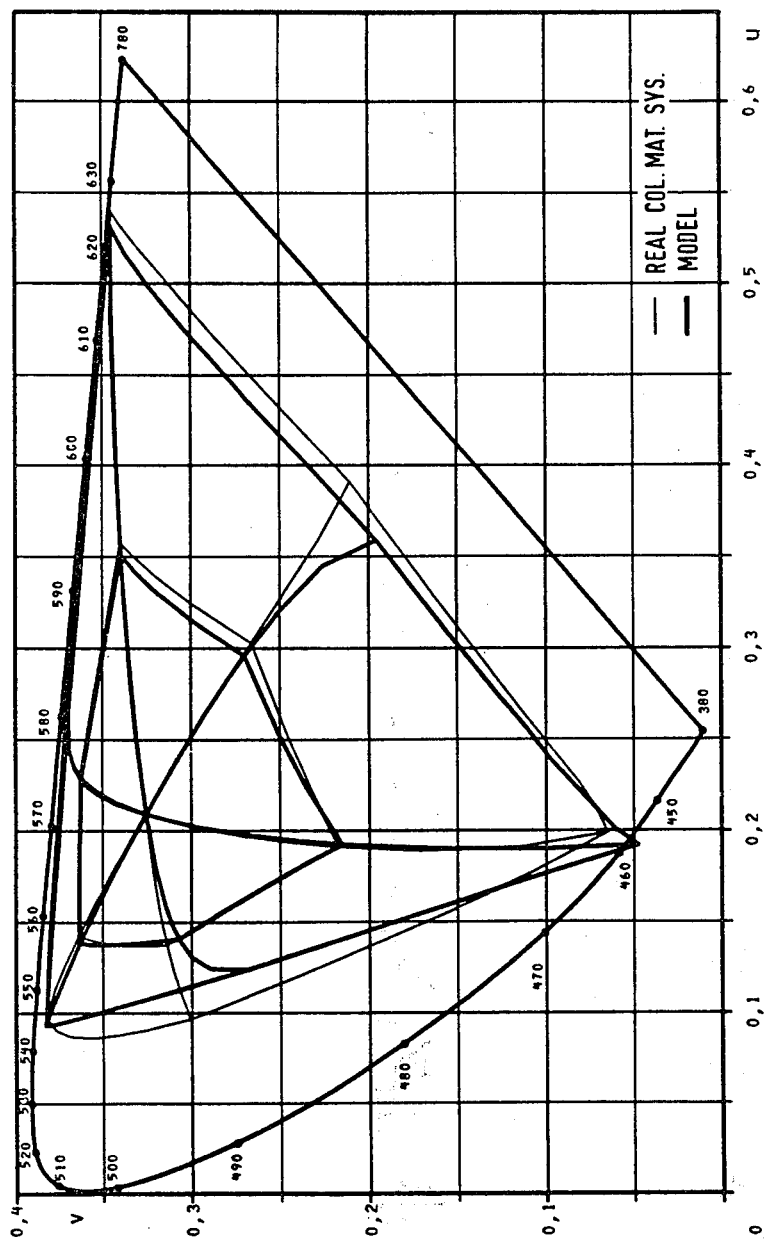
Figure 38:
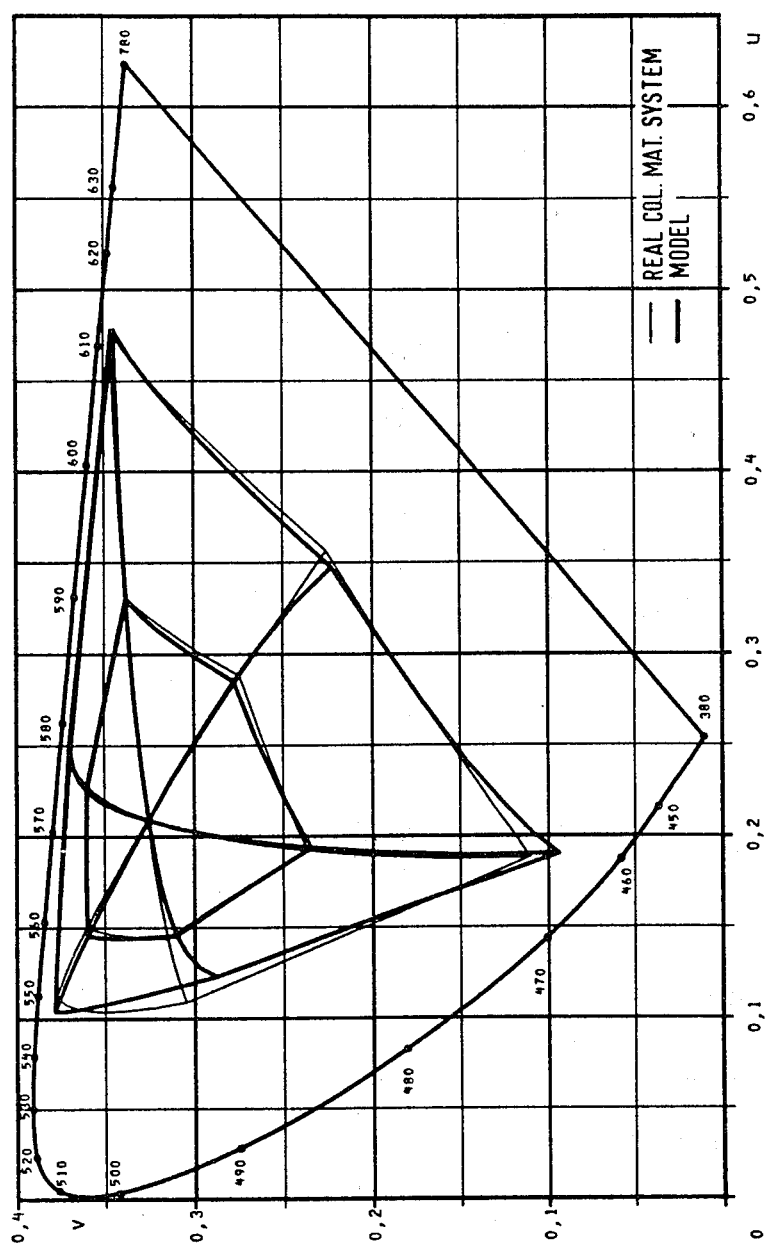
Figure 39:
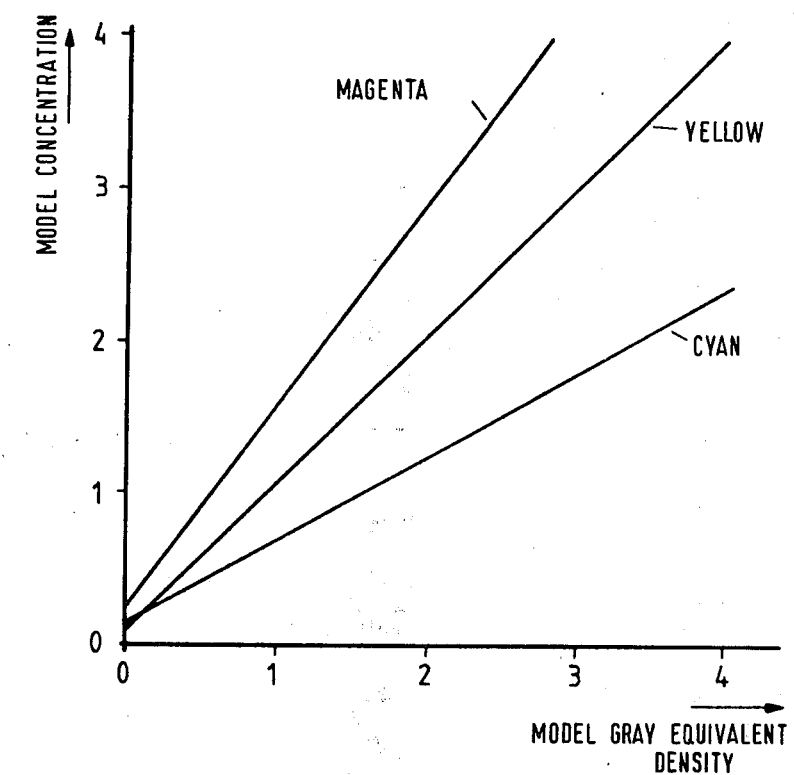
Figure 40:
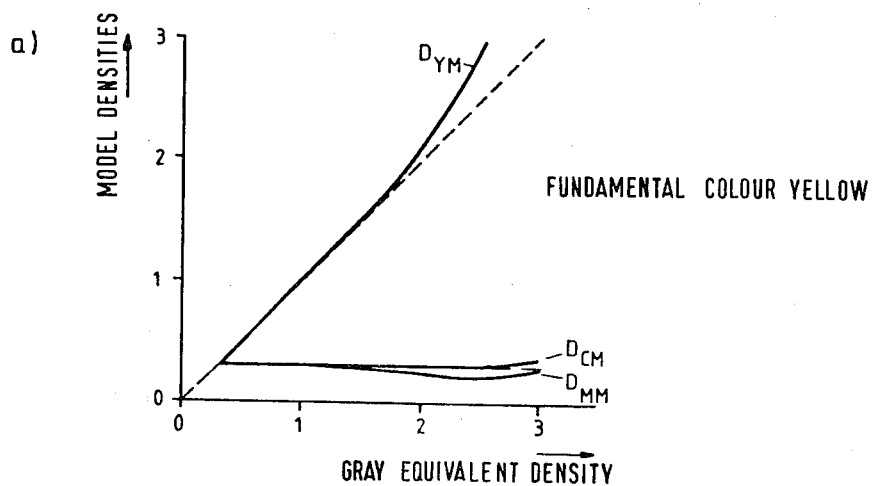
Figure 41:
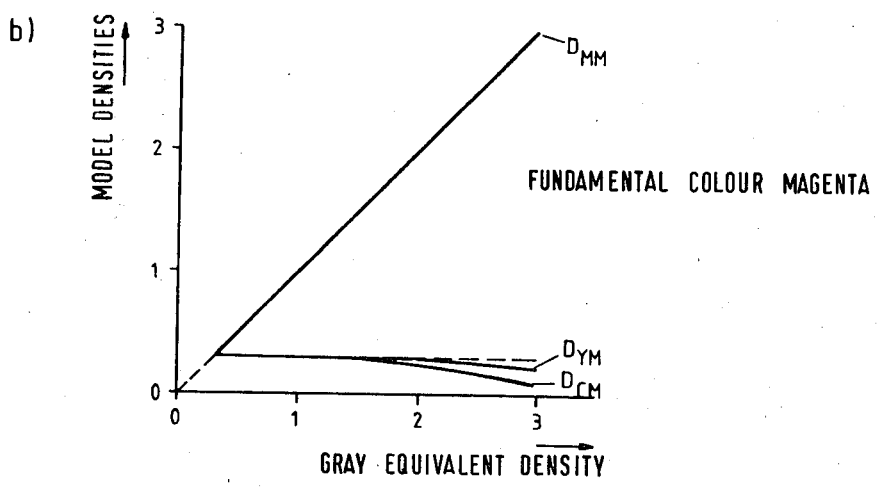
Figure 42:
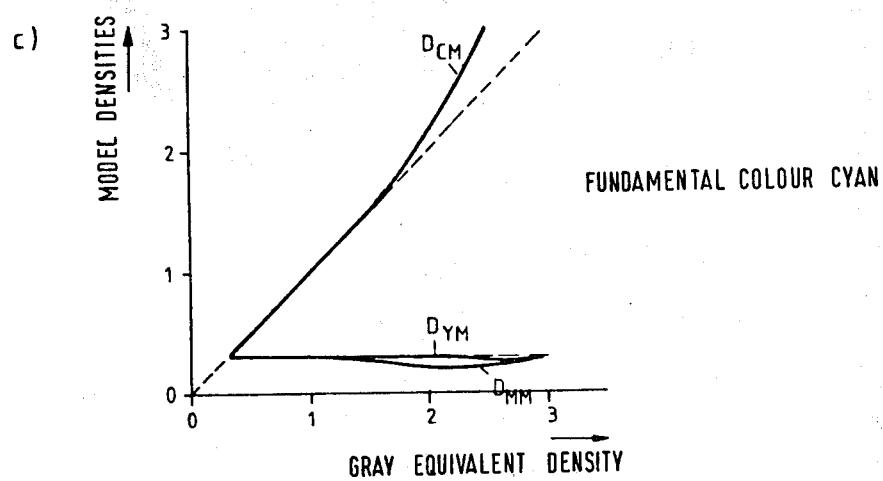
Figure 43:
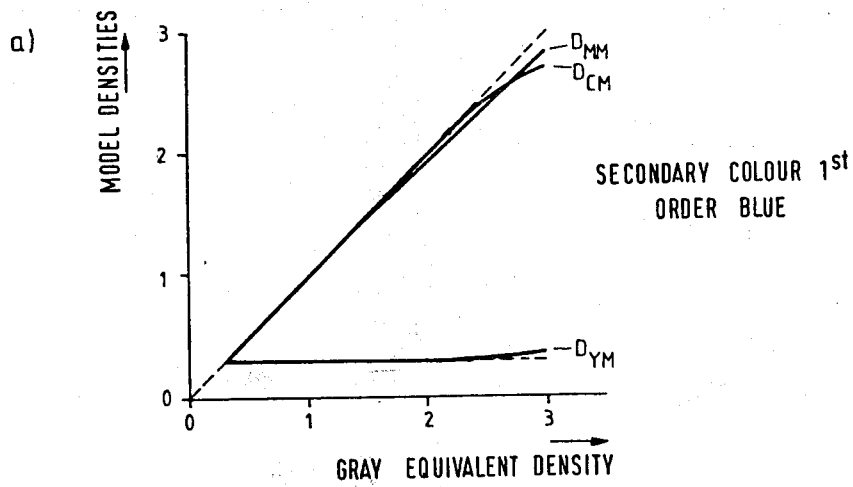
Figure 44:
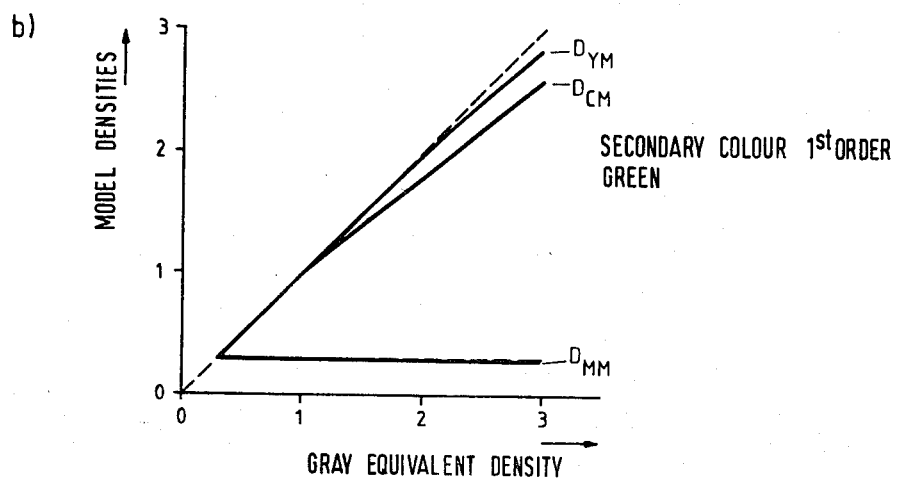
Figure 45:
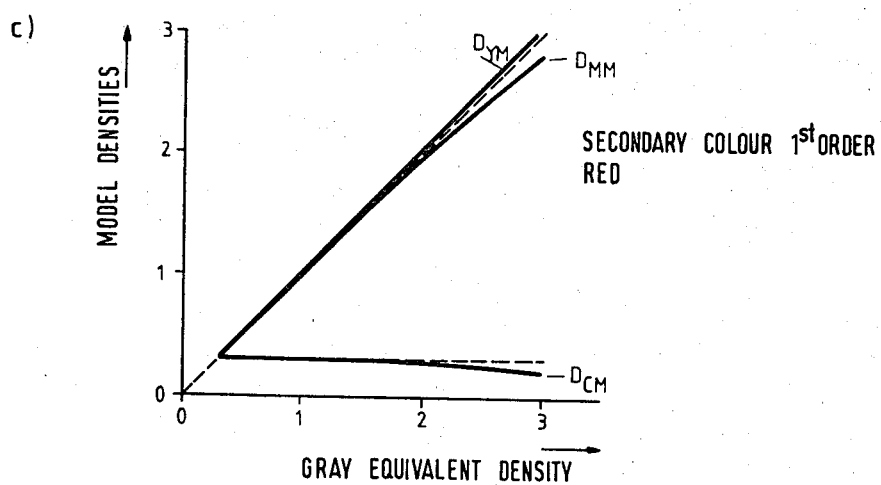
Figure 46:
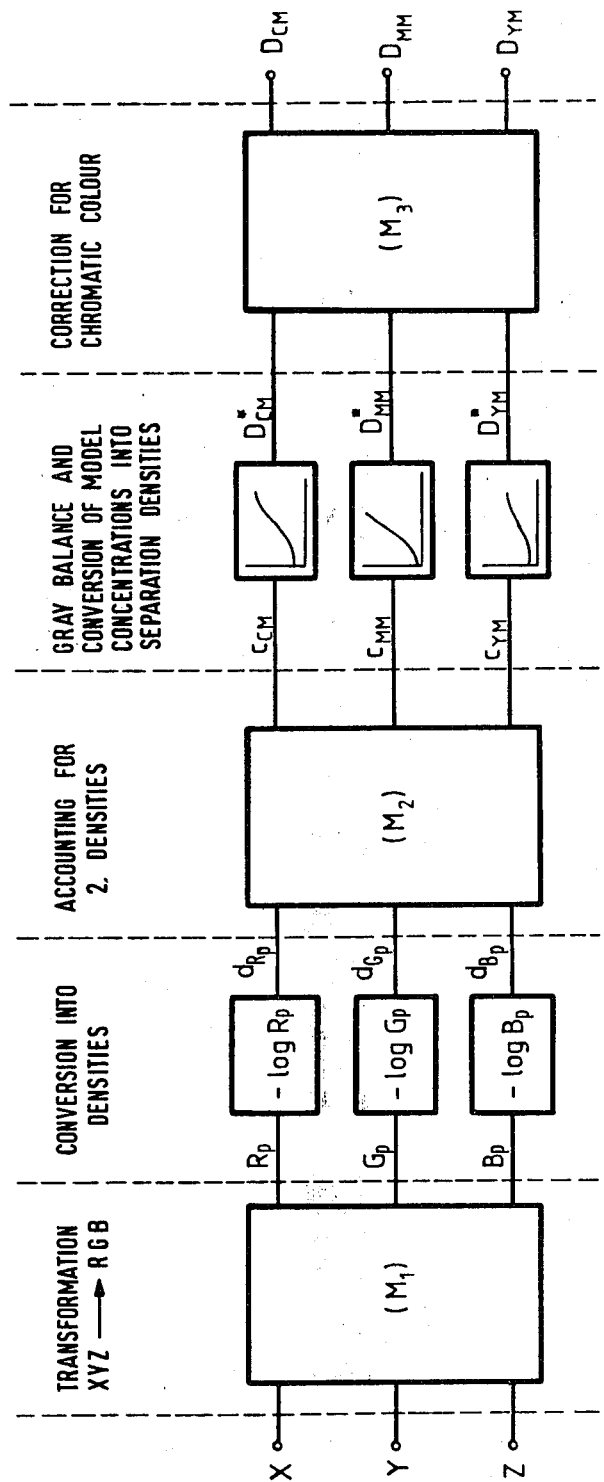
Figure 47:
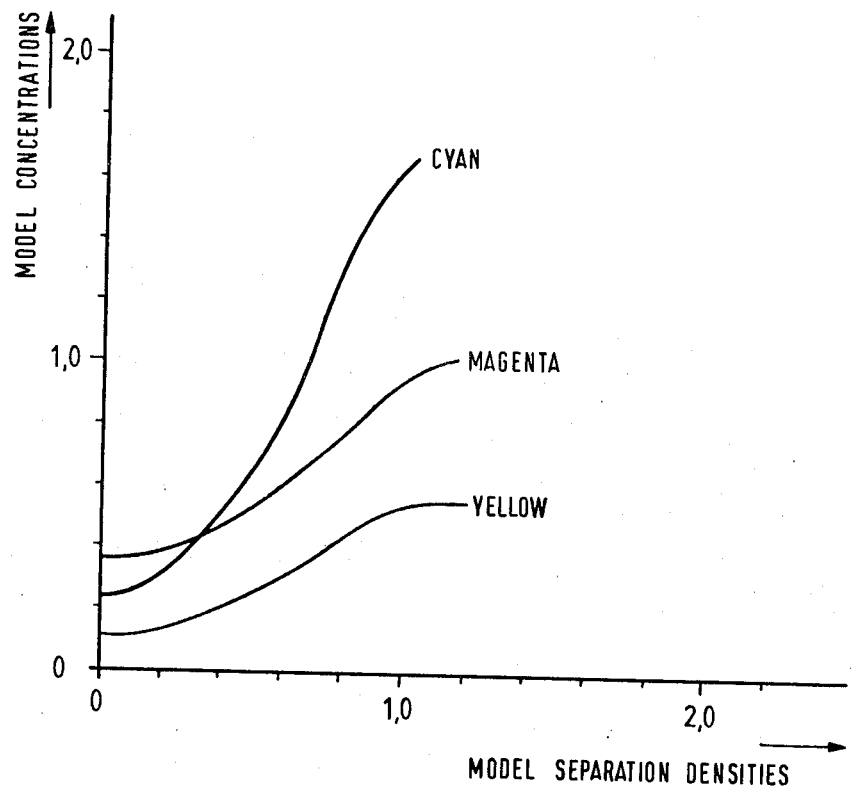
Figure 48:
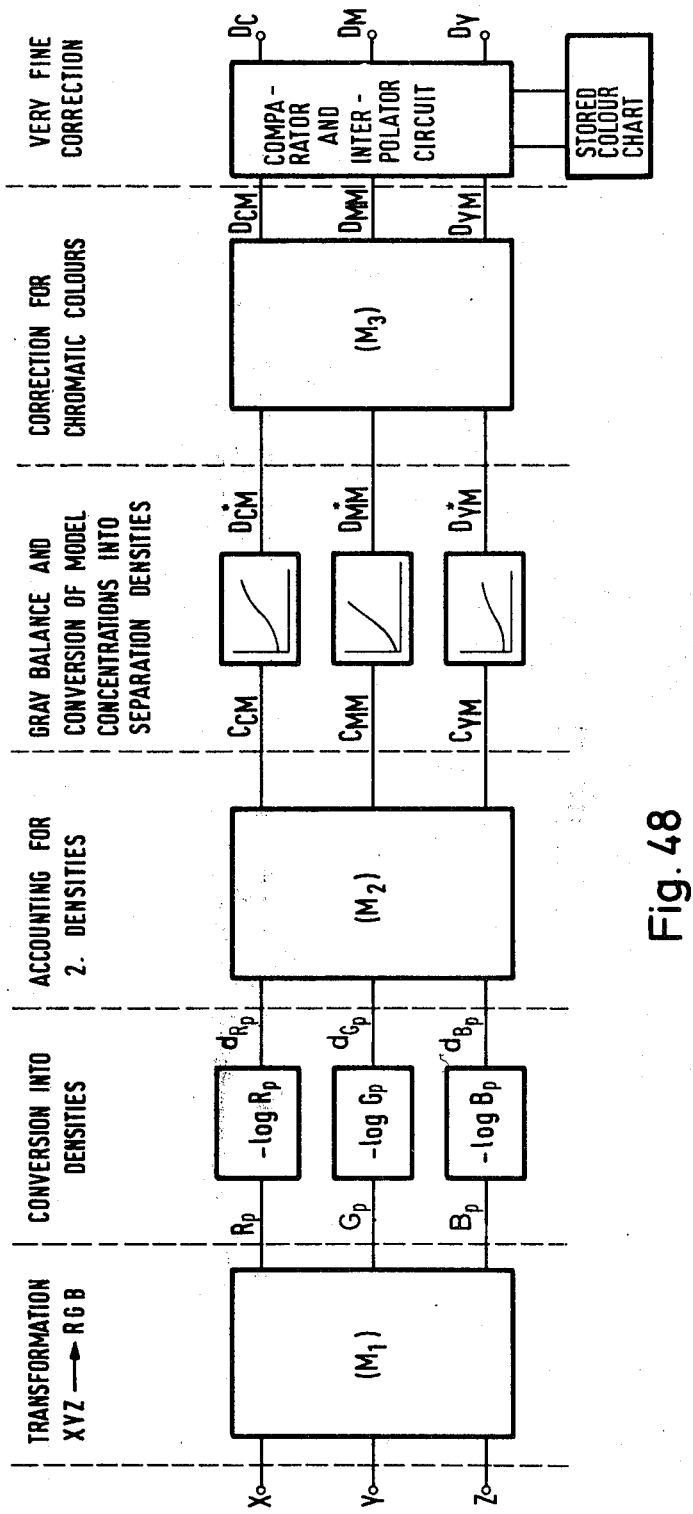
Figure 48:
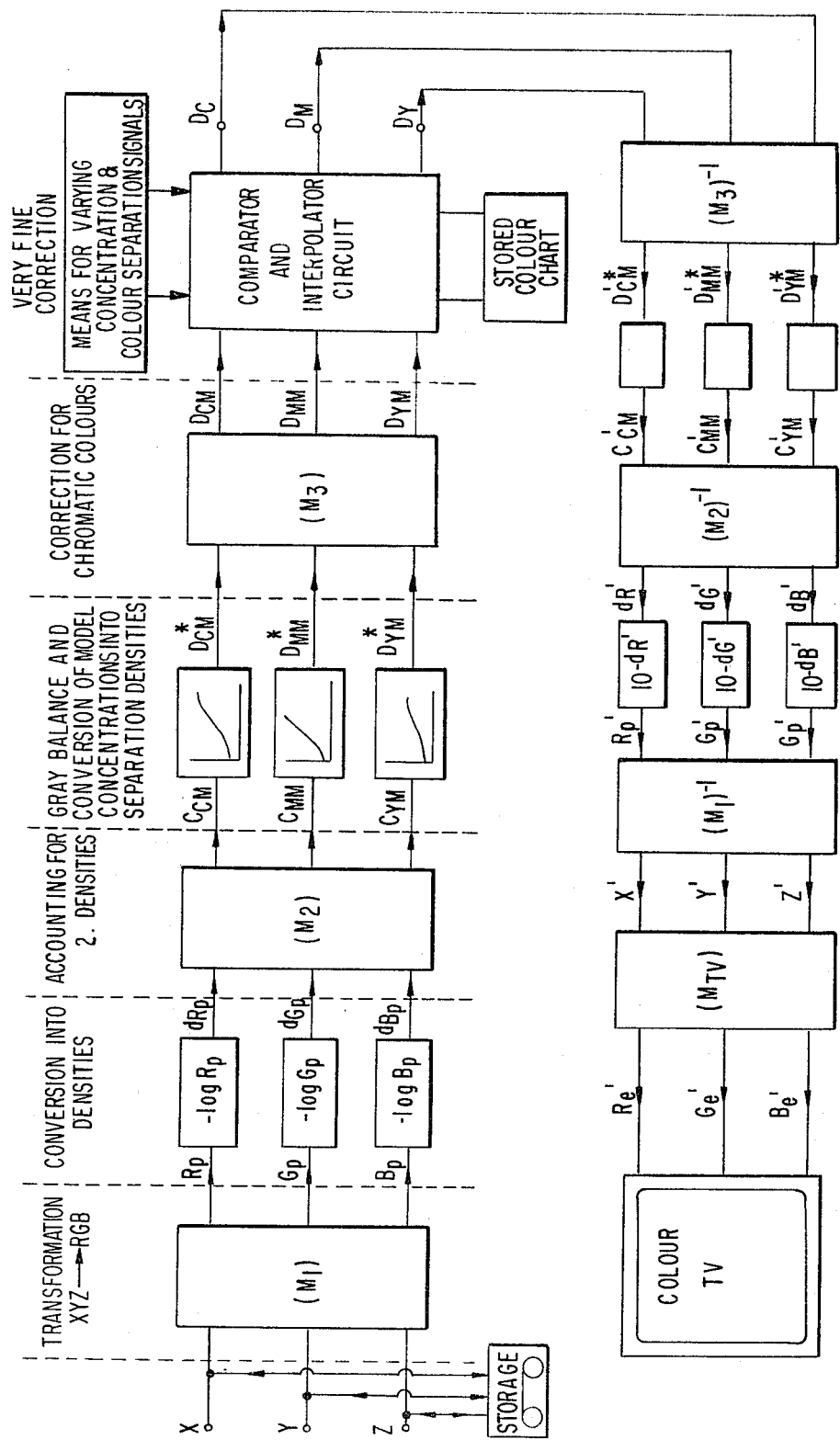

FIG. 7' shows a modified version of the scanner of FIG. 7 wherein a TV display unit has been added;

FIG. 8 shows the spectral densities of eight shades of gray with film colouring materials of a special film (film Nr. 2);

FIG. 9 shows the spectral densities of eight shades of gray with film colouring materials of a different film (film Nr. 3);

FIG. 10 shows an excerpt from the CIE-UCS Colour Chart 1960 for the scanner Nr. 2 in non-corrected state and film Nr. 2;

FIG. 11 shows an excerpt from the CIE-UCS Colour Chart 1960 for the scanner Nr. 2 in corrected state and film Nr. 2;

FIG. 12 shows the effective spectral channel sensitivities of the corrected scanner Nr. 1 compared with the EBU curves;

FIG. 13 shows the effective spectral channel sensitivities of the corrected scanner Nr. 2 compared with the EBU curves;

FIG. 14 shows a normalized representation of a colouring material system used for a subtractive colour mixture, having for example a colouring material containing the colouring materials yellow, magenta, cyan, and a carrying material;

FIG. 15 shows, in the CIE-UCS Colour Chart 1960, the mixable sorts of colour in a real colouring material system for gray-equivalent densities of $D_{min}=0.3$ to $D_{max}=2.5$;

FIG. 16 shows four different types of optimal colour-like model colouring materials;

FIG. 17 shows the replacement of real colouring materials by optimal colour-like model colouring materials;

FIG. 18 shows a gray mixture or a real and of the corresponding model colouring material system without secondary densities. The spectral density d ($\lambda$) is conditionally equal to an aselective gray of density $D=1$ with illuminant $D_{50}$;

FIG. 19 shows, in the CIE-UCS Colour Chart 1960, the mixable sorts of colour with real colouring materials and model colouring materials without secondary densities of $D_{min}=0$ to $D_{max}=3.2$;

FIG. 20 shows a block diagram of a circuit which corresponds to a substitution of the real colouring materials based on a subtractive colour mixture by optimal colour-like model colouring materials without secondary densities;

FIG. 21 shows a replica of the real colouring material "yellow" by means of an optimal colour-like model colouring material with secondary densities;

FIG. 22 shows a replica of the real colouring material "magenta" by means of an optimal colour-like model colouring material with secondary densities;

FIG. 23 shows a replica of the real colouring material "cyan" by means of an optimal colour-like model colouring material with secondary densities;

FIG. 24 shows a gray mixture of the model colouring material shown in FIGS. 21 to 23 with secondary densities, the spectral density d ($\lambda$) being unconditionally equal to an aselective gray of density $D=1$;

FIG. 25 shows, in the CIE-UCS Colour Chart 1960, the mixable sorts of colour with real colouring materials and with model colouring materials with secondary densities and $D_{min}=0$ to $D_{max}=3.2$;

FIG. 26 shows a block diagram of a circuit in which the real colouring materials used in the subtractive colour mixture are replaced by optimal colour-like model colouring materials with secondary densities;

FIG. 27 shows a block diagram of a circuit which differs from that of FIG. 26 in that the output signals in the latter case are supplied to a circuit for a gray balance whilst this circuit serves for the determination of colour separation densities from primary colour signals if there is a purely subtractive colour mixture;

FIGS. 28 to 30 show model gray equivalent densities for the fundamental colours yellow, magenta and cyan as obtained with the circuit according to FIG. 27;

FIGS. 31 to 33 show model gray equivalent densities for the secondary colours of first order, blue, green and red, as obtained from the circuit according to FIG. 27;

FIG. 34 shows a complete block diagram of a circuit for determining the separation densities from primary colour signals, where the signals coming from the gray balance are supplied to a correction matrix circuit for correction of chromatic colours;

FIG. 35 shows, in the CIE-UCS Colour Chart, the range of colour sort—reproducible via the circuit of FIG. 34—in the initial state of optimization for the coefficients of matrices of $D_{min}=0$ to $D_{max}=3.2$ and a total colour rendition index of $R_{ges}=-462$;

FIG. 36 shows, in the CIE-UCS Colour Chart, the range of colour sort mixable via the circuit of FIG. 34 after 92 optimization steps of $D_{min}=0$ to $D_{max}=3.2$ and a total colour rendition index of $R_{ges}=52$;

FIG. 37 shows, in the CIE-UCS Colour Chart, the range of colour sort mixable via the circuit of FIG. 34 zzat the end state of optimization, $D_{min}=0$ to $D_{max}=3.2$ and a total colour rendition index $R_{ges}=76$ FIG. 38 shows, in the CIE-UCS Colour Chart, the mixable range of colour sort according to FIG. 37 at the end state of optimization but where the density range of $D_{min}=0.3$ to $D_{max}=2.5$ is adequate, and with a total colour rendition index of $R_{ges}=89$;

FIG. 39 shows the characteristic curves for a gray balance with the circuit of FIG. 34 for a purely subtractive colour mixture;

FIGS. 40 to 42 show the model gray equivalent densities for the fundamental colours yellow, magenta and cyan when using the circuit of FIG. 34 and optimally established coefficients of matrices $M_1$ to $M_3$;

FIGS. 43 to 45 show the model gray equivalent densities for the secondary colours of first order blue, green and red when using the circuit of FIG. 34 and optimally established coefficients of matrices $M_1$, $M_2$ and $M_3$;

FIG. 46 shows a circuit corresponding to that of FIG. 34 but specially adapted for gravure printing and where a conversion of model concentrations into model separation densities is undertaken in the circuit unit for the gray balance;

FIG. 47 shows the characteristic curves for the gray balance in the device of FIG. 46 in the case of gravure printing;

FIG. 48 shows a further development of the circuit of FIG. 46, where a very fine correction of the colour rendition is undertaken by supplying the model separation density signals to a comparator-interpolation circuit which compares these signals with stored values of a colour chart and interpolates them; FIG. 48' shows a modification of the circuit of FIG. 48 including means for modifying concentration and colour separation signals, a display unit, and an adaptation unit; and FIG. 48" shows another modification of the circuit of FIG. 48 including an adaptive matrix and display unit and means for modifying concentration and colour separation signals.

In the following an example for the colour analysis is explained, which shows how the colour rendition quality of existing systems can be improved by means of suitable electronic measures.

The colour analysis is carried out here with a film scanner.

The colour analysis can be conceived as a colour measurement according to the tristimulus method; in principle it is thus independent of the colour synthesis used. Due to the requirement for a signal-to-noise ratio which is as small as possible, one endeavours to get by as far as possible without electronic matrix circuits, so that as colour mixture curves for colour television cameras and film scanners the EBU colour mixture curves would have to be copied. On account of the necessary but not realizable negative portions of these EBU colour mixture curves, every real spectral sensitivity curve represents a more-or-less good approximation to the EBU curves. For energy reasons as well as on account of the different nature of the originals to be reproduced, colour cameras and film scanners usually have varying colour mixture curves; colour television cameras must be able, just as the human eye, to register conditionally equal colours of a scene as such, since every colour valency can be caused by an infinite number of colour stimuli. In the case of colour film, however, every mixable colour valence is realized via precisely one colour stimulus function, so that there is no problem of metamerism with colour film scanners.

Every colour valence can be described during film scanning on the one hand by means of three theoretical vsb colour values and on the other hand by means of three actual colour values which are obtained via the real colour mixture curves.

This corresponds to the following relations:

$$R_e = k \int_{380nm}^{760nm} \phi_\lambda \, \bar{r}_e(\lambda) d\lambda \qquad 1.1$$

$$G_e = k \int_{380nm}^{760nm} \phi_\lambda \cdot \bar{g}_e(\lambda) d\lambda \qquad 1.2$$

$$B_e = k \int_{380nm}^{760nm} \phi_\lambda \cdot \bar{b}_e(\lambda) d\lambda \qquad 1.3$$

-continued $$R = k_R \int_{380nm}^{760nm} \phi_\lambda \cdot \bar{r}(\lambda) d\lambda \qquad 1.4$$

$$G = k_G \int_{380nm}^{760nm} \phi_\lambda \, \bar{g}(\lambda) d\lambda \qquad 1.5$$

$$B = k_B \int_{380nm}^{760nm} \phi_\lambda \, \bar{b}(\lambda) d\lambda \qquad 1.6$$

Between the theoretical and actual colour values there is thus a clear coordination which, in the simplest of cases, if the colour mixture curves coincide with the EBU colour mixture curves, can be described by a unit matrix; generally, however, there is a functional relation which as a rule cannot be expressed in simple linear fashion.

It will now be shown using the example of colour film scanners with known spectral sensitivity how the functional connection between the actual and the theoretical colour values can, by means of simple relations, be approximately described such that simple analogous correction circuits can be derived from it.

Figure 1:
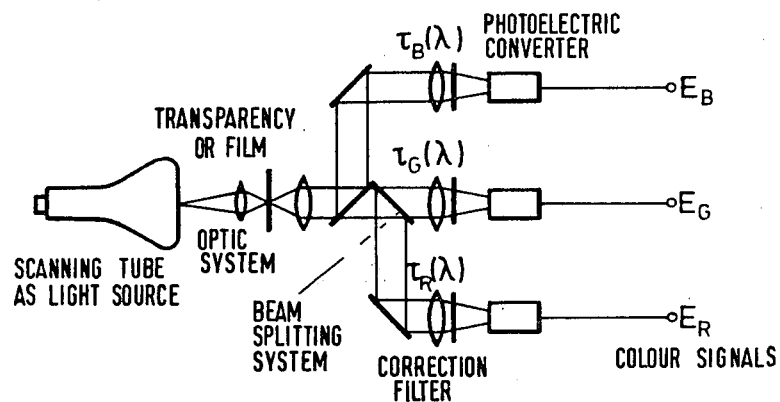
FIG. 1 shows the principle of an electronic flying spot scanner for films and positive transparencies.

Due to the simple and quick balance procedure, colour film and transparency scanners according to FIG. 1 are generally operated with constant adjustment.

Figure 2:
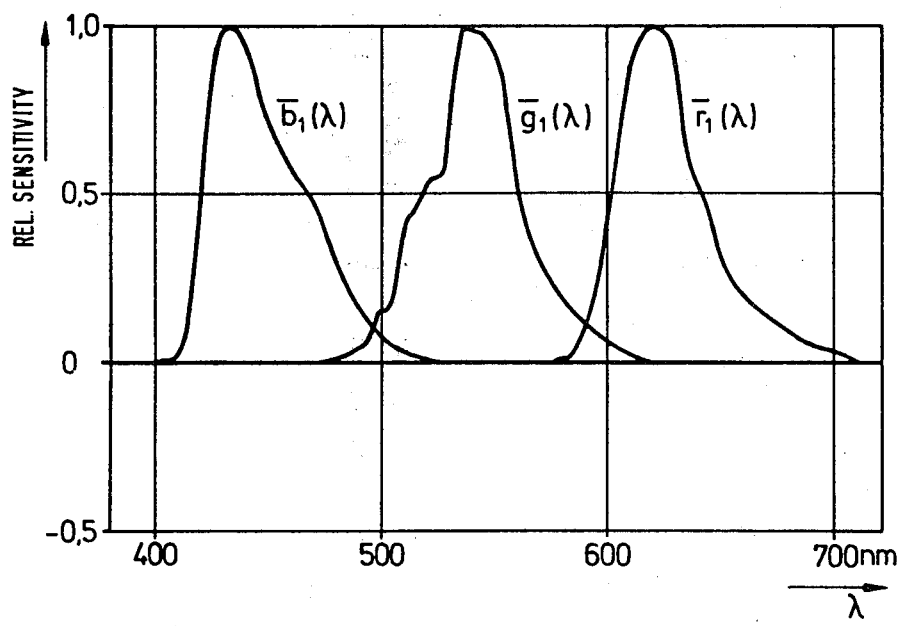
FIG. 2 shows the spectral channel sensitivity of a first scanner (scanner Nr. 1) in original state.
Figure 3:
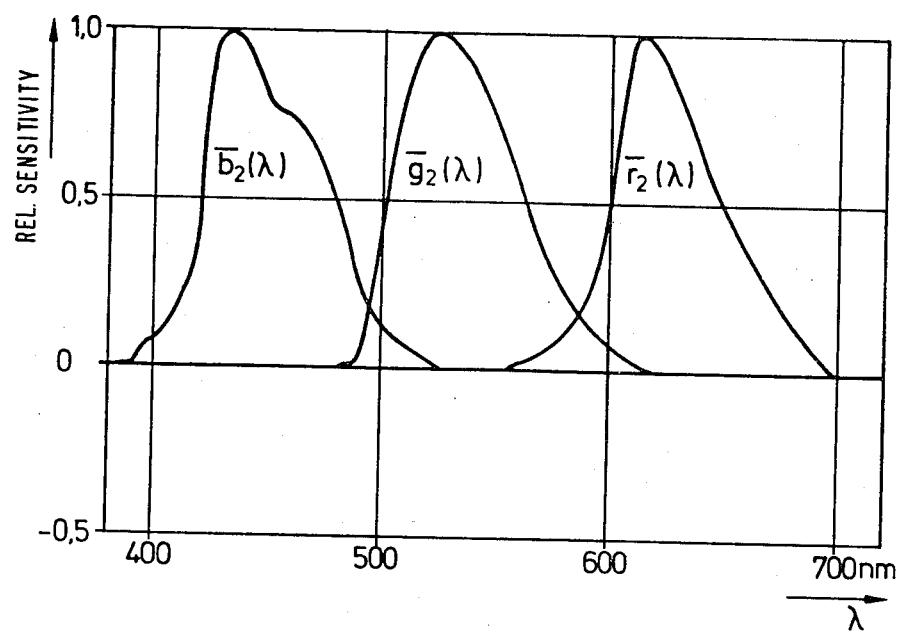
FIG. 3 shows the spectral channel sensitivity of a second scanner (scanner Nr. 2) in original state.

The quality of the colour rendition with the scanners investigated was determined as follows:

1. Two colour film scanners of different make and whose spectral channel sensitivities were known were selected. FIGS. 2 and 3 show their channel sensitivities in normed form. They bear very little resemblance to the EBU curves.
2. Six film test colour units each with 536 film test colours were used. Each film test colour set consisted of eight shades of gray with densities between $D_{min}=0.35$ and $D_{max}=2.1$, 17 test colours according to DIN 6169 and six different skin colours. The spectral transmission ratios of the individual film test colours were determined computationally with the spectral colouring material data of the films most commonly used by TV corporations for filming.
3. The scanners were balanced in each case to give film white of density $D_{min}=0.35$ of each film test colour set; for this, the amplification factors of channels $k_R$, $k_G$ and $k_B$ were determined such that the R-G-B colour values were each of the same magnitude and assumed their maximum permissible values.
4. The standard colour values of the 536 original film colours (index 0) of each test colour set were determined for illuminant $D_{65}$ according to the following formula:

$$X_{0F,i} = k \int_{380nm}^{760nm} \tau_{F,i}(\lambda) \cdot S_{D65}(\lambda) \cdot \bar{x}(\lambda) d\lambda \qquad 1.7$$

$$Y_{0F,i} = k \int_{380nm}^{760nm} \tau_{F,i}(\lambda) \cdot S_{D65}(\lambda) \cdot \bar{y}(\lambda) d\lambda \qquad 1.8$$

$$Z_{0F,i} = k \int_{380nm}^{760nm} \tau_{F,i}(\lambda) \cdot S_{D65}(\lambda) \cdot \bar{z}(\lambda) d\lambda \qquad 1.9$$

with

-continued $$k = \frac{100}{\int_{380nm}^{760nm} S_{D65}(\lambda) \cdot \bar{y}(\lambda) d\lambda} \quad 1.10$$

for $i = 1 \ldots 536$ (test colours)
$F = 1 \ldots 6$ (films)

5. The rendition colour values (Index W) of the 536 film colours in each test colour set were calculated for all scanners investigated.

$$R_{WA,F,i} = k_{RA,F} \cdot \int_{380nm}^{760nm} \tau_{F,i}(\lambda) \cdot \bar{r}_A(\lambda) d\lambda \quad 1.11$$

$$G_{WA,F,i} = k_{GA,F} \cdot \int_{380nm}^{760nm} \tau_{F,i}(\lambda) \cdot \bar{g}_A(\lambda) d\lambda \quad 1.12$$

$$B_{WA,F,i} = k_{BA,F} \int_{380nm}^{760nm} \tau_{F,i}(\lambda) \cdot \bar{b}_A(\lambda) d\lambda \quad 1.13$$

with the following balance conditions $$k_{RA,F} = \frac{100}{\int_{380nm}^{760nm} \tau_{F,D=0.35}(\lambda) \cdot \bar{r}_A(\lambda) d\lambda} \quad 1.14$$

$$k_{GA,F} = \frac{100}{\int_{380nm}^{760nm} \tau_{F,D=0.35}(\lambda) \cdot \bar{g}_A(\lambda) d\lambda} \quad 1.15$$

$$k_{BA,F} = \frac{100}{\int_{380nm}^{760nm} \tau_{F,D=0.35}(\lambda) \cdot \bar{b}_A(\lambda) d\lambda} \quad 1.16$$

for $A = 1 \ldots 8$ (scanners)
$F = 1 \ldots 6$ (films)
$i = 1 \ldots 536$ (test colours)

where F,D=0.35( ) of the spectral transmission ratio of filmwhite ($D_{min}=0.35$) of each film test colour set is F.

The standard colour values of the rendition colours were determined subsequently from the R-G-B colour values as follows:

$$\begin{pmatrix} X_{WA,F,i} \\ Y_{WA,F,i} \\ Z_{WA,F,i} \end{pmatrix} = \begin{pmatrix} 0.4305 & 0.3416 & 0.1784 \\ 0.2220 & 0.7076 & 0.0713 \\ 0.0202 & 0.1296 & 0.9392 \end{pmatrix} \begin{pmatrix} R_{WA,F,i} \\ G_{WA,F,i} \\ B_{WA,F,i} \end{pmatrix} \quad 1.17$$

6. The special colour rendition indices according to DIN 6169 $R_{A,F,i}$ were determined for the 536 film test colours of all scanner-film combinations. The special colour rendition indices $R_i$ are a measure of the vsb agreement between original and rendition colours; an ideal agreement is characterized according to definition by a special colour rendition index $R_i=100$.

7. Mean colour rendition indices for certain colour groups and their standard deviation as a measure of the dispersion about this mean were determined. In so doing, in particular the following was calculated:

(a) the general colour rendition index $R_a$ according to DIN 6169 and $\sigma_a$ over the DIN test colours Nrs. 1 to 8.

$$R_{aA,F} = \frac{1}{8} \sum_{i=1}^{8} R_{A,F,i} \quad 1.18$$

$$\sigma_{aA,F} = \sqrt{\frac{1}{8} \sum_{i=1}^{8} (R_{A,F,i} - R_{aA,F})^2} \quad 1.19$$

for $A = 1 \ldots 8$ (scanners)
$F = 1 \ldots 8$ (film test colours conditionally equal to test colours Nrs. 1 to 8 according to DIN (6169)

(b) the mean colour rendition index and standard deviations over eight shades of gray with densities $D_{min}=0.35$ to $D_{max}=2.1$ $$R_{grauA,F} = \frac{1}{8} \sum_{j=1}^{8} R_{A,F,j} \quad 1.20$$

$$\sigma_{grauA,F} = \sqrt{\frac{1}{8} \sum_{j=1}^{8} (R_{A,F,j} - R_{grauA,F})^2} \quad 1.21$$

for $j = 1 \ldots 8$ (shades of gray)

(c) the mean colour rendition indices and standard deviations over 536 film test colours.

$$R_{gesA,F} = \frac{1}{536} \sum_{i=1}^{536} R_{A,F,i} \quad 1.22$$

$$\sigma_{gesA,F} = \sqrt{\frac{1}{536} \sum_{i=1}^{536} (R_{A,F,i} - R_{gesA,F})^2} \quad 1.23$$

In the appended tables the mean colour rendition indices including the standard deviations, the special colour rendition indices for the 17 DIN test colours, six different skin colours and eight shades of gray are summarized tabularly.

It is especially noticeable when comparing the mean colour rendition indices of the uncorrected scanners—balanced however against filmwhite of density D=0.35—that the gray (grau) rendition of the individual scanner-film combinations varies a lot.

It is further of note that relatively large fluctuations in the colour rendition indices of a scanner occur when testing different film test colour sets.

Figure 4:
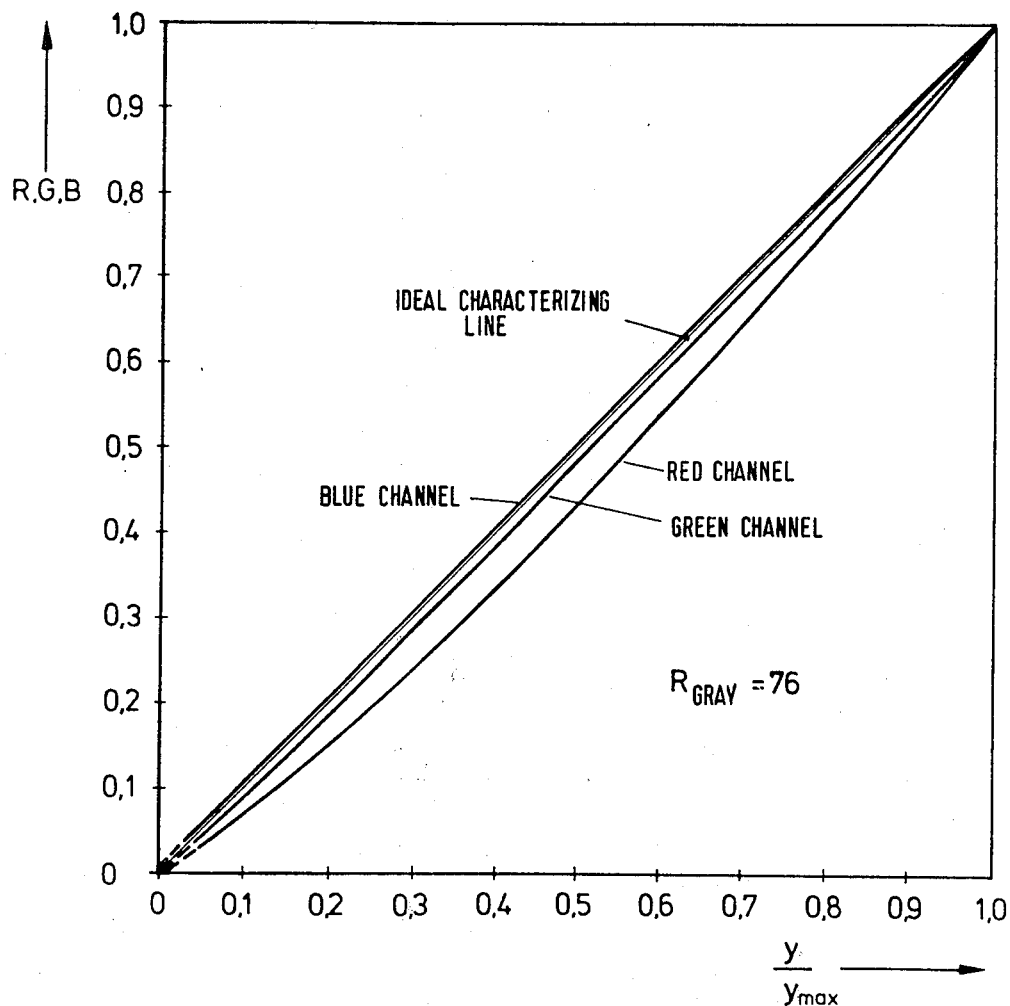
FIG. 4 shows the characteristic transmission curve of a scanner for achromatic film colours.

The erroneous gray rendition can be understood if one looks at FIG. 4, where the effective colour values R, G and B are plotted against the standardized brightnesses $Y/Y_{max}$ of the individual shades of gray for the scanner-film combinations. In the case of ideal colour mixture curves, sloping straight lines should be obtained as characterizing curves under 45°, which pass through the origin as the maximal R, G and B values were arbitrarily taken as 1. One can see from FIG. 4, however, that there are clear non-linear deviations from the ideal characterizing curve.

The colour signals could be predistorted in the other direction by means of function generators, so as to compensate for the non-linearities, but circuits of this kind have the disadvantage of having too many adjustment possibilities and so increasing the probability of operator's errors.

Figure 5:
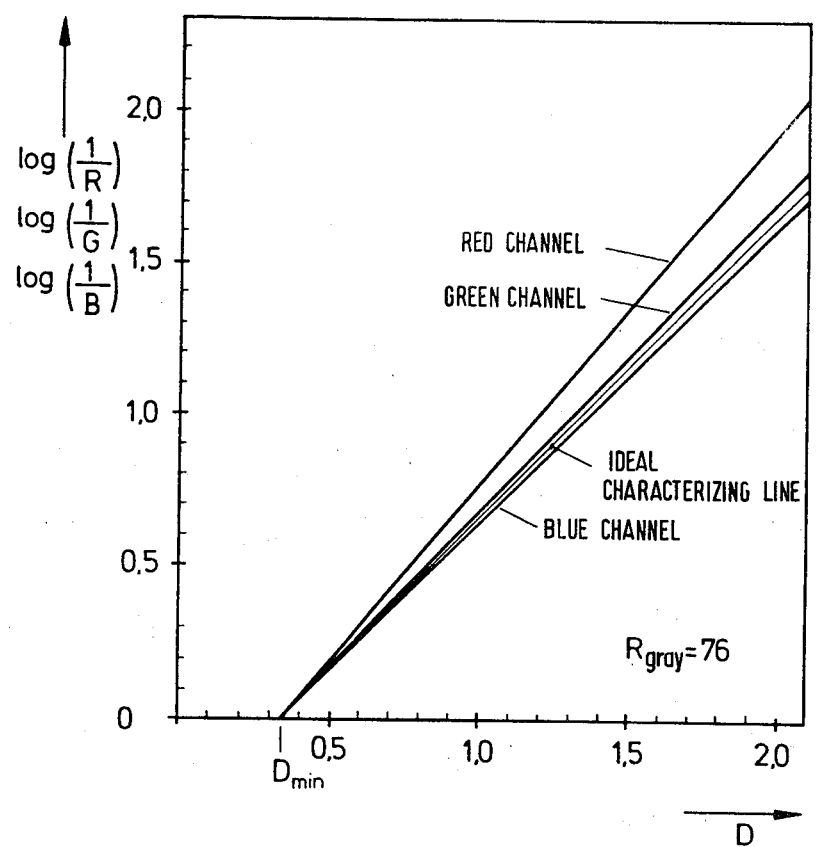
FIG. 5 shows the characteristic transmission curves of FIG. 4 with logarithmic ordinate.

If, however, instead of the colour values, one plots the logarithmized reciprocal of the three colour signals, i.e.

$$\log\left(\frac{1}{R}\right), \log\left(\frac{1}{G}\right) \text{ and } \log\left(\frac{1}{B}\right)$$

against the density D of the individual shades of gray, one obtains for all film-scanner combinations three characterizing lines in each case which, within the accuracy limits or the drawing, have the form of straight lines of varying slope, as is shown in FIG. 5.

Theoretically one ought to obtain three equal characterizing lines with a gradient of one; the actual characterizing lines, however, have varying gradients $\beta_R$, $\beta_G$, $\beta_B$. The relation between the logarithmized colour values and the densities can thus be described as follows:

$$\log\left(\frac{1}{R}\right) = \beta_R(D - D_{min}) \quad 1.24$$

$$\log\left(\frac{1}{G}\right) = \beta_G(D - D_{min}) \quad 1.25$$

$$\log\left(\frac{1}{B}\right) = \beta_B(D - D_{min}) \quad 1.26$$

With $$D = \log\left(\frac{1}{Y}\right) \quad 1.27$$

and $$D_{min} = \log\left(\frac{1}{Y_{max}}\right) \quad 1.28$$

the colour values R, G and B can be expressed as follows:

$$R = \left(\frac{Y}{Y_{max}}\right)^{\beta_R} \quad 1.29$$

$$G = \left(\frac{Y}{Y_{max}}\right)^{\beta_G} \quad 1.30$$

$$B = \left(\frac{Y}{Y_{max}}\right)^{\beta_B} \quad 1.31$$

For a theoretically exact rendition of achromatic film samples, the exponent $\beta$ values would have to be one. This can be achieved via $\gamma$ correction circuits as are common in television technology, so that the errors with the gray balance for film-scanner combinations can be almost completely eliminated. The following applies here:

$$R_\gamma = \left(\frac{Y}{Y_{max}}\right)^{\beta_R \gamma_R} = R^{\gamma_R} \quad 1.32$$

-continued $$G_\gamma = \left(\frac{Y}{Y_{max}}\right)^{\beta_G \gamma_G} = G^{\gamma_G} \quad 1.33$$

$$B_\gamma = \left(\frac{Y}{Y_{max}}\right)^{\beta_B \gamma_B} = B^{\gamma_B} \quad 1.34$$

if $$\gamma_R = \frac{1}{\beta_R} \quad 1.35$$

$$\gamma_G = \frac{1}{\beta_G} \quad 1.36$$

$$\gamma_B = \frac{1}{\beta_B} \quad 1.37$$

Figure 6:
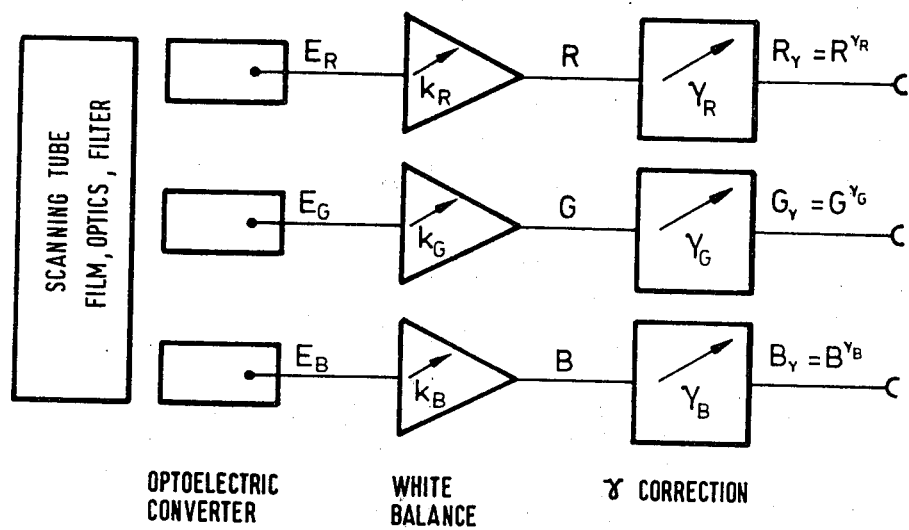
FIG. 6 shows a simplified block diagram of a film scanner with $\gamma$ correction.

The advantage of the $\gamma$ correction circuits is that per channel there is only one adjustment possibility with which the necessary $\gamma$ can be adjusted. FIG. 6 shows the block diagram, completed with the $\gamma$ correction circuits, of a film scanner.

In the appended tables the correction values for each channel are entered for every scanner-film combination. One can see the effect of the $\gamma$ corrections by comparing columns b of these tables with columns a.

In comparision to the $\gamma$-corrected scanners there are hardly any or only very small differences for the chromatic DIN test colours and the skin colours. The colour rendition quality of the scanners is, however, rendered almost ideal be the $\gamma$ correction as regards the rendition of achromatic test colours. The values are dependent both on the spectral sensitivities of the scanners and on the spectral properties of the scanned films; they must therefore be specially determined for every scanner-film combination, e.g. by means of sutiable wedge filters in the film.

In the following it will be shown how, by means of matrixing the $\gamma$-corrected R-G-B signals, i.e. by converting these by means of a matrix circuit, the colour rendition quality of the film scanner can be improved for the chromatic colours.

FIG. 7 shows a block diagram for such a circuit. The linear matrixing is technically easy to realize as regards the circuitry. If care is taken that the negative coefficients are not greater than 2 to 3 times the value of the main diagonals, the signal-to-noise ratio is not significantly impaired by a circuit of this nature.

The real spectral sensitivity curves of the scanner can also be adapted more effectively to the EBU colour mixture curves by means of the matrixing.

A linear matrixing according to FIG. 7 corresponds to a first linear approximation of the non-linear relation between the actual R-G-B values of the film-scanner combination and the corresponding exact vsb $R_e$, $G_e$ and $B_e$ colour values. This is expressed as a formula as follows:

$$\begin{pmatrix} R_{korr} \\ G_{korr} \\ B_{korr} \end{pmatrix} = \begin{pmatrix} k_{11} \cdot v_R & k_{12} \cdot v_R & k_{13} \cdot v_R \\ k_{21} \cdot v_G & k_{22} \cdot v_G & k_{23} \cdot v_G \\ k_{31} \cdot v_B & k_{32} \cdot v_B & k_{33} \cdot v_B \end{pmatrix} \begin{pmatrix} R^{\gamma_R} \\ G^{\gamma_G} \\ B^{\gamma_B} \end{pmatrix} \quad 1.38$$

The R, G and B values are the actual colour value signals given by a non-corrected scanner. the amplification factors $V_R V_G$ and $V_B$ are required because the coefficients of the main diagonals of the correction matrix are arbitrarily assigned the value one so that one can compare the relative sizes of the matrix coefficients and can more easily estimate their influence on the signal-to-noise ratio.

The most obvious and at the same time the easiest way of establishing an evaluation function for the optimization is to matrix the spectral sensitivities of the scanner such that the new spectral sensitivity curves resulting adapt as well as possible to the EBU curves as theoretical sensitivities in such a way that the sum of the square of the difference between theoretical and actual curves is minimal wavelength for wavelength. The evaluation function, in this case consisting of three terms, can be formulated as follows:

$$W_R = \sum_{i=1}^{80} (\bar{r}_e(i) - \bar{r}_{korr}(i))^2 \qquad 1.39$$

$$W_G = \sum_{i=1}^{80} (\bar{g}_e(i) - \bar{g}_{korr}(i))^2 \qquad 1.40$$

$$W_B = \sum_{i=1}^{80} (\bar{b}_e(i) - \bar{b}_{korr}(i))^2 \qquad 1.41$$

with $$\begin{pmatrix} \bar{r}_{korr}(i) \\ \bar{g}_{korr}(i) \\ \bar{b}_{korr}(i) \end{pmatrix} = \begin{pmatrix} k_{11} \cdot v_R & k_{12} \cdot v_R & k_{13} \cdot v_R \\ k_{21} \cdot v_G & k_{22} \cdot v_G & k_{23} \cdot v_G \\ k_{31} \cdot v_B & k_{32} \cdot v_B & k_{33} \cdot v_B \end{pmatrix} \begin{pmatrix} \bar{r}(i) \\ \bar{g}(i) \\ \bar{b}(i) \end{pmatrix} \qquad 1.42$$

An evaluation function of this nature is useful with, e.g., tristimulus colour measuring instruments and electronic colour television camers, since here the spectral reflectance or transmission properties of the colours to be analyzed are unknown. When scanning films or other reproductions which, like film colours, comprise three components, be it via additive or substractive colour mixture, there is the additional possibility of taking the spectral properties of these components into account when establishing the evaluation function. One can, for example, define a suitable number of film colours as reference colours and compute a mean colour rendition index for these colours which must, if the colour rendition for the selected film colours tends to an optimum, reach a maximum value. The optimization result can furthermore be influenced in a desired direction by means of a suitable choice of reference colours. If one chooses as reference colours only a series of skin colours, the result of the optimization will consist primarily in improvement of the colour rendition of skin colours; other colours, however, are rendered more of less falsified in non-predetermined manner. In order to ensure that the colour rendition quality of an optimized scanner is uniformly improved with respect to all colours to be reproduced, a relatively large number of 536 reference colours was laid down.

Every test colour set consists of:

(1) a shade of gray of density $D=1$ at illuminant $D_{65}$ (2) 17 film test colours which are equal with respect to colour location to the standardized test colours of DIN 6169

(3) 6 film test colours equal with respect to colour location to the skin colours.

512 test colours resulting from $8^3$ combinations as subtractive mixture of eight gray equivalent densities of the three colouring materials yellow, magenta and cyan, namely for the gray equivalent densities $D=0.35$, $D=0.55$, $D=0.75$, $D=1.0$, $D=1.25$, $D=1.5$, $D=1.8$ and $D=2.1$. These 512 film test colours each contain eight stages of gray which one obtains, according to definition, when the gray equivalent densities of the three colouring materials all have the same value. The stage of gray with density $D=0.35$ corresponds to picture white and that with density $D=2.1$ to picture black. In FIGS. 8 and 9, eight stages of gray are shown in each case for films Nr. 2 and Nr. 3.

The optimization problem resulting from this can be described mathematically as follows:

The coefficients of the correction matrix $$k = \begin{pmatrix} k_{11} & k_{12} & k_{13} \\ k_{21} & k_{22} & k_{23} \\ k_{31} & k_{32} & k_{33} \end{pmatrix} \qquad 1.43$$

must be determined such that the colour rendition index $$R_{ges} = \frac{1}{536} \sum_{i=1}^{536} R_i \qquad 1.44$$

averaged over 536 film colours is maximal.

Of the nine coefficients of the matrix, however, only six can be chosen independently, since for every altered set of coefficients the white balance must be reestablised by determination of the amplification factors $V_R$, $V_G$ and $V_B$. One is thus concerned here with an optimization problem having six independent variables. Assuming that the required coefficients can lie between $+0.3$ and $-0.3$, and that the maximum resolution should be $10^{-3}$, there are $4.6 \cdot 10^{16}$ different possible combinations of which one, corresponding to the evaluation function, represents the optimal solution.

Mutation or evolution strategy was used as suitable optimization strategy since these are able to abandon secondary maxima again.

Starting point of the optimization was the unit matrix. Since only six of the nine coefficients to be determined are independently variable, a number between one and six was chosen with the help of a random generator. The corresponding coefficient was varied by a determined amount $\oplus k$, the scanner balanced again with respect to picture white through determination of $V_R$, $V_G$ and $V_B$, and the colour rendition index averaged over 536 colours computed. If the new colour rendition index is greater than that of the initial state, the alteration can be retained and the procedure can begin again; if not, the unsuccessful alteration was cancelled and an attempt made to see if an alteration to the coefficient concerned by $-\Delta k$, i.e. in the opposite direction, leads to an improvement. If this measure was also unsuccessful, a new coefficient was drawn. Only if all attempts with all six coefficients were unsuccessful was it necessary either to reduce the step size $\Delta k$ or, if the smallest technically-meaningful alteration has been reached, to break off the optimization because the optimum had been reached.

The optimal matrix coefficients for all scanner-film combinations were determined using this evolution strategy. The special colour rendition indices of the $\gamma$-corrected and optimally matrixed scanner-film combinations are summarized in column c of the appended tables. A clear improvement in the colour rendition quality can be seen for all chromatic test colours; rendition of the gray shades was not influenced by the correction matrix.

The averged colour rendition indices and the standard deviations likewise confirm that the colour rendition quality of all scanner-film combinations was clearly improved.

It is of particular note that the coefficient sets obtained were almost the same in the case of any one scanner for all films investigated, so that a mean set of coefficients can be given for each scanner. These mean sets of coefficients are likewise given in the appended tables. The colour rendition indices (column d) obtained with these coefficients, with the exception of $R_{12}$ (special colour rendition index of test colour Nr. 12), hardly differ from the colour rendition indices which were computed in each case with the optimized coefficients, although there was another larger formal difference in the way the two cases were computed. In case (c) the corrected R-G-B colour values were calculated with the coefficients of the optimized matrix; here, purely mathematical negative colour values were permitted, so that only the residual errors of the colour analysis which cannot be compensated for with the simple electronic corrective measures are reflected in the result. In case (d), besides the correction matrix with the averaged coefficients, the properties of the additive rendition system were taken into consideration in that certain negative colour values were not permitted and were arbitrarily assigned the value zero. Only the colour rendition index of test colour Nr. 12, whose colour location lies outside the triangle drawn up by the primary colours, was noticeably reduced.

The optimal matrix coefficients are thus independent of the spectral properties of the film colouring material, but are dependent on the choice of test colours. The result of the optimization is, however, independent of the choice of reference colours if the test colours are uniformly distributed in a colour space in accordance with sensation. Thus almost the same matrix coefficients were obtained independent of whether 536 film test colours or only the test colours Nr. 1 to Nr. 8 according to DIN 6169 were used for the computation. This is especially important as it goes to show that only a few test colours are required for an optimization and that this optimization can also be cirried out experimentally, in the way described above, at reasonable expense.

FIG. 10 and 11 show the effects of the optimization for two films in each case and the second scanner in the CIE-UCS colour chart. Of particular notice are the large saturation errors of the uncorrected scanner; they can be almost completely eliminated by the corrective measures described.

The effects of the matrixing on the effective spectral channel sensitivities of the scanner are shown in FIGS. 12 and 13. One can see that the matrixed curves do now also have negative parts and are better adapted to the EBU curves than are the non-corrected scanning curves, but there are, however, still large differences between the EBU curves and the curves obtained by means of the correction measures. Despite comparable, good colour rendition quality of the corrected scanners, their effective spectral sensitivities also differ to a fair extent from one another. The reason why such different colour mixture curves lead to such uniformly good results seems to be that when scanning already-reproduced coloured copies there are no problems of metamerism. With the correction matrix it is thus possible to adapt the real scanning curves optimally to the EBU colour mixture curves, since the computed matrix coefficients for each scanner are practically independent of the spectral properties of the film colouring material used. With the help of the non-linear $\gamma$-corrections both the spectral properties of the scanner and the film colouring material are taken into consideration; in support of this is the fact that the necessary $\gamma$ values depend exclusively on the scanner-film combination.

Correction of the gray balance was carried out computationally for the film scanners investigated; this was possible since the spectral data for the film colouring materials were known and the relationships governing their mixing could be described with adequate accuracy. In real reproduction systems it is usual for neither condition to be fulfilled, although the gray balance can also be carried out experimentally in the manner described above if the copy to be scanned has a wedge filter with at least three (black, white and a medium gray) achromatic places. With the help of $\gamma$-correction it is possible, e.g. for the scanned colour signals to be predistorted such that using a suitable colour mixing system the corrected signals can reproduce a corresponding sensitometric wedge.

Determination of the optimal matrix coefficients, which for each analysis system need in principle only be done once since the coefficients are independent of the spectral data of the colouring materials used, can likewise be carried out experimentally, e.g. with the help of evolution strategy. As the experiments have shown, just eight carefully selected reference colours are completely adequate for carrying out the optimization.

On account of the large number of tests it is, however, simpler to carry out this optimization with a computer, in so far as the spectral channel sensitivities are known.

The described correction measures are not limited only to the colour analysis in reproduction systems; the same principles can likewise be used to improve the absolute measuring accuracy of colour measuring instruments according to the tristimulus method. Especially densitometers, which due to their nonobservance of the Luther condition may on no account be counted as a colorimeter, can be turned into simple colour measuring instruments with the correction measures described above.

In the following an example for the colour synthesis is given where, from primary colour signals correct or corrected in accordance with visual colour sensitivity, the colouring material concentration for a rendition system working according to the principle of subtractive colour mixture, or in the case of gravure printing the colour separation densities, are determined.

The primary colour signals are obtained for the colour analysis in a manner as described, e.g. in the preceding example.

The secondary colours formed with the subtractive colour mixture and characterized by their CIE coordinates are clearly determined by the concentration $c_Y$, $c_M$ and $c_C$ of the three fundamental colours used in the colour rendition system if as subtractive colour rendition system a colour film is assumed.

$$X = k \cdot \int_{380 \text{ nm}}^{760 \text{ nm}} 10^{-(c_Y \cdot dY(\lambda) + c_M \cdot dM(\lambda) + c_C \cdot dC(\lambda) + dSch(\lambda))} \cdot S_\lambda \cdot \bar{x}(\lambda) d\lambda \qquad 2.1$$

-continued $$Y = k \cdot \int_{380 \text{ nm}}^{760 \text{ nm}} 10^{-(cY \cdot dY(\lambda) + cM \cdot dM(\lambda) + cC \cdot dC(\lambda) + dSch(\lambda))} \cdot S_\lambda \cdot \bar{y}(\lambda) d\lambda \quad 2.2$$

$$Z = k \cdot \int_{380 \text{ nm}}^{760 \text{ nm}} 10^{-(cY \cdot dY(\lambda) + cM \cdot dM(\lambda) + cC \cdot dC(\lambda) + dSch(\lambda))} \cdot S_\lambda \cdot \bar{z}(\lambda) d\lambda \quad 2.3$$

and with $$d_Y(\lambda) = -\text{Log}(\tau_Y(\lambda)) \quad 2.4$$
$$d_M(\lambda) = -\text{Log}(\tau_M(\lambda)) \quad 2.5$$
$$d_C(\lambda) = -\text{Log}(\tau_C(\lambda)) \quad 2.6$$
$$d_{Sch}(\lambda) = -\text{Log}(\tau_{Sch}(\lambda)) \quad 2.7$$

the colouring material densities are designated and with the following explanations:

$\tau_{Sch}(\lambda)$ = the spectral transmission ratio of a film base;
$\tau_Y(\lambda)$ = the spectral transmission ratio of a yellow colouring material layer;
$\tau_M(\lambda)$ = the spectral transmission ratio of a magnetic colouring material layer;
$\tau_C(\lambda)$ = the spectral transmission ratio of a cyan colouring material layer; and $S_\lambda$ the spectral radiation distribution of the illuminating light source.

If an exact vsb rendition is to be obtained with the help of a subtractive sythesis system of this sort, those concentrations for the colour valences of the copy colours must be determined which, in subtractive mixture, lead to the same colour valences with the given colouring material system; this means mathematically that the exponential system of integral equations 2.1 to 2.3 must be mathematically solved with respect to the concentration. Since this is not possible in closed form, approximation solutions are given which, for one, fulfill the requirement for an exact vsb colour rendition and for the other are technically simple to handle as regards the circuitry.

In a first step the real colouring materials of the colour rendition system were replaced by optimal colour-like model colouring materials. Optimal colours are body colours whose transmission or also reflectance curves have a square shape; only the two transmission ratios $\tau(\lambda)=0$ and $\tau(\lambda)=1$ or the two reflectance ratios $\beta(\lambda)=0$ and $\beta(\lambda)=1$ and at the most two points of discontinuity may be present.

If one plots the associated spectral densities against the wavelength and in so doing assumes that the absorption in the various wavelength ranges is not infinitely great, one obtains spectral density curves of the type shown in FIG. 16 and designated within the scope of this application as optimal colour-like model colouring materials.

FIG. 17 shows how the real colouring materials are copied schematically by the optimal colour-like model colouring materials. The visible wavelength range is divided into three partial wavelength ranges. In the various wavelength ranges the following applies:

$$\lambda_1 \leq \lambda \leq \lambda_2 : \tau(\lambda) = 10^{-cYM \cdot dYM} \quad 2.8$$
$$\lambda_2 \leq \lambda \leq \lambda_3 : \tau(\lambda) = 10^{-cMM \cdot dMM} \quad 2.9$$
$$\lambda_3 \leq \lambda \leq \lambda_4 : \tau(\lambda) = 10^{-cCM \cdot dCM} \quad 2.10$$

Since in the individual partial wavelength ranges each model colouring material has a constant density value and the two other model colouring materials have zero density, and if the matter is simplified by assuming that the carrier material is completely transparent ($d_{Sch}(\lambda)=0$), the equations 2.1 to 2.3 can be written as follows:

$$X = k \cdot \left( 10^{-cYM \cdot dYM} \cdot \int_{\lambda_1}^{\lambda_2} S_\lambda \cdot \bar{x}(\lambda) d\lambda + 10^{-cMM \cdot dMM} \cdot \int_{\lambda_2}^{\lambda_3} S_\lambda \cdot \bar{x}(\lambda) d\lambda + 10^{-cCM \cdot dCM} \cdot \int_{\lambda_3}^{\lambda_4} S_\lambda \cdot \bar{x}(\lambda) d\lambda \right) \quad 2.11$$

$$Y = k \cdot \left( 10^{-cYM \cdot dYM} \cdot \int_{\lambda_1}^{\lambda_2} S_\lambda \cdot \bar{y}(\lambda) d\lambda + 10^{-cMM \cdot dMM} \cdot \int_{\lambda_2}^{\lambda_3} S_\lambda \cdot \bar{y}(\lambda) d\lambda + 10^{-cCM \cdot dCM} \cdot \int_{\lambda_3}^{\lambda_4} S_\lambda \cdot \bar{y}(\lambda) d\lambda \right) \quad 2.12$$

$$Z = k \cdot \left( 10^{-cYM \cdot dYM} \cdot \int_{\lambda_1}^{\lambda_2} S_\lambda \cdot \bar{z}(\lambda) d\lambda + 10^{-cMM \cdot dMM} \cdot \int_{\lambda_2}^{\lambda_3} S_\lambda \cdot \bar{z}(\lambda) d\lambda + 10^{-cCM \cdot dCM} \cdot \int_{\lambda_3}^{\lambda_4} S_\lambda \cdot \bar{z}(\lambda) d\lambda \right) \quad 2.13$$

The various integrals represent the standard colour values of the three spectral areas under consideration of a light source with radiation distribution $S_\lambda$. Since in the wavelength range $\lambda_1$ to $\lambda_2$ there are predominantly blue spectral components, the following notation is introduced:

$$X_B = k \cdot \int_{\lambda_1}^{\lambda_2} S_\lambda \cdot \bar{x}(\lambda) d\lambda \quad 2.14$$

$$Y_B = k \cdot \int_{\lambda_1}^{\lambda_2} S_\lambda \cdot \bar{y}(\lambda) d\lambda \quad 2.15$$

$$Z_B = k \cdot \int_{\lambda_1}^{\lambda_2} S_\lambda \cdot \bar{z}(\lambda) d\lambda \quad 2.16$$

Analogously, in the wavelength range $\lambda_2$ to $\lambda_3$ there are predominantly the green spectral components $$X_G = k \cdot \int_{\lambda_2}^{\lambda_3} S \cdot \bar{x}(\lambda) d\lambda \quad 2.17$$

$$Y_G = k \cdot \int_{\lambda_2}^{\lambda_3} S_\lambda \cdot \bar{y}(\lambda) d\lambda \quad 2.18$$

$$Z_G = k \cdot \int_{\lambda_2}^{\lambda_3} S_\lambda \cdot \bar{z}(\lambda) d\lambda \quad 2.19$$

and in the range $\lambda_3$ to $\lambda_4$ the red spectral components $$X_R = k \cdot \int_{\lambda_3}^{\lambda_4} S_\lambda \cdot \bar{x}(\lambda) d\lambda \quad 2.20$$

-continued $$Y_R = k \cdot \int_{\lambda_3}^{\lambda_4} S_\lambda \cdot \bar{y}(\lambda) d\lambda \quad \quad 2.21$$

$$Z_R = k \cdot \int_{\lambda_3}^{\lambda_4} S_\lambda \cdot \bar{z}(\lambda) d\lambda \quad \quad 2.22$$

Inserting these expressions in the equations 2.11, 2.12 and 2.13 gives $$X = 10^{-c_{YM} \cdot d_{YM}} \cdot X_B + 10^{-c_{MM} \cdot d_{MM}} \cdot X_G + 10^{-c_{CM} \cdot d_{MM}} \cdot X_R \quad 2.23$$

$$Y = 10^{-c_{YM} \cdot d_{YM}} \cdot Y_B + 10^{-c_{MM} \cdot d_{MM}} \cdot Y_G + 10^{-c_{CM} \cdot d_{CM}} \cdot Y_R \quad 2.24$$

$$Z = 10^{-c_{YM} \cdot d_{YM}} \cdot Z_B + 10^{-c_{MM} \cdot d_{MM}} \cdot Z_G + 10^{-c_{CM} \cdot d_{CM}} \cdot Z_R \quad 2.25$$

This corresponds to an additive colour mixture, the share of the primary valences in the additive mixture being laid down by the factors $10^{-c_{CM} \cdot d_{CM}}$, $10^{-c_{MM} \cdot d_{MM}}$ and $10^{-c_{YM} \cdot d_{YM}}$, so that these correspond to the colour values R, G and B:

$$R = 10^{-c_{CM} \cdot d_{CM}} \quad \quad 2.26$$

$$G = 10^{-c_{MM} \cdot d_{MM}} \quad \quad 2.27$$

$$B = 10^{-c_{YM} \cdot d_{YM}} \quad \quad 2.28$$

This means that the model concentrations $c_{YM}$, $c_{MM}$ and $c_{CM}$ determine the share of the primary valences, established via the interval limits, in the additive mixture. For this case of the optimal colour-like model colouring material without so-called secondary densities, the subtractive colour mixture can be reduced to the additive, and the equation system 2.23 to 2.25 can be solved with respect to the concentrations $c_{YM}$, $c_{MM}$ and $c_{CM}$.

As shown in FIG. 18, the optimal colour-like model colouring materials were also established, namely such that in subtractive mixture they give an aselective gray of density D=1. The model concentrations are then, according to definition, the unit concentrations $c_{YM} = c_{MM} = c_{CM} = 1$.

With the help of the thus balanced model colouring material system the mixable colour sorts for gray equivalents $D_{min} = 0$ to $D_{max} = 3.2$ were calculated according to the equations 2.1 to 2.3 and their colour locations, as seen in FIG. 19, shown in the CIE-UCS colour chart. The arbitrarily established limits of the partial wavelength ranges lead to the primary valences $\vec{R}$, $\vec{G}$, $\vec{B}$–likewise shown.

Noticeable is the initially small degree of agreement between the colour-sort zone mixable with help of the model colouring materials and that of the real colouring materials.

Since the densities of the model colouring materials, according to FIG. 18, in the respective spectral areas are $d_{YM} = d_{MM} = d_{CM} = 1$, the following applies:

$$C_{CM} = -\text{Log } R = -\text{Log}(R_X \cdot X + R_Y \cdot Y + R_Z \cdot Z) \quad 2.29$$

$$C_{MM} = -\text{Log } G = -\text{Log}(G_X \cdot X + G_Y \cdot Y + G_Z \cdot Z) \quad 2.30$$

$$C_{YM} = -\text{Log } B = -\text{Log}(B_X \cdot X + B_Y \cdot Y + B_Z \cdot Z) \quad 2.31$$

This result can be represented in circuit form by means of the block diagram of FIG. 20, where for the matrix circuit the following relation applies:

$$(M_1) = \begin{pmatrix} R_X & R_Y & R_Z \\ G_X & G_Y & G_Z \\ B_X & B_Y & B_Z \end{pmatrix} = \begin{pmatrix} X_R & X_G & X_B \\ Y_R & Y_G & Y_B \\ Z_R & Z_G & Z_B \end{pmatrix}^{-1} \quad 2.32$$

The coefficients $R_x$ to $B_z$ are determined by the way the visible spectral area is divided into the three partial wavelength ranges, as becomes clear from the equations 2.14 to 2.22.

To further improve the colour rendition the following procedure was carried out; since the real colouring materials are effective not only in their main absorption areas but also have undesired absorptions in the other spectral areas, the model colouring materials were provided with secondary densities, as is shown in FIGS. 21, 22 and 23 for the individual colouring materials.

FIG. 24 shows the gray mixture for the model colouring materials selected in this way with secondary densities.

In the three wavelength ranges the following applies for the resulting spectral densities with model concentrations $c_{YM}$, $c_{MM}$ and $c_{CM}$ $$\lambda_1 \leq \lambda \leq \lambda_2 : d_B = C_{YM} \cdot d_{YM1} + C_{MM} \cdot d_{MM1} + C_{CM} \cdot d_{CM1} \quad 2.33$$

$$\lambda_2 \leq \lambda \leq \lambda_3 : d_G = C_{YM} \cdot d_{YM2} + C_{MM} \cdot d_{MM2} + C_{CM} \cdot d_{CM2} \quad 2.34$$

$$\lambda_3 \leq \lambda \leq \lambda_4 : d_R = C_{YM} \cdot d_{YM3} + C_{MM} \cdot d_{MM3} + C_{CM} \cdot d_{CM3} \quad 2.35$$

Since in the blue, green and red spectral areas the sum densities $d_B$, $d_G$ and $d_R$ are in each case independent again of the wavelength, equations 2.1 and 2.3 can be written in the following form $$X = k \cdot \left( 10^{-d_B} \cdot \int_{\lambda_1}^{\lambda_2} S_\lambda \cdot \bar{x}(\lambda) d\lambda + 10^{-d_G} \cdot \int_{\lambda_2}^{\lambda_3} S_\lambda \cdot \bar{x}(\lambda) d\lambda + 10^{-d_R} \cdot \int_{\lambda_3}^{\lambda_4} S_\lambda \cdot \bar{x}(\lambda) d\lambda \right) \quad 2.36$$

$$Y = k \cdot \left( 10^{-d_B} \cdot \int_{\lambda_1}^{\lambda_2} S_\lambda \cdot \bar{y}(\lambda) d\lambda + 10^{-d_G} \cdot \int_{\lambda_2}^{\lambda_3} S_\lambda \cdot \bar{y}(\lambda) d\lambda + 10^{-d_R} \cdot \int_{\lambda_3}^{\lambda_4} S_\lambda \cdot \bar{y}(\lambda) d\lambda \right) \quad 2.37$$

$$Z = k \cdot \left( 10^{-d_B} \cdot \int_{\lambda_1}^{\lambda_2} S_\lambda \cdot \bar{z}(\lambda) d\lambda + 10^{-d_G} \cdot \int_{\lambda_2}^{\lambda_3} S_\lambda \cdot \bar{z}(\lambda) d\lambda + 10^{-d_R} \cdot \int_{\lambda_3}^{\lambda_4} S_\lambda \cdot \bar{z}(\lambda) d\lambda \right) \quad 2.38$$

The partial integrals represent here too the standard colour values of the three spectral areas under consideration of the rendition light source $S_{80}$. After establishing the limits of the spectral areas, each area can again be conceived as a primary valence characterized by the standard colour values according to the equations 2.14 to 2.22. From this follows $$X = 10^{-dB} \cdot X_B + 10^{-dG} \cdot X_G + 10^{-dR} \cdot X_R \qquad 2.39$$

$$Y = 10^{-dB} \cdot Y_B + 10^{-dG} \cdot Y_G + 10^{-dR} \cdot Y_R \qquad 2.40$$

$$Z = 10^{-dB} \cdot Z_B + 10^{-dG} \cdot Z_G + 10^{-dR} \cdot Z_R \qquad 2.41$$

The factors $10^{-dB}$, $10^{-dG}$ and $10^{-dR}$ can here too be indicated as components $\vec{R}$, $\vec{G}$ and $\vec{B}$ of primary valences R, G and B in the additive mixture, so that the following applies $$R = 10^{-dR} \qquad 2.42$$

$$G = 10^{-dG} \qquad 2.43$$

$$B = 10^{-dB} \qquad 2.44$$

The size of the components, according to 2.33 and 2.35, is composed here however of the main and secondary effects of all three model colouring materials. If, e.g. the concentration $c_{CM}$ of the cyan model colouring material changes, this influences the sum densities $d_R$, $D_G$ and $d_B$ and thus not only the component R of primary valence $\vec{R}$ but also, due to the secondary effects in the two other spectral areas, the components $\vec{G}$ and $\vec{B}$ of primary valences G and B are altered.

As shown in the CIE-UCS Colour Chart according to FIG. 25, this means that the mixing results of a model system with secondary densities no longer lie on straight connecting lines if the model concentration is altered but on curved lines as is the case with real colouring materials in subtractive mixture. One sees further that the extent of the attainable colour-sort zone has become smaller for the model colouring material system. The complete solution for optimal colour-like model colouring materials with secondary densities is obtained by inserting the colour values from equations 2.42 to 2.44 into 2.39 to 2.41 and by solving with respect to R, G and B.

$$R = R_x \cdot X + R_y \cdot Y + R_z \cdot Z \qquad 2.45$$

$$G = G_x \cdot X + G_y \cdot Y + G_z \cdot Z \qquad 2.46$$

$$B = B_x \cdot X + B_y \cdot Y + B_z \cdot Z \qquad 2.47$$

On the other hand, according to equations 2.33 to 2.35 and 2.42 to 2.44, the following also holds:

$$d_R = -\text{Log } R = c_{cm} \cdot d_{cm3} + C_{mm} \cdot d_{mm3} + C_{ym} \cdot d_{ym3} \qquad 2.48$$

$$d_G = -\text{Log } G = c_{cm} \cdot d_{cm2} + c_{mm} + d_{mm2} + c_{ym} \cdot d_{ym2} \qquad 2.49$$

$$d_B = -\text{Log } B = c_{cm} \cdot d_{cm1} + c_{mm} \cdot d_{mm1} + c_{ym} \cdot d_{ym1} \qquad 2.50$$

and from this the model concentrations $c_{GM}$, $c_{MM}$ and $c_{CM}$ can be calculated $$c_{cm} = -(d_m \cdot \text{Log } R + d_{12} \cdot \text{Log } G + d_{13} \cdot \text{Log } B) \qquad 2.51$$

$$c_{mm} = -(d_{21} \cdot \text{Log } R + d_{22} \cdot \text{Log } G + d_{23} \cdot \text{Log } B) \qquad 2.52$$

$$c_{ym} = -(d_{31} \cdot \text{Log } R + d_{32} \cdot \text{Log } G + d_{33} \cdot \text{Log } B) \qquad 2.53$$

Replacement of the model colouring materials without secondary densities by those with secondary densities is realized with regard to circuitry by adding a matrix circuit M2 to the circuit shown in FIG. 20, as is shown in the block diagram of FIG. 26

For the matrix the following applies:

$$(M_2) = \begin{pmatrix} d_{11} & d_{12} & d_{13} \\ d_{21} & d_{22} & d_{23} \\ d_{31} & d_{32} & d_{33} \end{pmatrix} = \begin{pmatrix} d_{CM3} & d_{MM3} & d_{YM3} \\ d_{CM2} & d_{MM2} & d_{YM2} \\ d_{CM1} & d_{MM1} & d_{YM1} \end{pmatrix}^{-1} \qquad 2.54$$

The coefficients of this matrix are determined by the choice of the amplitude ratios of main and secondary densities for the model colouring materials in the individual partial wavelength ranges.

In order to extend the reproducible colour scope of the model an attempt was made via optimization, starting out from the block diagram of FIG. 26 but departing from the clearly demonstrable, to determine the coefficients of matrices ($M_1$) and ($M_2$).

Since the model is an approximation solution for a real colouring material system, with which the rendition colours are subtractively mixed, a suitable number of reference colours was defined which are produced with the help of this real colouring material system. For these reference colours both the vsb values X, Y and Z and the gray equivalent densities $D_Y$, $D_M$ and $D_C$ or the concentrations $c_Y$, $c_M$ and $c_C$ are known. This means that for the reference colours the exact solutions to the subtractive equations 2.1, 2.2 and 2.3 are known. As the optimization result can be dependent on the choice of these reference colours, 512 reference colours were laid down which are to a certain extent uniformly distributed in colour space. They were the mixable colour sorts, shown in FIG. 15, of the real colouring materials for gray equivalent densities of $D_{min} = 0.3$ to $D_{max} = 2.5$, although it must be mentioned that for the sake of clarity not all intermediate values are drawn in in this For these reference colours the model gray equivalent densities $D_{YM}$, $D_{MM}$ and $D_{CM}$ were calculated according to block diagram FIG. 26 from the CIE coordinates. Between the real and model gray equivalent densities a mean quadratic difference can subsequently be formed for yellow, magenta and cyan with the equations 2.55 to 2.57.

$$\Delta D_Y = \sqrt{\sum_{i=1}^{512} (D_{Yi} - D_{YMi})^2} \qquad 2.55$$

$$\Delta D_M = \sqrt{\sum_{i=1}^{512} (D_{Mi} - D_{MMi})^2} \qquad 2.56$$

$$\Delta D_C = \sqrt{\sum_{i=1}^{512} (D_{Ci} - D_{CMi})^2} \qquad 2.57$$

The following relation was formed for the evaluation function:

$$\Delta D = \sqrt{\Delta D_Y^2 + \Delta D_M^2 + \Delta D_C^2} \qquad 2.58$$

The aim of the optimization was to minimize this mean quadratic difference. Another possibility consists in optimizing the colour rendition index for the colours mentioned.

For the reasons already referred to in the colour analysis context, the optimization was carried out by means of an evolution strategy.

With the help of a random generator one of the 18 matrix coefficients for matrices $M_1$ and $M_2$ was drawn and, starting from an initial state, was altered by a given amount. With this model condition the model concentrations or gray equivalent densities were then calculated for all 512 reference colours—whose standard colour values were known—and the mean quadratic difference between the actual and the model values determined. If this decreased, the alteration to the coefficients was retained and the process begun anew. If not, an attempt was made to see if a directionally-opposed alteration to the coefficients led to an improvement. If this was not the case, this coefficient was left unchanged and a new one was drawn. Depending on the success and failure quota, the amount of the alteration was increased or decreased (incrementation control). When the smallest technically-meaningful alteration had been reached, the optimization was broken off and the optimum had been reached.

If the model was optimized in the manner described above, the sizes of the model concentrations obtained for the reference stages of gray were no longer necessarily equal since as a result of the alterations to the coefficients the balance system of the model system was disturbed. The circuit according to FIG. 26 was herefore supplemented by a gray balance as shown in FIG. 27. For every optimization step the three characterizing curves were determined such that the eight stages of gray contained in the reference colours, of $D_{min}=0$ to $D_{max}=3.2$, gave model gray equivalent densities of equal size.

For the chromatic reference colours additional correction measures were developed since, as shown in FIGS. 28 to 30, the model densities, reproduced there with unbroken lines, for the predetermined real fundamental reference colours yellow, magenta and cyan show deviations from the actual colour densities shown with the dashed lines. The same also applies, as shown in FIGS. 31 to 33, for the secondary colours of first order.

The non-linearity arises due to the fact that the non-linear subtractive colour mixture was approximated by means of using a model or circuit with essentially linear component members. As large sections of these characterizing curves can be approximated by means of straight lines, however, this applying very well up to $D=2$, a subsequent correction of these model gray equivalent densities can be carried out with the help of a simple matrix circuit $M_3$ corresponding to FIG. 34, to which the signals coming from the gray balance are supplied. Since for every optimization step the gray balance guarantees that the model gray equivalent densities for achromatic reference colours are exact, this correction matrix $M_3$ only affects the chromatic colours.

In order to optimally determine the coefficients of matrix $M_3$ an evolution strategy was carried out where the coefficients of all three matrices $M_1$, $M_2$ and $M_3$ were varied and the number of degrees of freedom was raised to 27 as a result of the additional correction matrix $M_3$. The starting condition of matrices $M_1$, $M_2$ and $M_3$ at the beginning of the optimization was chosen arbitrarily, e.g. starting from the unit matrix, i.e. from model colouring materials without secondary densities.

A very large colour-sort zone corresponds to this as can be seen from FIG. 35, to which a colour rendition index $R_{ges}=-462$ corresponds.

After only 92 optimization tests the model condition shown in FIG. 36 had been reached, being characterized by an overall colour rendition index $R_{ges}=52$.

The model colour-sort zone has already approximated considerably to the colour-sort zone of the real colouring materials, and the colour locations of the fundamental colours yellow, magenta and cyan and likewise the secondary colours of first order, red, green and blue already lie on curved lines. After 10 425 tests the optimum had been reached, since the amounts by which the arbitrarily-selected coefficients were altered had reached the smallest technically-meaningful size with the help of the incrementation control. FIG. 37 shows this end state of the optimization, it being characterized by an overall colour rendition index of $R_{ges}=76$. The mixing lines have adapted to a large extent to those of the real colouring materials.

Deviations now remain only at high densities. If, however, the density range is limited to $D_{min}=0.3$ to $D_{max}=2.5$, which is meaningful in practice, one obtains a very good approximation to the colour-sort zone of the real colouring materials, which also ranges from $D_{min}=0.3$ to $D_{max}=2.5$, as is shown in FIG. 38.

FIG. 39 shows the characterizing curves required for the gray balance at the end state. These are straight lines since gray equivalent densities and concentrations for optimal colour-like model colouring materials in purely subtractive mixture are proportional to one another. This means—but only for a real colouring material system with purely subtractive colour mixture—that the circuit of FIG. 34 can be reduced to that of FIG. 27.

This is no longer the case with only predominantly subtractive reproduction systems, as e.g. gravure printing.

The effectivity of the correction matrix $M_3$ for chromatic colours can be seen from FIGS. 40 to 45.

The precedingly-described circuits can also be used for gravure printing as its colour mixture is either subtractive or at least predominantly subtractive.

FIG. 46 shows a circuit of this nature. It differs from that of FIG. 34 only in that the circuit elements for the gray balance carry out a reforming of the model concentration signals into colour separation density signals and that the characterizing curves of FIG. 44 for the gray balance are no longer straight lines, contrary to purely subtractive colour mixture. FIG. 47 shows these characterizing curves.

The reason for this is that with gravure printing there is no strong proportionality between model concentrations and model separation densities as there is between model concentrations and model gray equivalent densities in the analogous case of colouring material systems working purely subtractively. The characterizing curves for the gray balance contain in addition the transfer characteristic of the separation densities, via the etch depressions, to the transferred quantity of colouring material. This determines the size frequently referred to in practice as colour density, which is proportional to the term concentration used in this application.

A further improvement in the colour rendition quality can be obtained with the circuit of FIG. 46 if one compares the obtained model separation densities $D_{CM}$, $D_{MM}$, $D_{YM}$ with discrete values of a memorized colour chart. For this a circuit as shown in FIG. 48 is used, where the model separation density signals are fed to a comparator and interpolation circuit that is connected to the memory in which the colour chart is stored. FIG. 48' shows a modification of the circuit of FIG. 48 further including a storage device, such as a video tape recorder, a device for varying the concentration and colour separation signals, a colour TV display unit and an adaptation network which is arranged to perform the functions of the components prior to the comparator and interpolation circuit of FIG. 48. The adaptation circuit also includes an adaptation matrix ($M_{TV}$) to convert from the CIE to the EBU system. FIG. 48" shows another modification of the circuit of FIG. 48 wherein an adaptation matrix, similar to the matrix ($M_{TV}$) of FIG. 48', and a colour TV display unit are connected to receive the x, y and z values and to present a display in accordance therewith. A device for varying the concentration signals and colour separation signals is also provided.

Since namely the model separation densities and the separation densities of the real colouring material system form two "colour spaces" only slightly distorted with respect to one another, the required number of discrete stored colours of the chart can be considerably smaller. The memorized colour chart is thus no longer parametrized according to colour-sensitivity sizes on one hand and concentrations on the other hand, instead the colour-sensitivity sizes are replaced with the help of the model by the model separation densities. This results in a simpler interpolation algorithm.

This procedure is especially suitable for gravure printing, which does not obey the mathematical interrelationships of subtractive colour mixture exactly. The errors arising in the model separation densities due to deviation in the colour mixture can, together with the errors caused principally through use of the model, be reduced to a minimum by means of the following interpolation in the largely linearized chart.

Having undertaken this correction one can thus speak of a correct visual-colour-sensitivity-based colour synthesis.

TABLE A 1.1

General colour rendition indices $R_a$ acc. to DIN 6169 and standard deviations $\sigma_a$ of scanner Nr. 1 for different film test colour sets.

| Scanner Nr. 1 Nature of correction | $R_a/\sigma_a$ (8 test colours) | | | | | |
|---|---|---|---|---|---|---|
| | Film 8 | Film 2 | Film 3 | Film 4 | Film 5 | Film 6 |
| no correction | 79/10 | 74/17 | 79/9 | 79/5 | 76/11 | 81/6 |
| only gamma | 79/7 | 79/6 | 79/6 | 78/4 | 78/4 | 83/6 |
| gamma + opt. matrix | 93/4 | 93/3 | 92/4 | 94/2 | 93/4 | 93/4 |
| gamma + mean matrix | 92/6 | 92/4 | 92/5 | 92/6 | 92/5 | 93/4 |

TABLE A 1.2

Colour rendition indices $R_{gray}$ and standard deviations $\sigma_{gray}$ over 8 shades of gray scanner Nr. 1 for different film test colour sets.

| Scanner Nr. 1 Nature of correction | $R_{gray}/\sigma_{gray}$ (8 test colours) | | | | | |
|---|---|---|---|---|---|---|
| | Film 1 | Film 2 | Film 3 | Film 4 | Film 5 | Film 6 |
| no correction | 93/3 | 79/10 | 88/6 | 93/3 | 85/7 | 93/3 |

TABLE A 1.2-continued

Colour rendition indices $R_{gray}$ and standard deviations $\sigma_{gray}$ over 8 shades of gray scanner Nr. 1 for different film test colour sets.

| Scanner Nr. 1 Nature of correction | $R_{gray}/\sigma_{gray}$ (8 test colours) | | | | | |
|---|---|---|---|---|---|---|
| | Film 1 | Film 2 | Film 3 | Film 4 | Film 5 | Film 6 |
| only gamma | 100/1 | 99/0 | 100/0 | 99/1 | 99/1 | 100/0 |
| gamma + opt. matrix | 99/0 | 99/0 | 100/0 | 99/1 | 99/1 | 100/0 |
| gamma + mean matrix | 99/0 | 99/0 | 100/0 | 99/1 | 99/1 | 100/0 |

TABLE A 1.3

Colour rendition indices $R_{ges}$ and standard deviations $\sigma_{ges}$ over 536 test colours of scanner Nr. 1 for different film test colour sets.

| Scanner Nr. 1 Nature of correction | $R_{ges}/\sigma_{ges}$ (536 test colours) | | | | | |
|---|---|---|---|---|---|---|
| | Film 1 | Film 2 | Film 3 | Film 4 | Film 5 | Film 6 |
| no correction | 77/15 | 70/16 | 72/16 | 72/18 | 71/15 | 77/12 |
| only gamma | 77/15 | 76/17 | 74/16 | 72/19 | 75/17 | 79/13 |
| gamma + opt. matrix | 88/10 | 86/12 | 87/11 | 86/12 | 87/12 | 88/9 |
| gamma + mean matrix | 87/12 | 85/14 | 87/12 | 84/16 | 87/13 | 87/10 |

In order to evaluate this optimization with 18 degrees of freedon, 512 reference colours were selected which can be produced with the help of the real colouring material system. Thus both their vsb values X,Y an Z and the gray equivalent densities $D_Y$, $D_M$ and $D_c$ or the concentrations $c_Y$, $c_M$, $c_C$ are known. The reference colours selected were the mixable colour sorts, shown in FIG. 5, of the real colouring materials for gray equivalent densities of $D_{min}=0.3$ to $D_{max}=2.5$. For the sake of clarity not all intermediate values have been drawn in.

For these reference colours the model gray equivalent densities $D_{YM}$, $D_{MM}$ and $D_{CM}$ were calculated from the CIE coordinates X, Y and Z. A mean quadratic difference between the real and model gray equivalent densities was found for yellow, magenta and cyan according to the following equations.

$$\Delta D_Y = \sqrt{\sum_{i=1}^{512} (D_{Yi} - D_{YMi})^2} \quad 2.55$$

$$\Delta D_M = \sqrt{\sum_{i=1}^{512} (D_{Mi} - D_{MMi})^2} \quad 2.56$$

$$\Delta D_C = \sqrt{\sum_{i=1}^{512} (D_{Ci} - D_{CMi})^2} \quad 2.57$$

From this the following evaluation criterium was formed $$\Delta D = \sqrt{\Delta D_Y^2 + \Delta D_M^2 + \Delta D_C^2} \quad 2.58$$

TABLE A 1.4

Scanner Nr. 1
Special colour rendition indices $R_i$ for different film test colour sets.
Scanner adjusted to test colour 17 in each case ($R_{17} = 100$).

| | | | Special colour rendition indices $R_i$ | | | | | | | |
|---|---|---|---|---|---|---|---|---|---|---|
| | Film test colour | | Film 1 | | | | Film 2 | | | |
| Nr. | Designation of ref. colour | | a | b | c | d | a | b | c | d |
| 1 | Altrose | DIN 6169 | 83 | 88 | 95 | 95 | 68 | 85 | 95 | 96 |
| 2 | Mustard yellow | DIN 6169 | 66 | 74 | 94 | 91 | 51 | 75 | 94 | 93 |
| 3 | Yellow-green | DIN 6169 | 57 | 64 | 84 | 79 | 44 | 68 | 86 | 86 |
| 4 | Green | DIN 6169 | 84 | 83 | 89 | 93 | 86 | 80 | 89 | 87 |
| 5 | Light blue | DIN 6169 | 87 | 80 | 93 | 93 | 95 | 78 | 92 | 90 |
| 6 | Skyblue | DIN 6169 | 81 | 75 | 97 | 97 | 86 | 74 | 96 | 95 |
| 7 | Aster violet | DIN 6169 | 85 | 81 | 96 | 98 | 78 | 83 | 94 | 95 |
| 8 | Lilac | DIN 6169 | 87 | 85 | 94 | 92 | 79 | 86 | 94 | 97 |
| 9 | Red | DIN 6169 | 69 | 69 | 64 | 57 | 77 | 70 | 49 | 40 |
| 10 | Yellow | DIN 6169 | 27 | 29 | 69 | 62 | 34 | 36 | 74 | 72 |
| 11 | Green | DIN 6169 | 69 | 66 | 74 | 77 | 77 | 63 | 75 | 71 |
| 12 | Blue | DIN 6169 | 61 | 59 | 90 | 68 | 55 | 53 | 83 | 65 |
| 13 | Pink (skin) | DIN 6169 | 78 | 78 | 96 | 97 | 79 | 75 | 94 | 94 |
| 14 | Leafgreen | DIN 6169 | 75 | 83 | 94 | 91 | 57 | 84 | 93 | 92 |
| 15 | Achrom. D = 1.61 | DIN 6169 | 92 | 100 | 100 | 99 | 76 | 99 | 99 | 99 |
| 16 | Achrom. D = 0.93 | DIN 6169 | 91 | 100 | 100 | 100 | 70 | 99 | 99 | 99 |
| 17 | Achrom. D = 0.35 | DIN 6169 | 100 | 100 | 100 | 100 | 100 | 100 | 100 | 100 |
| 18 | Skincolour Europ. | (blond) | 81 | 84 | 97 | 98 | 72 | 82 | 96 | 96 |
| 19 | Skincolour Europ. | (brunette) | 78 | 82 | 97 | 97 | 68 | 80 | 96 | 95 |
| 20 | Skincolour Japanese | | 74 | 80 | 97 | 97 | 62 | 79 | 96 | 95 |
| 21 | Skincolour Indian | | 75 | 84 | 97 | 98 | 56 | 83 | 96 | 96 |
| 22 | Skincolour Mulatto | | 79 | 89 | 97 | 97 | 56 | 90 | 95 | 95 |
| 23 | Skincolour Negro | | 85 | 96 | 99 | 99 | 62 | 96 | 97 | 97 |
| 24 | Achrom. D = 0.35 | (filmwhite) | 100 | 100 | 100 | 100 | 100 | 100 | 100 | 100 |
| 25 | Achrom. D = 0.55 | | 95 | 100 | 100 | 100 | 84 | 99 | 99 | 99 |
| 26 | Achrom. D = 0.75 | | 93 | 100 | 100 | 100 | 74 | 99 | 99 | 99 |
| 27 | Achrom. D = 1.00 | | 91 | 100 | 100 | 100 | 70 | 100 | 100 | 100 |
| 28 | Achrom. D = 1.25 | | 91 | 100 | 100 | 100 | 69 | 99 | 99 | 99 |
| 29 | Achrom. D = 1.50 | | 91 | 99 | 99 | 99 | 72 | 100 | 99 | 100 |
| 30 | Achrom. D = 1.80 | | 92 | 99 | 99 | 99 | 77 | 99 | 99 | 99 |
| 31 | Achrom. D = 2.10 | (filmblack) | 95 | 99 | 99 | 99 | 84 | 99 | 99 | 99 |

Correction matrix $$K = \begin{pmatrix} 1{,}000 & -0{,}023 & -0{,}086 \\ 0{,}000 & 1{,}000 & -0{,}028 \\ 0{,}011 & -0{,}115 & 1{,}000 \end{pmatrix}$$

$\gamma\text{red} = 0{,}960$  $\gamma\text{red} = 0{,}851$
$\gamma\text{green} = 0{,}995$  $\gamma\text{green} = 0{,}971$
$\gamma\text{blue} = 1{,}011$  $\gamma\text{blue} = 0{,}990$

| Colour rendition indices according to DIN 6169 (Part 5) | | | | | | | | | | | | | | | |
|---|---|---|---|---|---|---|---|---|---|---|---|---|---|---|---|
| Film 3 | | | | Film 4 | | | | Film 5 | | | | Film 6 | | | |
| a | b | c | d | a | b | c | d | a | b | c | d | a | b | c | d |
| 96 | 89 | 92 | 94 | 80 | 82 | 95 | 97 | 69 | 82 | 96 | 97 | 94 | 95 | 92 | 86 |
| 84 | 75 | 94 | 92 | 73 | 78 | 96 | 97 | 60 | 76 | 95 | 95 | 84 | 83 | 95 | 96 |
| 74 | 66 | 82 | 81 | 71 | 76 | 90 | 96 | 57 | 72 | 87 | 92 | 74 | 73 | 85 | 92 |
| 71 | 81 | 92 | 91 | 77 | 72 | 91 | 79 | 84 | 75 | 89 | 83 | 72 | 81 | 91 | 92 |
| 70 | 81 | 96 | 94 | 81 | 75 | 93 | 87 | 90 | 75 | 92 | 88 | 78 | 85 | 94 | 98 |
| 70 | 77 | 94 | 97 | 82 | 76 | 96 | 97 | 86 | 74 | 98 | 97 | 79 | 83 | 98 | 91 |
| 79 | 81 | 95 | 96 | 86 | 84 | 95 | 89 | 81 | 83 | 96 | 93 | 82 | 83 | 99 | 95 |
| 83 | 84 | 92 | 92 | 84 | 83 | 96 | 91 | 78 | 84 | 96 | 94 | 84 | 83 | 90 | 89 |
| 73 | 65 | 65 | 66 | 73 | 70 | 59 | 67 | 68 | 72 | 59 | 62 | 67 | 66 | 68 | 55 |
| 43 | 39 | 79 | 74 | 47 | 46 | 78 | 82 | 34 | 36 | 70 | 71 | 52 | 54 | 77 | 92 |
| 53 | 63 | 76 | 74 | 59 | 56 | 79 | 65 | 68 | 59 | 77 | 69 | 57 | 64 | 74 | 76 |
| 54 | 58 | 88 | 68 | 58 | 59 | 86 | 68 | 62 | 59 | 87 | 68 | 67 | 66 | 82 | 70 |
| 88 | 85 | 90 | 93 | 80 | 77 | 96 | 96 | 73 | 74 | 94 | 92 | 89 | 91 | 93 | 85 |
| 85 | 84 | 91 | 90 | 81 | 88 | 93 | 97 | 69 | 86 | 94 | 97 | 84 | 88 | 96 | 98 |
| 84 | 99 | 100 | 100 | 91 | 100 | 99 | 99 | 82 | 99 | 99 | 99 | 91 | 99 | 99 | 99 |
| 84 | 100 | 99 | 100 | 92 | 100 | 100 | 100 | 81 | 99 | 100 | 100 | 90 | 99 | 100 | 100 |
| 100 | 100 | 100 | 100 | 100 | 100 | 100 | 100 | 100 | 100 | 100 | 100 | 100 | 100 | 100 | 100 |
| 93 | 88 | 94 | 97 | 82 | 83 | 97 | 97 | 73 | 81 | 96 | 95 | 92 | 93 | 96 | 90 |
| 92 | 85 | 95 | 97 | 80 | 81 | 97 | 97 | 70 | 80 | 96 | 95 | 91 | 92 | 96 | 90 |
| 91 | 83 | 95 | 97 | 77 | 79 | 96 | 97 | 65 | 78 | 96 | 95 | 90 | 90 | 96 | 89 |
| 92 | 83 | 97 | 96 | 77 | 83 | 97 | 97 | 64 | 83 | 97 | 97 | 91 | 91 | 97 | 92 |
| 91 | 86 | 98 | 96 | 79 | 87 | 97 | 98 | 65 | 89 | 96 | 98 | 92 | 93 | 98 | 94 |
| 87 | 93 | 98 | 97 | 85 | 94 | 99 | 99 | 72 | 95 | 98 | 99 | 91 | 96 | 99 | 99 |
| 100 | 100 | 100 | 100 | 100 | 100 | 100 | 100 | 100 | 100 | 100 | 100 | 100 | 100 | 100 | 100 |
| 92 | 100 | 99 | 99 | 96 | 100 | 100 | 100 | 90 | 100 | 100 | 100 | 95 | 100 | 100 | 100 |
| 87 | 100 | 99 | 99 | 93 | 100 | 100 | 100 | 84 | 100 | 100 | 100 | 92 | 100 | 100 | 100 |
| 83 | 100 | 100 | 100 | 92 | 100 | 100 | 100 | 80 | 100 | 100 | 100 | 89 | 100 | 100 | 100 |
| 82 | 100 | 100 | 100 | 91 | 100 | 100 | 100 | 79 | 100 | 100 | 100 | 89 | 100 | 100 | 100 |
| 82 | 99 | 100 | 100 | 90 | 99 | 99 | 99 | 80 | 99 | 99 | 99 | 90 | 99 | 99 | 99 |
| 86 | 99 | 99 | 99 | 92 | 100 | 100 | 100 | 83 | 98 | 98 | 98 | 92 | 99 | 99 | 99 |

-continued

| Colour rendition indices according to DIN 6169 (Part 5) | | | | | | | | | | | | | | | |
|---|---|---|---|---|---|---|---|---|---|---|---|---|---|---|---|
| Film 3 | | | | Film 4 | | | | Film 5 | | | | Film 6 | | | |
| a | b | c | d | a | b | c | d | a | b | c | d | a | b | c | d |
| 89 | 99 | 99 | 99 | 92 | 98 | 98 | 98 | 87 | 98 | 98 | 98 | 93 | 100 | 100 | 100 |
| γred = 1,041 | | | | γred = 0,946 | | | | γred = 0,909 | | | | γred = 1,047 | | | |
| γgreen = 0,962 | | | | γgreen = 0,972 | | | | γgreen = 0,992 | | | | γgreen = 0,998 | | | |
| γblue = 0,980 | | | | γblue = 0,987 | | | | γblue = 1,014 | | | | γblue = 1,023 | | | |

Corrective measure at scanner Nr. 1
a none (original state)
b only gamma correction
c gamma correction + opt. matrix
d gamma correction + mean matrix

TABLE A 2.1

General colour rendition indices $R_a$ according to DIN 6169 and standard deviations $\sigma_a$ of scanner Nr. 2 for different film test colour sets.

Scanner Nr. 2

| Nature of correction | $R_a/\sigma_a$ (8 test colours) | | | | | |
|---|---|---|---|---|---|---|
| | Film 1 | Film 2 | Film 3 | Film 4 | Film 5 | Film 6 |
| no correction | 75/9 | 71/15 | 76/7 | 75/5 | 73/10 | 77/7 |
| only gamma | 76/7 | 75/6 | 77/7 | 75/5 | 75/5 | 80/8 |
| gamma + opt. matrix | 94/3 | 93/2 | 93/3 | 95/2 | 94/3 | 94/3 |
| gamma + mean matrix | 93/4 | 93/3 | 93/4 | 94/5 | 94/4 | 93/5 |

TABLE A 2.2

Colour rendition indices $R_{gray}$ and standard deviations $\sigma_{gray}$ over 8 shades of gray of scanner Nr. 2 for different film test colour sets.

Scanner Nr. 2

| Nature of correction | $R_{gray}/\sigma_{gray}$ (8 test colours) | | | | | |
|---|---|---|---|---|---|---|
| | Film 1 | Film 2 | Film 3 | Film 4 | Film 5 | Film 6 |
| no correction | 92/4 | 79/10 | 95/2 | 92/3 | 85/7 | 96/2 |
| only gamma | 100/0 | 99/1 | 100/0 | 100/0 | 100/0 | 100/0 |
| gamma + opt. matrix | 100/0 | 98/1 | 100/0 | 99/0 | 100/0 | 100/0 |
| gamma + mean matrix | 100/0 | 98/1 | 100/0 | 99/0 | 99/0 | 100/0 |

TABLE A 2.3

Colour rendition indices $R_{ges}$ and standard deviations $\sigma_{ges}$ over 536 test colours of scanner Nr. 2 for different film test colour sets.

Scanner Nr. 2

| Nature of correction | $R_{ges}/\sigma_{ges}$ (536 test colours) | | | | | |
|---|---|---|---|---|---|---|
| | Film 1 | Film 2 | Film 3 | Film 4 | Film 5 | Film 6 |
| no correction | 74/14 | 67/15 | 71/17 | 69/18 | 69/14 | 74/14 |
| only gamma | 75/15 | 73/17 | 71/16 | 70/19 | 73/17 | 76/14 |
| gamma + opt. matrix | 89/10 | 87/12 | 88/11 | 87/14 | 89/10 | 90/9 |
| gamma + mean matrix | 88/11 | 86/13 | 88/11 | 87/15 | 88/12 | 88/11 |

TABLE A 2.4

Scanner Nr. 2
Special colour rendition indices $R_i$ for different film test colour sets.
Scanner adjusted to test colour 17 in each case ($R_{17}$ = 100).

| | | | Special colour rendition indices $R_i$ | | | | | | | |
|---|---|---|---|---|---|---|---|---|---|---|
| | Film test colour | | Film 1 | | | | Film 2 | | | |
| Nr. | Designation of ref. colour | | a | b | c | d | a | b | c | d |
| 1 | Altrose | DIN 6169 | 80 | 88 | 95 | 94 | 65 | 82 | 95 | 96 |
| 2 | Mustard yellow | DIN 6169 | 65 | 74 | 96 | 94 | 51 | 72 | 95 | 92 |
| 3 | Yellow-green | DIN 6169 | 56 | 63 | 89 | 83 | 47 | 65 | 90 | 88 |
| 4 | Green | DIN 6169 | 78 | 75 | 88 | 95 | 83 | 73 | 90 | 88 |
| 5 | Light blue | DIN 6169 | 88 | 80 | 93 | 94 | 95 | 77 | 94 | 90 |
| 6 | Skyblue | DIN 6169 | 76 | 70 | 98 | 97 | 78 | 68 | 95 | 94 |
| 7 | Aster violet | DIN 6169 | 77 | 75 | 98 | 96 | 72 | 77 | 94 | 96 |
| 8 | Lilac | DIN 6169 | 81 | 81 | 94 | 89 | 74 | 82 | 95 | 97 |
| 9 | Red | DIN 6169 | 70 | 72 | 62 | 55 | 80 | 73 | 46 | 44 |
| 10 | Yellow | DIN 6169 | 34 | 37 | 80 | 75 | 38 | 40 | 85 | 80 |
| 11 | Green | DIN 6169 | 65 | 61 | 74 | 80 | 71 | 57 | 75 | 72 |
| 12 | Blue | DIN 6169 | 56 | 54 | 89 | 69 | 52 | 47 | 83 | 66 |
| 13 | Pink (skin) | DIN 6169 | 78 | 79 | 97 | 98 | 77 | 75 | 96 | 95 |
| 14 | Leafgreen | DIN 6169 | 73 | 81 | 96 | 93 | 60 | 83 | 95 | 95 |
| 15 | Achrom. D = 1.61 | DIN 6169 | 89 | 99 | 100 | 100 | 77 | 98 | 98 | 98 |
| 16 | Achrom. D = 0.93 | DIN 6169 | 89 | 100 | 100 | 100 | 70 | 98 | 98 | 98 |
| 17 | Achrom. D = 0.35 | DIN 6169 | 100 | 100 | 100 | 100 | 100 | 100 | 100 | 100 |
| 18 | Skincolour Europ. | (blond) | 79 | 84 | 98 | 98 | 70 | 80 | 97 | 95 |
| 19 | Skincolour Europ. | (brun) | 76 | 82 | 98 | 98 | 66 | 78 | 96 | 95 |
| 20 | Skincolour Japanese | | 73 | 80 | 98 | 98 | 60 | 76 | 96 | 94 |
| 21 | Skincolour Indian | | 73 | 84 | 98 | 98 | 54 | 80 | 97 | 95 |
| 22 | Skincolour Mulatto | | 76 | 89 | 97 | 97 | 54 | 86 | 97 | 96 |
| 23 | Skincolour Negro | | 82 | 95 | 99 | 98 | 62 | 95 | 98 | 98 |
| 24 | Achrom. D = 0.35 | (filmwhite) | 100 | 100 | 100 | 100 | 100 | 100 | 100 | 100 |
| 25 | Achrom. D = 0.55 | | 94 | 100 | 99 | 99 | 83 | 98 | 97 | 97 |
| 26 | Achrom. D = 0.75 | | 90 | 100 | 100 | 100 | 73 | 98 | 97 | 97 |
| 27 | Achrom. D = 1.00 | | 88 | 100 | 100 | 100 | 70 | 99 | 98 | 99 |

TABLE A 2.4-continued

Scanner Nr. 2
Special colour rendition indices $R_i$ for different film test colour sets.
Scanner adjusted to test colour 17 in each case ($R_{17} = 100$).

| | | | | | | | | | |
|---|---|---|---|---|---|---|---|---|---|
| 28 | Achrom. D = 1.25 | | 88 | 100 | 100 | 100 | 70 | 99 | 99 | 99 |
| 29 | Achrom. D = 1.50 | | 88 | 100 | 99 | 99 | 73 | 99 | 99 | 99 |
| 30 | Achrom. D = 1.80 | | 90 | 99 | 99 | 99 | 79 | 98 | 98 | 98 |
| 31 | Achrom. D = 2.10 | (filmblack) | 94 | 99 | 99 | 99 | 85 | 98 | 98 | 98 | correction matrix $$K = \begin{pmatrix} 1,000 & -0,052 & -0,074 \\ 0,014 & 1,000 & -0,063 \\ 0,005 & -0,146 & 1,000 \end{pmatrix}$$

γred = 0,952  γred = 0,856
γgreen = 1,000  γgreen = 0,970
γblue = 1,015  γblue = 0,995

Colour rendition indices according to DIN 6169 (Part 5)

| Film 3 | | | | Film 4 | | | | Film 5 | | | | Film 6 | | | |
|---|---|---|---|---|---|---|---|---|---|---|---|---|---|---|---|
| a | b | c | d | a | b | c | d | a | b | c | d | a | b | c | d |
| 92 | 89 | 92 | 93 | 76 | 82 | 95 | 97 | 69 | 83 | 96 | 97 | 93 | 96 | 92 | 84 |
| 78 | 75 | 97 | 94 | 69 | 76 | 98 | 97 | 60 | 75 | 97 | 96 | 80 | 80 | 97 | 96 |
| 67 | 65 | 88 | 84 | 65 | 69 | 92 | 97 | 57 | 67 | 91 | 94 | 68 | 68 | 90 | 93 |
| 70 | 74 | 91 | 93 | 73 | 68 | 92 | 83 | 78 | 70 | 90 | 86 | 72 | 75 | 90 | 95 |
| 76 | 80 | 95 | 95 | 82 | 74 | 94 | 89 | 90 | 75 | 93 | 90 | 81 | 84 | 93 | 98 |
| 69 | 72 | 95 | 97 | 76 | 70 | 97 | 96 | 79 | 70 | 98 | 96 | 73 | 77 | 98 | 92 |
| 75 | 76 | 97 | 98 | 78 | 77 | 97 | 93 | 75 | 77 | 98 | 96 | 74 | 77 | 98 | 99 |
| 81 | 81 | 91 | 90 | 79 | 80 | 95 | 96 | 75 | 80 | 95 | 97 | 78 | 80 | 90 | 86 |
| 69 | 68 | 63 | 62 | 71 | 73 | 58 | 68 | 69 | 74 | 58 | 62 | 66 | 68 | 65 | 49 |
| 44 | 43 | 89 | 83 | 46 | 47 | 90 | 89 | 38 | 41 | 82 | 81 | 51 | 53 | 87 | 99 |
| 55 | 58 | 76 | 78 | 58 | 53 | 82 | 70 | 64 | 56 | 79 | 73 | 57 | 59 | 74 | 80 |
| 53 | 54 | 87 | 68 | 55 | 52 | 85 | 68 | 56 | 52 | 88 | 69 | 59 | 59 | 82 | 70 |
| 83 | 84 | 90 | 92 | 77 | 76 | 97 | 97 | 73 | 74 | 96 | 95 | 86 | 89 | 93 | 84 |
| 84 | 82 | 94 | 92 | 78 | 84 | 95 | 97 | 69 | 83 | 96 | 98 | 83 | 83 | 97 | 99 |
| 94 | 99 | 100 | 100 | 90 | 100 | 100 | 99 | 83 | 99 | 99 | 99 | 95 | 99 | 99 | 99 |
| 94 | 100 | 100 | 100 | 90 | 100 | 100 | 100 | 81 | 100 | 100 | 100 | 95 | 99 | 100 | 100 |
| 100 | 100 | 100 | 100 | 100 | 100 | 100 | 100 | 100 | 100 | 100 | 100 | 100 | 100 | 100 | 100 |
| 88 | 87 | 94 | 96 | 79 | 82 | 98 | 97 | 73 | 81 | 98 | 97 | 90 | 91 | 96 | 90 |
| 87 | 85 | 95 | 96 | 76 | 81 | 97 | 97 | 70 | 79 | 97 | 96 | 88 | 90 | 96 | 89 |
| 85 | 82 | 95 | 97 | 73 | 78 | 97 | 97 | 65 | 78 | 97 | 96 | 87 | 88 | 96 | 88 |
| 88 | 83 | 98 | 98 | 72 | 82 | 97 | 97 | 63 | 82 | 97 | 97 | 89 | 90 | 97 | 91 |
| 92 | 86 | 98 | 98 | 74 | 86 | 97 | 98 | 64 | 88 | 96 | 97 | 92 | 92 | 98 | 93 |
| 98 | 93 | 98 | 98 | 81 | 94 | 99 | 99 | 72 | 95 | 98 | 98 | 95 | 96 | 99 | 93 |
| 100 | 100 | 100 | 100 | 100 | 100 | 100 | 100 | 100 | 100 | 100 | 100 | 100 | 100 | 100 | 100 |
| 97 | 100 | 99 | 99 | 95 | 100 | 100 | 100 | 90 | 100 | 100 | 100 | 98 | 100 | 100 | 100 |
| 95 | 100 | 100 | 100 | 91 | 100 | 100 | 100 | 84 | 100 | 100 | 100 | 96 | 100 | 100 | 100 |
| 94 | 100 | 100 | 100 | 90 | 99 | 100 | 100 | 80 | 100 | 100 | 100 | 95 | 100 | 100 | 100 |
| 93 | 100 | 100 | 100 | 89 | 100 | 100 | 100 | 79 | 100 | 100 | 100 | 95 | 100 | 100 | 100 |
| 93 | 99 | 99 | 99 | 89 | 99 | 99 | 99 | 80 | 99 | 99 | 99 | 95 | 99 | 99 | 99 |
| 95 | 100 | 100 | 100 | 91 | 100 | 100 | 100 | 83 | 99 | 99 | 99 | 95 | 99 | 99 | 99 |
| 95 | 99 | 99 | 99 | 92 | 98 | 93 | 98 | 88 | 99 | 99 | 99 | 95 | 100 | 100 | 100 |

γred = 1,030   γred = 0,946   γred = 0,909   γred = 1,037
γgreen = 1,002  γgreen = 0,984  γgreen = 0,989  γgreen = 1,026
γblue = 1,000   γblue = 1,005   γblue = 1,016   γblue = 1,028

Corrective measures at scanner Nr. 2
a none (original state)
b only gamma correction
c gamma correction + opt. matrix
d gamma correction + mean matrix

APPENDIX

Various symbols utilized herein are defined as follows:

| | |
|---|---|
| A | lightness value |
| $\vec{B}$ | blue primary colour |
| $\vec{B_e}$ | blue EBU-receiver primary |
| B, $B_e$ | colour values |
| Bγ | colour values in printing system |
| Bγ | γ-corrected colour signal |
| $B_P$, $B_D$, $B_T$ | matrix coefficients |
| $\overline{b}(\lambda)$ | curve of blue colour's distribution of scanner |
| $\overline{b}_e(\lambda)$ | blue EBU-colour mixture curve |
| $\overline{b}_{korr}(\lambda)$ | corrected blue colour mixture curve |
| $\overline{b}*(\lambda)$ | effective blue spectral sensitivity curves of an optimized scanner |
| C | normalization factor |
| c, $c_Y$, $c_M$, $c_C$ | colouring material concentrations |
| $\vec{D}$ | primary valence |
| D | primary colour value |
| D | gray equivalent densities |
| $\overline{d}(\lambda)$ | primary spectral curve |
| $d(\lambda)$, $d_Y(\lambda)$, $d_M(\lambda)$ | spectral densities |
| $d_C(\lambda)$, $d_{Sch}(\lambda)$, $d_{grau}(\lambda)$ | |
| $\vec{E}$ | center point valence for equal energy white |
| $E_R$, $E_G$, $E_B$ | colour signals |

APPENDIX-continued

Various symbols utilized herein are defined as follows:

| Symbol | Definition |
|---|---|
| $E_X, E_Y, E_Z$ | |
| $\vec{G}$ | green primary valence |
| $\vec{G}_e$ | green EBU-receiver primary valence |
| $G, G_e$ | colour values |
| $G\gamma$ | γ-corrected colour signal |
| $G_P, G_D, G_T$ | matrix coefficients |
| $\bar{g}(\lambda)$ | curve of green colours spectral distribution of scanner |
| $\bar{g}_e(\lambda)$ | green EBU-colour mixture curve |
| $\bar{g}_{korr}(\lambda)$ | corrected green colour mixture curve |
| $\bar{g}^*(\lambda)$ | effective green spectral sensitivity curve for an optimized scanner |
| K | correction matrix |
| $k, k_R, k_G, k_B,$ $k_X, k_Y, k_Z$ | normalization factors |
| $k_{11}$ to $k_{33}$ | matrix coefficients |
| $\vec{P}$ | primary valence |
| P | primary colour value |
| $\bar{P}(\lambda)$ | primary spectral curve |
| $\vec{R}$ | red primary valence |
| $\vec{R}_e$ | red EBU-receiver primary valence |
| $R, R_e$ | colour values |
| $R\gamma$ | γ-corrected colour signal |
| $R_P, R_D, R_T$ | matrix coefficients |
| $\bar{r}(\lambda)$ | curve of red colour's distribution of scanner |
| $\bar{r}_e(\lambda)$ | red EBU-colour mixture curve |
| $\bar{r}_{korr}(\lambda)$ | corrected red colour mixture curve |
| $\bar{r}^*(\lambda)$ | effective red spectral sensitivity curve for an optimized scanner |
| $R_a$ | general colour rendition indices according to DIN 6169 |
| $R_i$ | special colour rendition index |
| $R_{grau}$ | colour rendition index over 8 shades of gray |
| $R_{ges}$ | colour rendition index over 536 test colours |
| $S_\lambda$ | spectral radiation distribution |
| $s(\lambda)$ | relative spectral sensitivity |
| $\vec{T}$ | primary valence |
| T | primary colour value |
| $\bar{t}(\lambda)$ | primary spectral curve |
| $t_r$ | rise time |
| $U^*$ | colour value in CIE-1964 coordinate system |
| $u, u_o$ | colour value components in the CIE-UCS colour chart |
| $V(\lambda)$ | spectral light sensitivity curve for day vision |
| $V'(\lambda)$ | spectral light sensitivity curve for night vision |
| $V^*$ | colour value in CIE-1964 coordinate system |
| $v, v_o$ | colour value components in the CIE-UCS colour chart |
| $v_R, v_G, v_B$ | amplification factors |
| $W^*$ | colour value in CIE-1964 coordinate system |
| $\vec{X}$ | CIE colour valence |
| X | CIE coordinate (standard) colour value |
| $X_R, X_G, X_B$ | matrix coefficients |
| x | CIE colour value component |
| $\bar{x}(\lambda)$ | CIE spectral curve |
| $\vec{Y}$ | CIE-valence |
| Y | CIE coordinate (standard colour value |
| $Y_R, Y_G, Y_B$ | matrix coefficients |
| y | CIE colour value component |
| $\bar{y}(\lambda)$ | CIE spectral curve |
| $\vec{Z}$ | CIE-valence |
| Z | CIE coordinate (standard) colour value |
| $Z_R, Z_G, Z_B$ | matrix coefficients |
| z | CIE colour value component |
| $\bar{z}(\lambda)$ | CIE spectral curve |
| $\beta(\lambda)$ | luminance factor (spectral reflectance) |
| $\beta_R, \beta_G, \beta_B$ | transmission characteristic exponents |
| $\Delta_E$ | colour distance |
| $\Delta k$ | amount of alteration |
| $\Delta\lambda$ | wavelength interval |
| $\gamma$ | gradation |
| $\gamma_R, \gamma_G, \gamma_B$ | exponent for linearization of transmission characteristics |
| $\lambda$ | wavelength of light |
| $\psi_\lambda$ | spectral colour stimulus function |
| $\phi_e(\lambda)$ | spectral distribution of radiated power |
| | symbol for correspondance |
| $\sigma_a, \sigma_{grau}, \sigma_{ges}$ | standard deviations |
| $t(\lambda)$ | spectral transmission ratio |
| $t_Y(\lambda), t_M(\lambda), t_C(\lambda),$ $t_{Sch}(\lambda)$ | spectral transmission ratios of yellow, magenta, cyan colouring materials and of the film base |
| $t_R(\lambda), t_G(\lambda), t_B(\lambda),$ $t_X(\lambda), t_Y(\lambda), t_Z(\lambda)$ | spectral transmission ratios of correction filters |

We claim:

1. Method for reproduction of originals, including originals of non-metameric colour composition, where the original is scanned in each case, with respect to its colour content, according to a tristimulus method and after processing of the scanning signals a reproduction is obtained, via colour mixture, by means of a predetermined colour rendition system, characterized in that the scanning signals ($E_R, E_G, E_B$) are converted, into three primary colour signals (e.g. X, Y, Z) having actual colour values in a predetermined colour coordinate system corresponding substantially identically to theoretical colour values of the original, and that adaptation of the primary colour signals or the signals deriving from these to at least one colour rendition system and/or measures to alter the gradation and/or objective measures to alter the colour rendition of individual colours in the overall image or in discrete areas of the image and/or any other further non-linear processing of the primary colour signals or the signals deriving from these are only carried out after said scanning signals have been converted into the primary colour signals having actual colour values in said predetermined colour coordinate system corresponding substantially identically to said theoretical colour values of the original.

2. Method according to claim 1, characterized in that the primary colour signals are stored temporarily before being further processed.

3. Method according to claim 1, characterized in that with colour rendition systems having a mostly subtractive colour mixture, said objective measures are undertaken after the primary colour signals (X,Y,Z) have been converted into colouring material concentration signals or colour separation density signals ($D_C, D_M, D_G$) adapted to the colour rendition system.

4. Method according to claim 3, characterized in that the colouring material concentration signals or colour separation density signals ($D_C, D_M, C_Y$), varied by means of an objective alteration measures, give rise to correspondingly varied primary colour signals (X,Y,Z), by means of which, together with the remaining unaltered stored primary colour signals, a monitor image is generated, via additive colour mixture which shows the operator the alterations - effected via the objective alteration measures in the colouring material concentration signals of the colour separation density signals - in the associated reproduction, generated via the mainly subtractive colour mixture of the colour rendition system, of the original.

5. Method according to claim 4, characterized in that the primary colour signals, true-to-colour with respect to the original and having actual colour values in a predetermined colour coordinate system corresponding substantially identically to theoretical colour values of the original, are stored in unchanged form until the monitor image corresponds to the desired reproduction result.

6. Method for obtaining three primary colour signals having actual colour values in a predetermined colour coordinate system corresponding substantially identically to theoretical colour values of an original, including an original of non-metameric colour composition, by scanning said original with respect to its colour content in a tristimulus procedure with scanners that are incorrect with respect to visual colour sensitivity and electronically processing the scanning signals thus produced, characterized in that every scanning signal is subjected for purposes of correcting the gray balance to a gradation equalization ($\gamma_R, \gamma_G, \gamma_B$), and in that, for improving the colour rendition properties of chromatic object colours, a linear transformation is carried out with the scanning signals.

7. Method for obtaining primary colour signals having actual colour values in a predetermined colour coordinate system corresponding substantially identically to theoretical colour values of the original, according to claim 6, characterized in that before the gradation equalization, the scanning signals ($E_R, E_G, E_B$) are subjected to a white balance ($K_R, K_G, K_B$) and/or that the gradation equalization ensues via exponention of the scanning signals with an exponent ($\gamma_R, \gamma_G, \gamma_B$) whose reciprocal ($\beta_R, \beta_G, \beta_B$) is equal to the slope of the transmission characterizing line of the respective uncorrected scanner for achromatic film colours of the original when said transmission characterizing line has a logarithmic dependence upon said scanner's reciprocal on the density (D) of the shade of gray to be rendered.

8. Method for obtaining primary colour signals having actual colour values in a predetermined colour coordinate system corresponding substantially identically to theoretical colour values of the original, according to claim 7, characterized in that an exponent ($\gamma_R, \gamma_G, \gamma_B$) is calculated from the spectral data of the respective scanner and from the colouring matter of the original.

9. Method for obtaining three primary colour signals having actual colour values in a predetermined colour coordinate system corresponding substantially identically to theoretical colour values of the original, according to claim 7, characterized in that the values for the exponent ($\gamma_R, \gamma_G, \gamma_B$) are experimentally determined by means of a wedge filter in the original or attached at its edge.

10. Method for obtaining three primary colour signals having actual colour values in a predetermined colour coordinate system corresponding substantially identically to theoretical colour values of the original, according to claim 6, characterized in that no negative coefficients greater than about 3 times the value of the main diagonal are present in a matrix (M) effecting the linear transformation.

11. Method for obtaining three primary colour signals having actual colour values in a predetermined colour coordinate system corresponding substantially identically to theoretical colour values of the original, according to claim 6, characterized in that a matrix (M) is utilized for effecting the linear transformation, matrix coefficients of said matrix for certain given colours being optimized.

12. Method for obtaining three primary colour signals, having actual colour values in a predetermined colour coordinate system corresponding substantially identically to theoretical colour values of the original, according to claim 11, characterized in that the matrix coefficients are determined such that the spectral sensitivity curves of the scanners are approximated as well as possible to correct visual-sensitivity-based (vsb) colour mixture curves for additive primary valences.

13. Method for obtaining primary colour signals having actual colour values in a predetermined colour coordinate system corresponding substantially identically to theoretical colour values of the original, according to claim 10, characterized in that optimization of the matrix coefficients is undertaken for at least three subtractive fundamental colours, preferably of equal visual brightness, and three secondary colours of first order formed from them.

14. Method for obtaining three primary colour signals having actual colour values in a predetermined colour coordinate system corresponding substantially identically to theoretical colour values of the original, according to claim 10, 11 or 13, characterized in that, for the optimization of the matrix coefficients, the mean colour rendition index is determined and optimzied and/or that the optimizatin is carried out by means of an evolution strategy.

15. Device for carrying out the method according to claim 6 or 7 with a tristimulus scanning means, characterized by a correction circuit ($\gamma_R, \gamma_B, \gamma_G$) being provided in each output lead for the scanning signals ($E_R, E_G, E_B$) and by a matrix circuit (M) being provided which is connected at the outputs of the correction circuits ($\gamma_R, \gamma_G, \gamma_B$).

16. Method for determining signals, corresponding to colouring material concentrations, of a colour rendition system comprising three primary colour signals and based mainly or completely on a subtractive colour mixture, especially for synthesizing primary colour signals having actual colour values in a predetermined colour coordinate system corresponding substantially identically to theoretical colour values of an original, preferably having non-metameric colours, to be reproduced, characterized by the following steps: conversion of the primary colour signals (X,Y,Z) into colour signals ($R_P, G_P, B_P$) adapted to the basic colouring materials of the rendition system with replacement of the spectral density distributions of the individual basic colouring materials of the colour rendition system by three optimal colour-like model colouring materials without secondary conversion of the thus-obtained colour signals ($R_P,G_P,B_P$) into corresponding colour density signals ($d_{RP},d_{GP},d_{BP}$) and conversion of the colour density signals into model colouring material concentration signals ($C_{CM},C_{MM},C_{YM}$) with replacement of the colour densities of the optimal colour-like model colouring materials, without secondary densities, in the individual wavelength ranges by optimal colour-like model colouring materials that each have a main and two secondary densities which are constant over the respective partial wavelength range, and of which one is assigned in each case, by approximation, to the density of the three basic colouring materials.

17. Method for determining signals, corresponding to colouring material concentrations, according to claim 16, characterized in that the transformation of the primary colour signals into colour value signals and the conversion of the colour density signals into model colouring material concentration signals ensues via two linear transformations of these signals, the matrix coefficients of the first linear transformation ($M_1$) being determined by the choice of wavelength range limits ($\lambda_2, \lambda_3$) and the matrix coefficients of the second linear transformation $M_2$ being determined by the ratio of main and secondary densities of the model colouring material in the individual wavelength ranges for the respective colour rendition system.

18. Method for determining signals, corresponding to colouring material concentrations, according to claim 16 or 17, characterized in that each model colouring material concentration signal ($C_{CM}, C_{MM}, C_{YM}$) is varied according to a characteristic curve ($K_C, K_M, K_Y$) which is laid down such that primary colour signals corresponding to gray scale values lead to colouring material concentration signals that generate the same gray scale values in the respective colour rendition system.

19. Method for determining signals, corresponding to colouring material concentrations, according to claim 16 or 17, characterized in that the model colouring material concentration signals or the colouring material concentration signals are converted into corresponding separation density signals.

20. Method for determining signals, corresponding to colouring material concentrations, according to claim 16 or 17, characterized by a linear transformation of the model colouring material concentration signals of the colouring material concentration signals or the colour separation density signals by means of a correction matrix ($M_3$) whose coefficients are determined such that the fundamental colours laid down by the primary colouring materials of the colour rendition system, and/or secondary colours of first order from these, are rendered true-to-colour.

21. Method for determining signals, corresponding to colouring material concentrations, according to claim 16, characterized in that for the respective colour rendition system the coefficients of the matrices ($M_1,M_2$ and/or $M_3$) are determined by means of an optimization strategy for given colours.

22. Method for determining signals, corresponding to colouring material concentrations, according to claim 21, characterized in that an evolution strategy is carried out for the optimization of the matrix coefficients.

23. Method for determining signals, corresponding to colouring material concentrations, according to claim 21 or 22, characterized in that the optimization strategy is carried out at least for three subtractive primary colours, preferably of equal visual brightness, and three secondary colours of first order obtained from these.

24. Method for determining signals, corresponding to colouring material concentrations, according to claim 16, characterized in that the separation density signals obtained are compared with electronically stored separation densities of discrete secondary colours of the colour rendition system (catalogue colours).

25. Method for determining signals, corresponding to colouring material concentrations, according to claim 24, characterized by a linear interpolation between the established separation density signals $D_{CM},D_{MM},D_{YM}$) and the nearest separation densities of the catalogue colours.

26. Device for determining signals, corresponding to colouring material concentrations, of a colour rendition system comprising three primary colour signals and based mainly on a subtractive colour mixture, characterized by a first matrix circuit ($M_1$) for transforming the primary colour signals (e.g. X,Y,Z) into colour signals ($R_P,G_P,B_P$) adapted to the primary colouring materials of the colour rendition system, the matrix coefficients of the first matrix circuit ($M_1$) being determined such that the spectral density distributions of the individual primary colouring materials of the colour rendition system are replaced by three optimal colour-like model colouring materials without secondary densities and assigned to different wavelength ranges, by logarithmizing circuits ($-\log (E_R)$, $-\log (E_G)$ and $-\log (E_B)$), connected at the outputs for the colour signals of the first matrix circuit, for transforming the colour signals into corresponding colour density signals, ($d_{RP},d_{GP},d_{BP}$), and by a second matrix circuit ($M_3$) for transforming the colour density signals into model colouring material concentration signals ($C_{CM},C_{MM},C_{YM}$), the matrix coefficients of the second matrix circuit being determined such that the colour densities of the optimal colour-like model colouring material, without secondary densities, of the individual partial wavelength ranges are replaced by optimal colouring like model colouring materials which have a main and secondary densities constant over the respective partial wavelength ranges, the main and the two secondary densities being assigned in approximation to the densities of the three primary colouring materials in the corresponding wavelength range.

27. Device for determining signals, corresponding to colouring material concentrations, according to claim 26, characterized in that the matrix coefficients of the first matrix circuit ($M_1$) are determined by the choice of limits for the partial wavelength ranges, those of the second matrix circuit ($M_2$) by the ratio of main to secondary densities of the model colouring materials in the individual partial wavelength ranges for the respective colour rendition system.

28. Device for determining signals, corresponding to colouring material concentrations, according to claim 26 or 27, characterized in that a circuit ($K_C,K_M,K_Y$) is provided at the outputs for each model colouring material concentration signal of the second matrix circuit ($M_2$), which varies the incoming signal according to a prescribed characteristic curve that is laid down such that primary colour signals corresponding to gray scale values are converted into colouring material signals which generate gray scale values in the respective colour rendition system.

29. Device for determining signals, corresponding to colour material concentrations, according to claim 26 or 27 characterized by circuits for transforming the model colouring material concentration signals or colouring material concentration signals into corresponding separation density signals.

30. Device for determining signals, corresponding to colouring material concentrations according to claim 26, characterized by a third matrix circuit (M₃) to which the separation density signals can be supplied, the matrix coefficients of the third matrix circuit being determined such that the fundamental colours laid down by each basic colouring material are rendered as true-to-colour as possible.

31. Device according to claim 30, characterized in that for colour rendition systems with purely subtractive colour mixture the second matrix circuit (M₂) and the third matrix circuit (M₃) are combined as a common matrix circuit.

32. Device for determining signals, corresponding to colouring material concentrations, according to claim 26, characterized by a memory (Sp) in which the separation densities of catalogue colours for the respective colour rendition system are stored, by a comparator circuit which compares the determined model densities ($D_{CM}, D_{MM}, D_{YM}$) with the catalogue colours, and by an interpolation circuit which carries out an interpolation between the nearest catalogue colour and the determined separation densities.

33. Print simulator, characterized by a device according to any one of claims 26, 27, or 30-32 and a monitor working according to the principle of additive colour mixture, which is connected at the inputs for the primary colour signals (X,Y,Z) of the first matrix circuit (M₁) via corresponding adaptation networks.

34. Method for obtaining three primary colour signals having actual colour values in a predetermined colour coordinate system corresponding substantially identically to theoretical colour values of the original, according to any one of claims 6-9 or 12, wherein said scanning signals are gradation-equalized.

35. Method for obtaining three primary colour signals having actual color values in a predetermined color coordinate system corresponding substantially identically to theoretical colour values of the original, according to any one of claims 7, 8 or 9, characterized in that a matrix is utilized for effecting the linear transformation, matrix coefficients of said matrix for certain colours being optimized.

36. Method for reproduction of originals, including originals of non-metameric colour composition, wherein the original is scanned in each case, with respect to its colour content, according to a tristimulus method and after processing of the scanning signals a reproduction is obtained, via a colour mixture, by means of a predetermined colour rendition system, characterized in that the scanning signals ($E_R, E_G, E_B$) are converted, into three primary colour signals (e.g. X,Y,Z) having actual colour values in a predetermined colour coordinate system corresponding substantially identically to theoretical colour values of the original, in that adaptation of the primary colour signals or the signals deriving from these to at least one colour rendition system and/or measures to alter the gradation and/or objective measures to alter the colour rendition of individual colours in the overall image or in discrete areas of the imaage and/or any other further non-linear processing of the primary colour signals or the signals deriving from these are only carried out after said scanning signals have been converted into the primary colour signals (e.g. X,Y,Z) having actual coloru values in a predetermined colour coordinate system corresponding substantially identically to theoretical colour values of the original, in that every scanning signal is subjected for purposes of correcting the gray balance to a gradation equalization ($\gamma_R, \gamma_G, \gamma_B$), and in that, for improving the colour rendition properties of chromatics object colours, a linear transformation is carried out with the scanning signals.

37. Method according to claim 36, characterized in that before the gradation equalization the scanning signals ($E_R, E_G, E_B$) are subjected to a white balance ($K_R, K_G, K_B$) and/or that the gradation equalization ensues via exponention of the scanning signals with an exponent ($\gamma_R, \gamma_G, \gamma_B$) whose reciprocal ($\beta_R, \beta_G, \beta_B$) is equal to the slope of the transmission characterizing line of the respective uncorrected scanner for achromatic film colours of the original when said transmission characterizing line has a logarithmic dependence upon said scanner's reciprocal on the density (D) of the shade of gray to be rendered.

38. Method according to claim 37, characterized in that an exponent ($\gamma_R, \gamma_G, \gamma_B$) is calculated from the spectral data of the respective scanner and from the colouring matter of the original.

39. Method according to claim 37, characterized in that the values for said exponent ($\gamma_R, \gamma_G, \gamma_B$) are experimentally determined by means of a wedge filter in the original or attached at its edge.

40. Method according to claim 36, characterized in that no negative coefficients greater than about 3 times the value of the main diagonal are present in a matrix (M) effecting the linear transformation.

41. Method according to claim 36, characterized in that a matrix (M) is utilized for effecting the linear transformation, matrix coefficients of said matrix for certain given colours being optimized.

42. Method according to claim 41, characterized in that the matrix coefficients are determined such that the spectral sensitivity curves of the scanners are approximated as well as possible to correct visual-sensitivity based (vsb) colour mixture curves for additive primary valences.

43. Method according to claim 40, characterized in that optimization of the matrix coefficients is undertaken for at least three subtractive fundamental colours, preferably of equal visual brightness, and three secondary colours of first order formed from them.

44. Method according to any one of claims 40, 41 or 43, characterized in that for the optimization of the matrix coefficients the mean colour rendition index is determined and optimized and/or that the optimization is carried out by means of an evolution strategy.

45. Method according to any one of claims 36 or 37, characterized by a $\gamma$ correction circuit ($\gamma_R, \gamma_B, \gamma_G$) being provided in each output lead for the scanning signals ($E_R, E_G, E_B$) and by a matrix circuit (M) being provided which is connected at the outputs of the correction circuits ($\gamma_R, \gamma_G, \gamma_B$).

46. Method according to claim 36, characterized in that the primary colour signals are stored temporarily before being further processed.

47. Method according to claim 36, characterized in that with colour rendition systems having mostly subtractive colour mixture, said objective measures are undertaken after the primary colour signals (X,Y,Z) have been converted into colouring materials concentration signals or colour separation density signals ($D_C,D_M,D_G$) adapted to the colour rendition system.

48. Method according to claim 47, characterized in that the colouring material concentration signals or colour separation density signals ($D_C,D_M,D_Y$), varied by means of the objective alteration measures, give rise to correspondingly varied primary colour signals (X,Y,Z) by means of which, together with the remaining, unaltered stored primary colour signals, a monitor image is generated, via additive colour mixture, which shows the operator the alterations—effected via the objective alteration measures in the colouring material concentration signals or the colour separation density signals—in the associated reproduction, generated via the mainly subtractive colour mixture of the colour rendition system, of the original.

49. Method according to claim 48, characterized in that the primary colour signals, true-to-colour with respect to the original and having actual colour values in a predetermined colour coordinate system corresponding substantially identically to theoretical colour values of the original, are stored in unchanged form until the monitor image corresponds to the desired reproduction result.

50. Method for determining signals, corresponding to colouring material concentrations, of a colour rendition system comprising three primary colour signals and based mainly or completely on a subtractive colour mixture, especially for synthesizing primary colour signals having actual colour values in a predetermined colour coordinate system corresponding substantially identically to theoretical colour values of an original, preferably having no metameric colours, to be reproduced, characterized by the following steps: conversion of the primary colour signals (X,Y,Z) into colour signals ($R_P,G_P,B_P$) adapted to the basic colouring materials of the rendition system with replacement of the spectral density distributions of the individual basic colouring materials of the colour rendition system by three optimal colour-like model colouring materials without secondary densities and assigned to different wavelengths, conversion of the thus-obtained colour signals ($R_P,G_P,B_P$) into corresponding colour density signals ($d_{RP},d_{G-P},d_{BP}$) and conversion of the colour density signals into model colouring material concentration signals ($C_{CM},C_{MM},C_{YM}$) with replacement of the colour densities of the optimal colour-like model colouring materials, without secondary densities, in the individual wavelength ranges by optimal colour-like model colouring materials that each have a main and two secondary densities which are constant over the respective partial wavelength range, and of which one is assigned in each case, by approximation, to the density of the three basic colouring materials, wherein any non-linear processing of the primary colour signals or any signals deriving from these is only carried out after said scanning signals have been converted into the primary colour signals having actual colour values in a predetermined colour coordinate system corresponding substantially identically to theoretical colour values of the original.

51. Method according to claim 50, characterized in that the primary colour signals are stored temporarily before being further processed.

52. Method according to claim 51, characterized in that with colour rendition systems having a mostly subtractive colour mixture, said objective measures are undertaken after the primary colour signals (X,Y,Z) have been converted into colouring materials concentration signals or colour separation density signals ($D_C,D_M,D_G$) adapted to the colour rendition system.

53. Method according to claim 52, characterized in that the colouring material concentration signals or colour separation density signals ($D_C,D_M,D_Y$) by means of the objective alteration measures, give rise to correspondingly varied primary colour signals (X,Y,Z) by means of which, together with the remaining unaltered stored primary colour signals a monitor image is generated, via additive colour mixture, which shows the operator the alterations—effected via the objective alteration measures in the colouring material concentration signals or the colour separation density signals—in the associated reproduction, generated via the mainly subtractive colour mixture of the colour rendition system, of the original.

54. Method according to claim 53, characterized in that the primary colour signals, true-to-colour with respect to the original and having actual colour values in a predetermined colour coordinate system corresponding substantially identically to theoretical colour values of the original, are stored in unchanged form until the monitor image corresponds to the desired reproduction results.

55. Method according to claim 50, wherein every scanning signal is subjected for purposes of correcting the gray balance to a gradation equalization ($\gamma_R,\gamma_G,\gamma_B$), and in that, for improving the colour rendition properties of chromatic object colours, a linear transformation is carried out with the scanning signals.

56. Method according to claim 55, characterized in that, before the gradation equalization, the scanning signals ($E_R,E_G,E_B$) are subjected to a white balance ($K_R,K_G,K_B$) and/or that the gradation equalization ensues via exponention of the scanning signals with an exponent ($\gamma_R,\gamma_G,\gamma_B$) whose reciprocal ($\beta_R,\beta_G,\beta_B$) is equal to the slope of the transmission characterizing line of the respective uncorrected scanner for achromatic film colours of the original when said transmission characterizing line has a logarithmic dependence upon said scanner's reciprocal on the density (D) of the shade of gray to be rendered.

57. Method according to claim 56, characterized in that an exponent ($\gamma_R,\gamma_G,\gamma_B$) is calculated from the spectral data of the respective scanner and from the colouring matter of the original.

58. Method according to claim 56, characterized in that the values for an exponent ($\gamma_R,\gamma_G,\gamma_B$) are experimentally determined by means of a wedge filter in the original or attached at its edge.

59. Method according to claim 55, characterized in that no negative coefficients greater than about 3 times the value of the main diagonal are present in a matrix (M) effecting the linear transformation.

60. Method according to claim 55, characterized in that the matrix (M) is utilized for effecting the linear transformation, matrix coefficients of said matrix for certain given colours being optimized.

61. Method according to claim 60, characterized in that the matrix coefficients are determined such that the spectral sensitivity curves of the scanners are approximated as well as possible to correct visual-sensitivitybased (vsb) colour mixture curves for additive primary valences.

62. Method according to claim 59, characterized in that optimization of the matrix coefficients is undertaken for at least three subtractive fundamental colours, preferably of equal visual brightness, and three secondary colours of first order formed from them.

63. Method according to claim 59, characterized in that, for the optimization of the matrix coefficients, the mean colour rendition index is determined and optimized and/or that the optimization is carried out by means of an evolution strategy.

64. Method according to claim 55, characterized in that the transformation of the primary colour signals into colour value signals and the conversion of the colour density signals into model colouring material concentration signals ensues via two linear transformations of these signals, the matrix coefficients of the first linear transformation ($M_1$) being determined by the choice of wavelength range limits ($\lambda_2, \lambda_3$) and the matrix coefficients of the second linear transformation ($M_2$) being determined by the ratio of main and secondary densities of the model colouring material in the individual wavelength ranges for the respective colour rendition system.

65. Method according to claim 55, characterized in that each model colouring material concentration signal ($C_{CM}, C_{MM}, C_{YM}$) is varied according to a characteristic curve ($K_C, K_M, K_Y$) which is laid down such that primary colour signals corresponding to gray scale values lead to colouring material concentration signals that generate the same gray scale values in the respective colour rendition system.

66. Method according to claim 55, characterized in that the model colouring material concentration signals or the colouring material concentration signals are converted into corresponding separation density signals.

67. Method according to claim 55, characterized by a linear transformation of the model colouring material concentration signals or the colouring material concentration signals or the colour separation density signals by means of a correction matrix ($M_3$) whose coefficients are determined such that the fundamental colours laid down by the primary colouring materials of the colour rendition system, and/or secondary colours of first order from these, are rendered true-to-colour.

68. Method according to claim 55, corresponding to colouring material concentrations, characterized in that, for the respective colour rendition system, the coefficients of the matrices ($M_1, M_2$ and/or $M_3$) are determined by means of an optimization strategy for given colours.

69. Method according to claim 68, characterized in that an evolution strategy is carried out for the optimization of the matrix coefficients.

70. Method according to claim 68, corresponding to colouring material concentrations characterized in that the optimization strategy is carried out at least for three subtractive primary colours, preferably of equal visual brightness, and three secondary colours of first order obtained from these.

71. Method according to claim 55, corresponding to colouring material concentrations characterized in that the separation density signals obtained are compared with electronically stored separation densities of discrete secondary colours of the colour rendition system (catalogue colours).

72. Method according to claim 71, corresponding to colouring material concentrations, characterized by a linear interpolation between the established separation density signals ($D_{CM}, D_{MM}, D_{YM}$) and the nearest separation densities of the catalogue colours.

* * * * *